United States Patent
Vaidya et al.

(10) Patent No.: US 12,388,574 B2
(45) Date of Patent: *Aug. 12, 2025

(54) DISABLING HYBRID AUTOMATIC REPEAT REQUEST (HARQ) ACKNOWLEDGMENTS FOR PACKETS FOR WHICH ACKNOWLEDGEMENTS ARE SUPPORTED AT NETWORK OR HIGHER LAYER

(71) Applicant: Charter Communications Operating, LLC, St. Louis, MO (US)

(72) Inventors: Maulik Vaidya, Escondido, CA (US); Diwelawatte P J Jayawardene, Centennial, CO (US); Amitav Mukherjee, Elk Grove, CA (US); Pratik Das, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 604 days.

This patent is subject to a terminal disclaimer.

(21) Appl. No.: 17/751,660

(22) Filed: May 23, 2022

(65) Prior Publication Data

US 2022/0286236 A1  Sep. 8, 2022

Related U.S. Application Data

(63) Continuation of application No. 16/112,561, filed on Aug. 24, 2018, now Pat. No. 11,343,022.
(Continued)

(51) Int. Cl.
*H04L 1/1812* (2023.01)
*H04L 1/1829* (2023.01)
(Continued)

(52) U.S. Cl.
CPC ......... *H04L 1/1812* (2013.01); *H04L 1/1829* (2013.01); *H04L 1/1861* (2013.01);
(Continued)

(58) Field of Classification Search
CPC .... H04W 72/23; H04W 80/06; H04L 1/1812; H04L 1/1825; H04L 1/1829;
(Continued)

(56) References Cited

U.S. PATENT DOCUMENTS

2008/0043619 A1 * 2/2008 Sammour ............... H04L 1/187
370/231
2008/0059859 A1 * 3/2008 Marinier ............... H04W 72/04
714/748

(Continued)

*Primary Examiner* — Ayman A Abaza
*Assistant Examiner* — Hooman Houshmand
(74) *Attorney, Agent, or Firm* — Straub & Straub; Michael P. Straub; Stephen T. Straub

(57) ABSTRACT

A first wireless communications device including a transmitter, such as a base station or UE, identifies a first traffic flow, e.g., a TCP packet flow, for which end to end packet retransmission is supported. The first wireless communications device transmits an explicit indication to a second wireless communications device to skip Hybrid Automatic Repeat Request (HARQ) feedback for data, corresponding to the first traffic flow, said data being transmitted to the second wireless communications device. The explicit indication to skip HARQ feedback for data is, e.g., one of: a HARQ Off Indicator in a Downlink Control Information (DCI) Scheduling message, a Semi-Persistent Scheduling HARQ Off Indicator, or a AUL HARQ Off Indicator. HARQ suppression is applied for the first traffic flow at a radio link layer and/or MAC layer.

20 Claims, 31 Drawing Sheets

Related U.S. Application Data

(60) Provisional application No. 62/713,519, filed on Aug. 1, 2018.

(51) Int. Cl.
*H04L 47/34* (2022.01)
*H04W 72/23* (2023.01)
*H04W 80/06* (2009.01)

(52) U.S. Cl.
CPC ............ *H04L 1/1864* (2013.01); *H04L 47/34* (2013.01); *H04W 72/23* (2023.01); *H04W 80/06* (2013.01)

(58) Field of Classification Search
CPC ... H04L 1/1854; H04L 1/1861; H04L 1/1864; H04L 1/1896; H04L 47/34
See application file for complete search history.

(56) References Cited

U.S. PATENT DOCUMENTS

2010/0281322 A1* 11/2010 Park ...................... H04L 1/1825
714/E11.131
2017/0317791 A1* 11/2017 Wiberg ................. H04L 1/1861
2019/0222394 A1* 7/2019 Medles ................. H04L 5/0055

* cited by examiner

DISABLING HYBRID AUTOMATIC REPEAT REQUEST (HARQ) ACKNOWLEDGMENTS FOR PACKETS FOR WHICH ACKNOWLEDGEMENTS ARE SUPPORTED AT NETWORK OR HIGHER LAYER

RELATED APPLICATIONS

The present application is a continuation of U.S. Patent Application Ser. No. 16/112,561 filed Aug. 24, 2018, which published as US 2020-0044790 A1 on Feb. 6, 2020, and claims the benefit of U. S. Provisional Patent Application Ser. No. 62/713,519 filed Aug. 1, 2018 which is hereby expressly incorporated by reference in its entirety.

FIELD

The present application relates to communications methods and apparatus, and more particularly, to methods and apparatus for disabling radio link control (RLC) and/or Hybrid Automatic Repeat Request (HARQ) for flows supporting an end to end acknowledgment, e.g., TCP packet flows.

BACKGROUND

Various types of packet flows support end to end retransmission of packets. TCP/IP streams normally support end to end retransmission of packets with an end device in a communications session that fails to receive a complete packet signaling the other end of the communications session of the packet transmission failure.

While packet retransmission can be triggered at a high level by communication from one end device to another end device, ACK/NACK mechanisms may be, and often are, supported at various layers for one or more individual communications links which may form a part of an end to end communications path.

ACK/NACK mechanisms systems with retransmission for data that is not successfully received is particularly common for wireless links. Such mechanisms which are often applied at a relatively low communications layer, e.g., physical layer or mac layer, can be useful particularly for packet streams that do not support end to end retransmission of lost or missing packets. Such ACK/NACK and retransmission mechanisms applied for an individual link can also add to the reliability of communications packet flows that support end to end retransmission of packets in the event of a communications failure.

While retry and re-transmission over links might seem to be desirable from a reliability perspective, they can introduce delays in that re-transmissions over individual links can take time as a device waits to process an ACK/NACK for a link before potentially transmitting additional data. Furthermore, the ACK/NACK signaling and potential retransmission itself has the potential to introduce delays, it also requires the use of communications resources to perform the ACK/NACK signaling as well as processing resources to handle such signaling and potentially support retransmission on an individual link. While delays may not be an issue for some packet flows, in the case of packet flows where a low latency is desired, implementing retry mechanisms on individual links can introduce delays, consume bandwidth, and/or consume processing resources which might be used for other activities, e.g., to support communication of other data.

From the above discussion it should be appreciated that the use of ACK/NACK and retry mechanisms on individual links can be desirable in some cases, for some packet flows it would be desirable if the use of ACK/NACK signaling and/or retransmission over individual links of a packet path, e.g., including multiple links, could be avoided or limited, e.g., to avoid possible delays and/or minimize processing requirements as compared to embodiments where full ACK/NACK functionality and retransmission is supported on the individual links that make up an end to end a packet transmission path.

In view of the above discussion it should be appreciated that there is a need to address multiple technical problems relating to the use of ACK/NACK and/or retransmission on individual links of a packet path. The technical problems include but are not limited to: i) identifying packet streams for which disabling or avoiding the use of ACK/NACK and/or retransmission functionality would be beneficial; ii) controlling one or more devices to disable or avoid applying ACK/NACK and/or retransmission functionality to data corresponding one or more packet streams; and iii) limiting the processing or operations which are required to be performed in response to an ACK/NACK corresponding to a link when retransmission with regard to the link is not to be supported.

From the above it should be appreciated that method and/or apparatus which can be used to address one, more or all of the above discussed problems and/or otherwise facilitate communication of packet streams in devices which have the ability to support ACK/NACK signaling would be desirable.

SUMMARY

In various embodiments a first communications device including a transmitter, such as a base station or UE, identifies a packet flow for which end to end packet retransmission is supported. The packet flow may be one of a plurality of such flows with RLC acknowledgement suppression techniques and/or HARQ suppression techniques being applied to one, more or all such flows. For example HARQ suppression is applied selectively in some embodiments to links corresponding to packet flows with low latency requirements while HARQ suppression is not applied to other flows with end to end packet retransmission which have lower latency requirements.

In some embodiments the packet flow to which HARQ suppression is applied is a TCP/IP packet flow for which end to end packet retransmission is supported. To avoid delays that may be associated with attempting to retransmit data due to a transmission failure of some data over the radio link between the base station and access point HARQ retransmission of data, e.g., portions of packets may be, and sometimes, are disabled in the first communications device. As part of the HARQ suppression process, one or more portions of the HARQ process may be avoided or suppressed. For example in some cases ACK/NACK signaling is disabled and the processing of such signals is avoided. In other embodiments ACK/NACK signaling may still occur with the device receiving the ACK/NACK disregarding the signals and/or intentionally refraining from retransmitting data in response to such signals and/or proceeding with transmitting additional data over the link without waiting for an ACK with respect to data that was previously transmitted on the link.

In at least some cases where HARQ suppression is applied to a packet flow, the packet retransmission method supported by the end devices in the packet flow is relied upon to assure overall end to end communications reliability without depending on the HARQ capabilities that could have been used on individual links, e.g., such as a radio link between a base station or UE, which form part of a communications path between the two end devices.

In various embodiments HARQ suppression is applied to a communications link between two communications devices with the communications link being one of a plurality of links on a packet path that connects one of the first and second devices with a third communications device. In various embodiments one of the first and second devices is a UE (User Equipment device) and the other one of the first and second devices is a base station. The third communications device may be, for example, another UE.

Thus, in some embodiments the first communications device which is used to implement one or more methods is a base station, such as a gNodeB (gNB). The base station may be, and sometimes is, an intermediate node on the communications path between a third device, e.g., another UE, and the second device. In such a case the third device is an end device, e.g., the source of a TCP/IP packet flow and the second device is another end communications device for the TCP/IP packet flow with the second device being the destination device to which the first packet flow is directed. In such an embodiment HARQ retransmission may be, and sometimes is, disabled on the downlink with respect to the TCP/IP packet flow which supports end to end retransmission.

While HARQ retransmission and related signaling may be and sometimes is disabled for all TCP/IP packet flows which support end to end packet retransmission, in some embodiments the HARQ retransmission is only fully or partially disabled for packet flows subject to low latency requirements, e.g., TCP/IP packet flows with latency requirements below a predetermined threshold level used to identify packet flows for which HARQ retransmission should be fully or partially suppressed.

While in some embodiments, e.g., HARQ downlink suppression embodiments, the first communications device is a base station, in other embodiments, e.g., HARQ uplink suppression embodiments, the first communications device is a UE or other end communications device.

Thus in some embodiments, e.g., uplink HARQ suppression embodiments, the first communications device is a UE or other end node and the second communications device is a base station. In at least some such embodiments the third communications device is, e.g., another UE, which is the other end node to which packets originating at the first communications device are directed. In such an embodiment HARQ retransmission may be, and sometimes, is disabled or at HARQ signaling or processing is at least partially suppressed on the uplink with respect to a packet flow that supports end to end retransmission of lost, missing or corrupted packets.

While at least some packet flows for which an end to end retransmission process is supported may, and often will, have HARQ retransmission disabled or suppressed on a portion of the overall communications path between the end devices in accordance with the invention, other packet flows such as UDP packet flows for which end to end retransmission is not supported will be communicated without disabling HARQ over one or more links, e.g., radio links, on the path between the source of the packet flow and the destination of the packet flow.

In accordance with some features of the invention, in some but not necessarily all embodiments the transmission and use of ACKs/NACKs for the portion of the communications path, e.g., an individual radio link, between first communications device and the second communications device is intentionally disabled for traffic flows for which end to end packet retransmission is supported, e.g., at least some TCP/IP packet flows. In this way failure to communicate data corresponding to a portion of a packet between the first communications device, e.g., base station, and the second communications device, e.g., UE, will not trigger retransmission, by the first communications device, of the data which was not successfully communicated over the individual link over which a HARQ retry mechanism was disabled and thus not enabled. While avoiding automatic retransmissions over the individual link between the first and second communications devices, which would normally be triggered by detection of a NACK indicating failure to communicate data over the link, has the advantage of reducing latency by eliminating the layer of HARQ processing and retransmission. Thus with respect to flows for which HARQ signaling or processing is partially or fully suppressed, e.g., disabled, overall throughput may be enhanced by avoiding delays such ACK/NACK signaling and potential data retransmission might introduce to the packet flow. In such cases the implemented end to end packet retransmission mechanism still provides a good degree of reliability to insure that a packet will be successfully communicated while avoiding the need for ACK/NACK signaling and processing with regard to an individual portion, e.g., individual radio link between a base station and UE, of the overall communications path between the source and end destination device corresponding to a packet flow being communicated.

In various embodiments a first communications device including a transmitter, such as a base station or UE, identifies a packet flow for which end to end packet retransmission is supported. HARQ suppression is applied at a radio link layer and/or MAC layer. One or more HARQ suppression techniques, including disabling ACK/NACK signaling for a packet flow going over a radio link and/or limiting processing by, for example, disregarding NACKs, send with regard to data communication over the radio link, are described. HARQ suppression is applied selectively in some embodiments to links corresponding to packet flows with low latency requirements while HARQ suppression is not applied to other flows which have more flexibility with regard to latency, e.g., which can allow for more latency than the low latency flows. The methods can be applied to links of a packet flow between two end devices where the links to which HARQ suppression are applied can be uplink and/or downlinks forming a portion of the end to end communications path. As part of the HARQ suppression process, one or more portions of the HARQ process may be disabled, avoided, or fully or partially suppressed. ACK/NACK signaling can be disabled and/or ignored depending on the embodiment.

A communications method, in accordance with some embodiments, comprises: identifying, at a first wireless communications device including a transmitter, a first traffic flow; and transmitting, from the first wireless communications device, an explicit indication to a second wireless communications device to skip Hybrid Automatic Repeat Request (HARQ) feedback for data, corresponding to the first traffic flow, said data being transmitted to the second wireless communications device. An exemplary communications system, in accordance with some embodiments, comprises: a first wireless communications device comprising: a transmitter; and a processor configured to: identify, at the first wireless communications device including the transmitter, a first traffic flow; operate the transmitter to transmit, from the first wireless communications device, an explicit indication to a second wireless communications device to skip Hybrid Automatic Repeat Request (HARQ) feedback for data, corresponding to the first traffic flow, said data being transmitted to the second wireless communications device. A first wireless communications device including a transmitter, such as a base station or UE, identifies a first traffic flow, e.g., a TCP packet flow, for which end to end packet retransmission is supported. The first wireless communications device transmits an explicit indication to a second wireless communications device to skip Hybrid Automatic Repeat Request (HARQ) feedback for data, corresponding to the first traffic flow, said data being transmitted to the second wireless communications device. The explicit indication to skip HARQ feedback for data is, e.g., one of: a HARQ Off Indicator in a Downlink Control Information (DCI) Scheduling message, a Semi-Persistent Scheduling HARQ Off Indicator, or a AUL HARQ Off Indicator. HARQ suppression is applied for the first traffic flow at a radio link layer and/or MAC layer.

Two Cases are Discussed:
  i) Where the first wireless communications device is gNB, the second wireless communication device is UE; referred to as downlink direction (DL). This case covers data which the gNB has received from packet core (either EPC or NGC) which in turn received the data from either an external source e.g. Application Server (AS), another terminal (e.g. desktop computer), or sources internal to packet core network e.g. another UE. Herein, two cases are covered:
    a. Data sent using normal mode of communication. Such data is encoded via C-RNTI (TS 36.300 clause 8.1) and is uniquely intended for the given UE.
    b. Data sent using Semi-Persistent Scheduling (SPS). Such data is encoded via SP-RNTI (TS 36.300 clause 8.1) and is uniquely intended for the given UE when allowed to operate in SPS mode.
  ii) Where the first wireless communications device is UE, the second wireless communication device is gNB; referred to as uplink direction (UL). This case covers data which the UE wishes to send to gNB for further transmission, via packet core network (either EPC or NGC) to either an external source e.g. Application Server (AS), another terminal (e.g. desktop computer), or sources internal to packet core network e.g. another UE. In addition to the normal mode of communication between the said devices, the case of Autonomous Uplink (AUL) is also covered.

For the above mentioned cases, wherever required and as detailed below in this application, new upper layer (RRC) parameter(s) are introduced to govern the lower layer (MAC and PHY) behavior.

While the transmitting device may assign the data corresponding to a packet flow with an end to end retransmission mechanism, e.g., a TCP/IP packet flow, the receiving device may not support the no ACK/NAK transmission process. In such a case the receiving device, particularly in the case where in existing HARQ process ID was repurposed for the new HARQ process which does not require transmission of ACKs/NACKs may not realize that it is not required to transmit an ACK/NACK in response to a data transmission and may transmit ACK/NACK. If such unnecessary transmission for a particular traffic flow occurs, the transmitting device will receive the transmitted ACK/NACK. However, ACKs/NACKs received for flows for which HARQ retransmission is not supported will be disregarded by the HARQ process corresponding to the flow for which ACK/NACK are not required and retransmission is not supported, e.g., is disabled. In such cases since the received ACK/NACK corresponds to a HARQ processes which does not involve retransmission, whether or not a NACK is received, in at least some embodiments receipt of a NACK corresponding to such a flow will not result in a retransmission by the base station of the data which was not successfully received.

In the case of a TCP/IP packet flow for which HARQ over the link between the base station and end communications device has been disabled, failure of the end device to receive a complete packet may and normally will result in the second communications device signaling to the other end communications device that a packet was not received and the other communications device, e.g., the third communications device which may be another UE will retransmit the lost packet.

While a base station may assign packet flows with end to end retransmission capability to a HARQ process which does not require transmission of ACKs/NACKs and normally will not involve processing of ACKs/NACKs, one or more packet flows which do not support an end to end transmission are communicated using a HARQ process which supports use of ACK/NACK between the first communications device, e.g., base station, and second communications device, e.g., UE. Thus HARQ processes which support ACK/NACKs are used where the data being communicated is not sufficiently protected by one or more other retransmission methods, e.g., end to end packet retransmission methods.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

Figure 1:
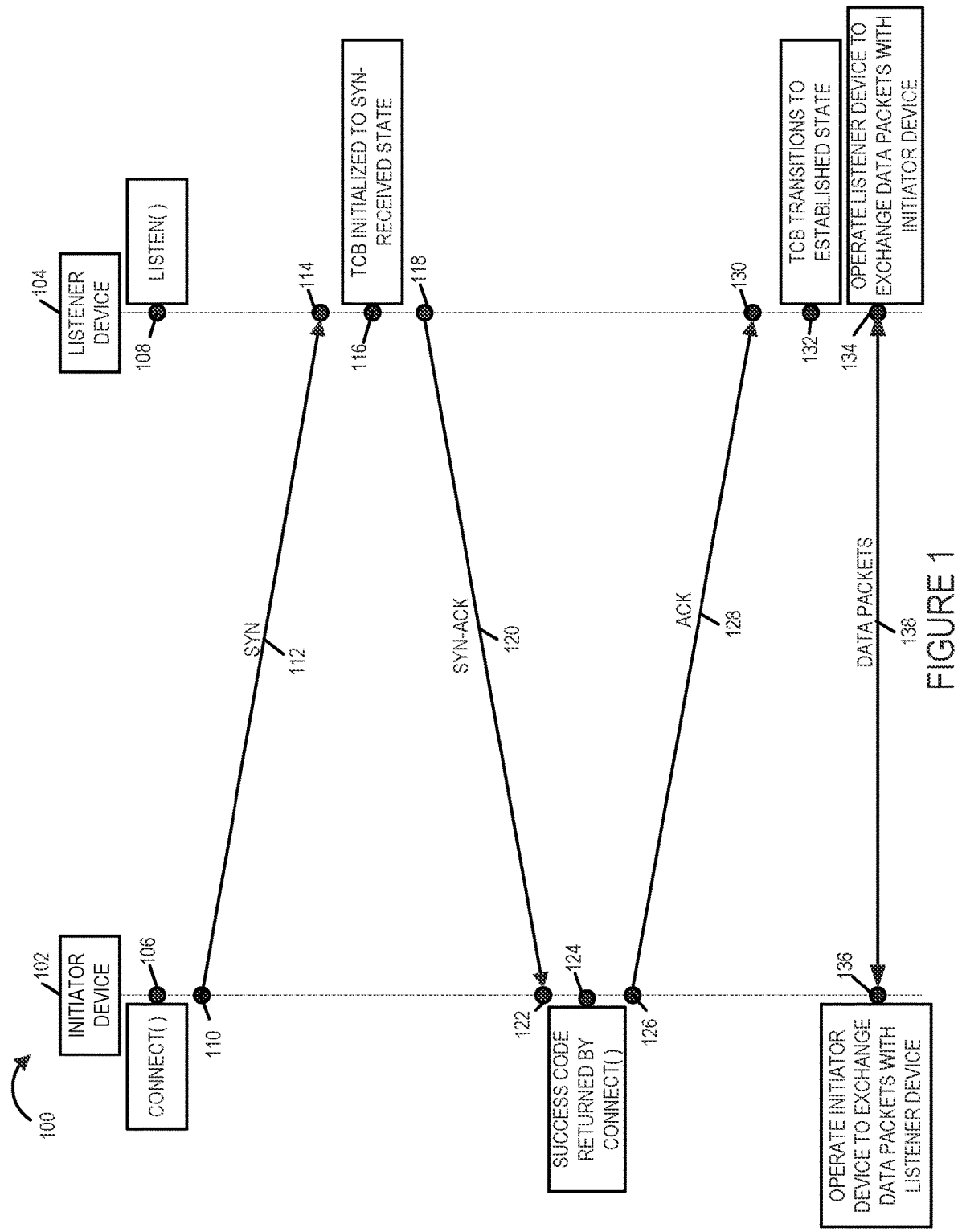
FIG. 1 illustrates an exemplary 3-way handshake between an initiator and a listener used with the TCP protocol.

Various aspects and/or features of Transmission Control Protocol (TCP) will now be described. TCP is a connection-oriented protocol which requires the well-known 3-way handshake. Drawing 100 of FIG. 1 illustrates an exemplary 3-way handshake between an initiator device 102 and a listener device 104. In step 106 initiator device 102 is operated to initiate a connection with listener device 104. In step 108, listener device 104 is operated to listen. In step 110, device 102 generates and sends Synchronization (SYN) message 112, which is successfully received by device 104 in step 114. In response to the successfully received SYN message 112, in step 116, the Transmission Control Block (TCB) is initialized to SYN-RECEIVED state. In step 118, device 104 generates and sends Synchronization-Acknowledgement (SYN-ACK) message 120 to device 102. In step 122, device 102 successfully receives SYN-ACK message 120. In step 124, device 122 returns a success code. In step 126, device 102 generates and sends ACK message 128 to device 104. In step 130 device 104 successfully receives ACK message 128. In response to the successfully received ACK message 128, in step 132, TCB transitions to the established state. In steps 134 and 136, the devices (104, 102) are operated to exchange data packets 138 with each other.

In IPv4, the TCP ACK size is approximately 52 bytes, which includes 20 bytes for the IP header+32 bytes for the TCP header. In IPv6, the TCP ACK size is approximately 72 bytes, which includes 40 bytes for the IP header+32 bytes for the TCP header.

A failure in any of the 3-steps, e.g., ACK not received, results in retransmission of the packet(s).

Internet Engineering Task Force Request for Comments (IETF RFC) 366 provides a few ways of implementing Automatic Repeat Query (ARQ), TCP re-transmission mechanism at link layer: stop and wait ARQ, Go-Back N ARQ, Selective Repeat ARQ, . . . .

TCP Re-transmissions are governed by timer, which in turn are affected by round trip time (RTT). RTT=($\alpha$)(old RTT)+(1−$\alpha$) (new_round_trip_sample). A longer RTT reduces throughput. Throughput<(($C \times MSS$)/($RTT \times sqrt(\rho)$)).

Figure 2:
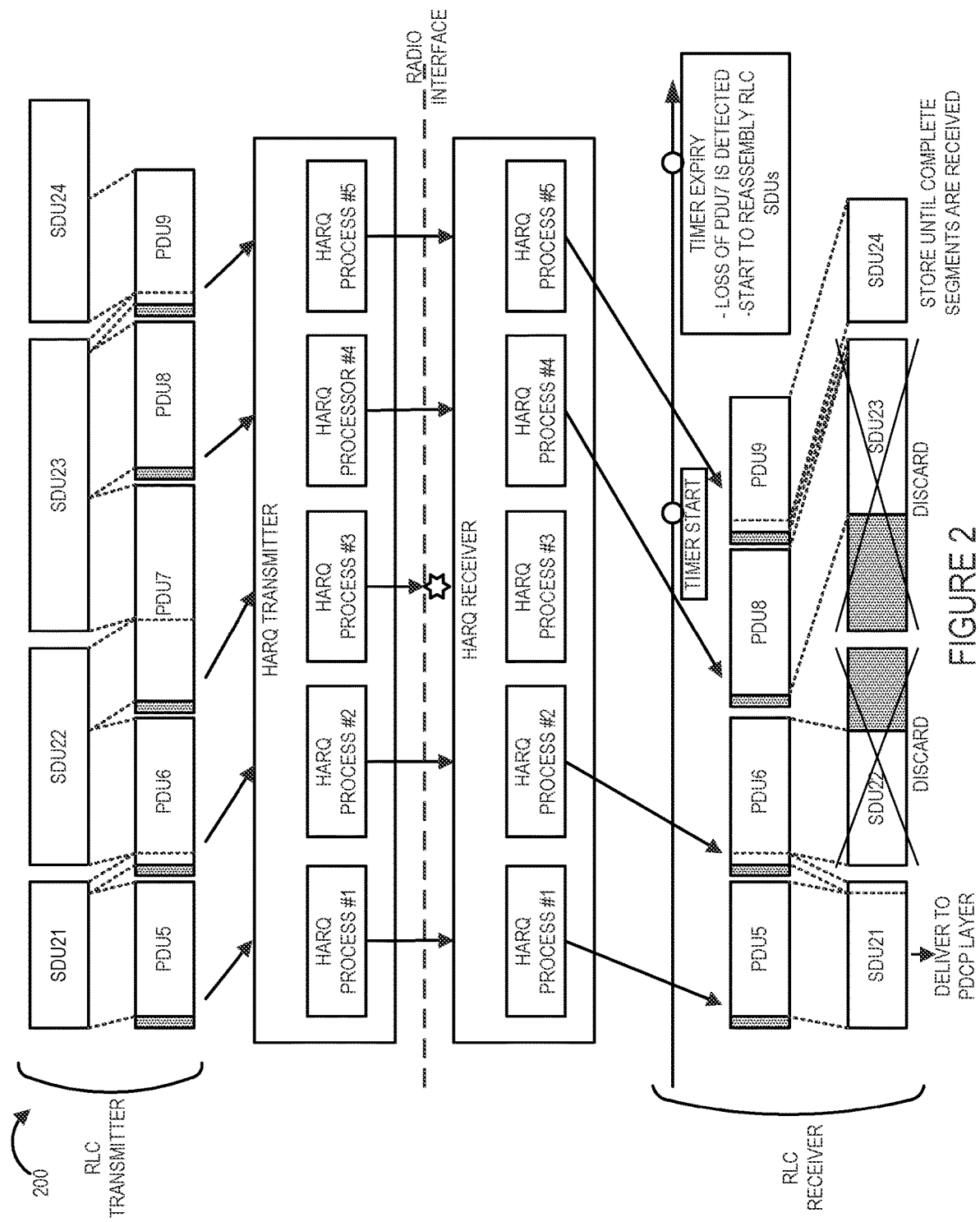
FIG. 2 is a drawing including HARQ processes.

Various aspects of Long Term Evolution/New Radio Automatic Repeat Request+Hybrid Automatic Repeat Request (LTE/NR ARQ+HARQ) will now be described. 4G and 5G networks serve as a "transport" network to transmit various IP and non-IP packets. FIG. 2 is a drawing 200 including HARQ processes.

Radio Link Control Acknowledged Mode (RLC (AM)) provides ARQ (re-transmission based on Selective Repeat (SR)) and re-ordering. In addition, Medium Access Control Layer-Physical Layer (MAC-PHY) provide Hybrid-Automatic Repeat Request (HARQ). In LTE, Frequency Division Duplex (FDD): synchronous, there are 8 HARQ processes and re-transmission is allowed after 8 msec (4 msec for (n+4) response+4 msec for grant-to-transmission delay). In LTE, Time Division Duplex (TDD): asynchronous given the asymmetrical uplink/downlink (UL/DL) split, 2 mechanisms were devised. The first mechanism includes Acknowledgement/Negative Acknowledgement (ACK/NACK) bundling, and a logical AND operation is used for each downlink codeword acknowledgments. The second mechanism includes AC/NACK multiplexing, and spatial layer ACK/NACKs are bundled. In NR asynchronous HARQ is used; there are 16 HARQ processes (default=8); and Downlink Control Information (DCI) format 1_0, and 1_1 includes a Physical Downlink Shared Channel-to-Hybrid Automatic Repeat Request (PDSCH-to-HARQ) feedback timing indicator which provides either which Physical Uplink Control Channel (PUCCH) slot (n+k) OR predefined slots {1-8} in which to transmit ACK/NACK.

When TCP is sent over LTE/NR network, not withstanding packet-drops in Core Network, with Radio Access Network (RAN), the following three mechanisms get employed to govern transmissions: i) HARQ(at the PHY/MAC layers); ii) ARQ (at the RLC layer); and iii) TCP SYN_ACK/ACK (at the IP layer).

For UE to server transmission, there may be, and sometimes are, lost TCP packets. If the TCP packet loss occurs at the PHY/MAC layer, this results in only HARQ-based re-transmissions. If the TCP packet loss occurs at the RLC layer, this results in HARQ+RLC (AM-mode) based re-transmissions. And if the packet loss occurs at the IP layer, e.g., somewhere in the network, this results in HARQ+RLC (AM mode)+TCP based re-transmissions. The TCP packet loss and corresponding re-transmissions, cause delay in packet delivery. The delay in packet delivery increase RTT, which decreases throughput, and the decreased throughput may, and sometimes does, cause congestion.

Figure 3:
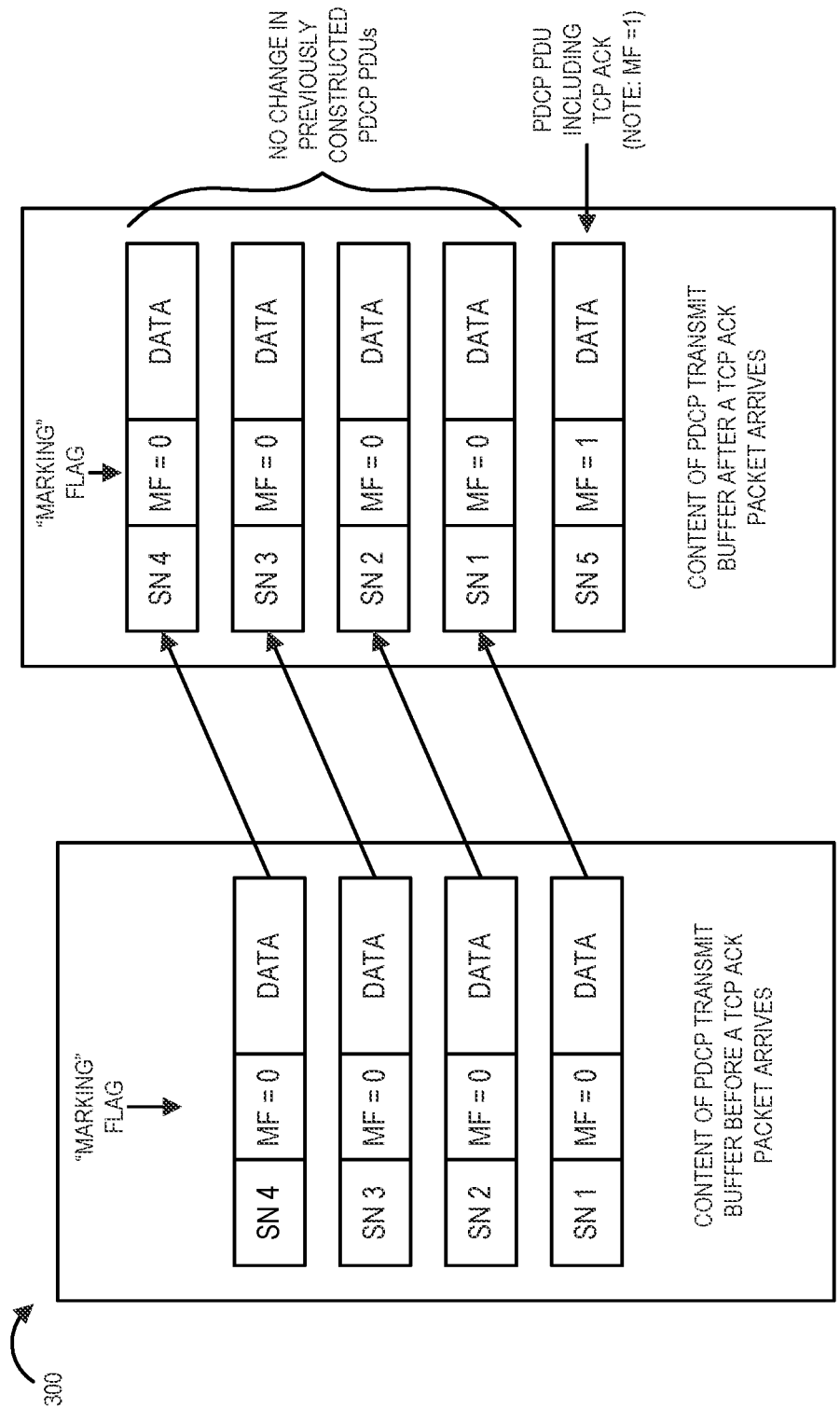
FIG. 3 illustrates the approach of marking TCP segments carrying ACKs using a "Marking" flag, which is set to a 1, when the TCP segment contains and ACK and is set to a 0 when the TCP segment does not carry an ACK.

Drawing 300 of FIG. 3 illustrates the approach of marking TCP segments carrying ACKs using a "Marking" flag, which is set to a 1, when the TCP segment contains and ACK and is set to a 0 when the TCP segment does not carry an ACK.

In accordance with a feature of some embodiments, of the present invention, unnecessary packet TCP re-transmissions at the 3GPP transport network level are not performed.

Figure 4:
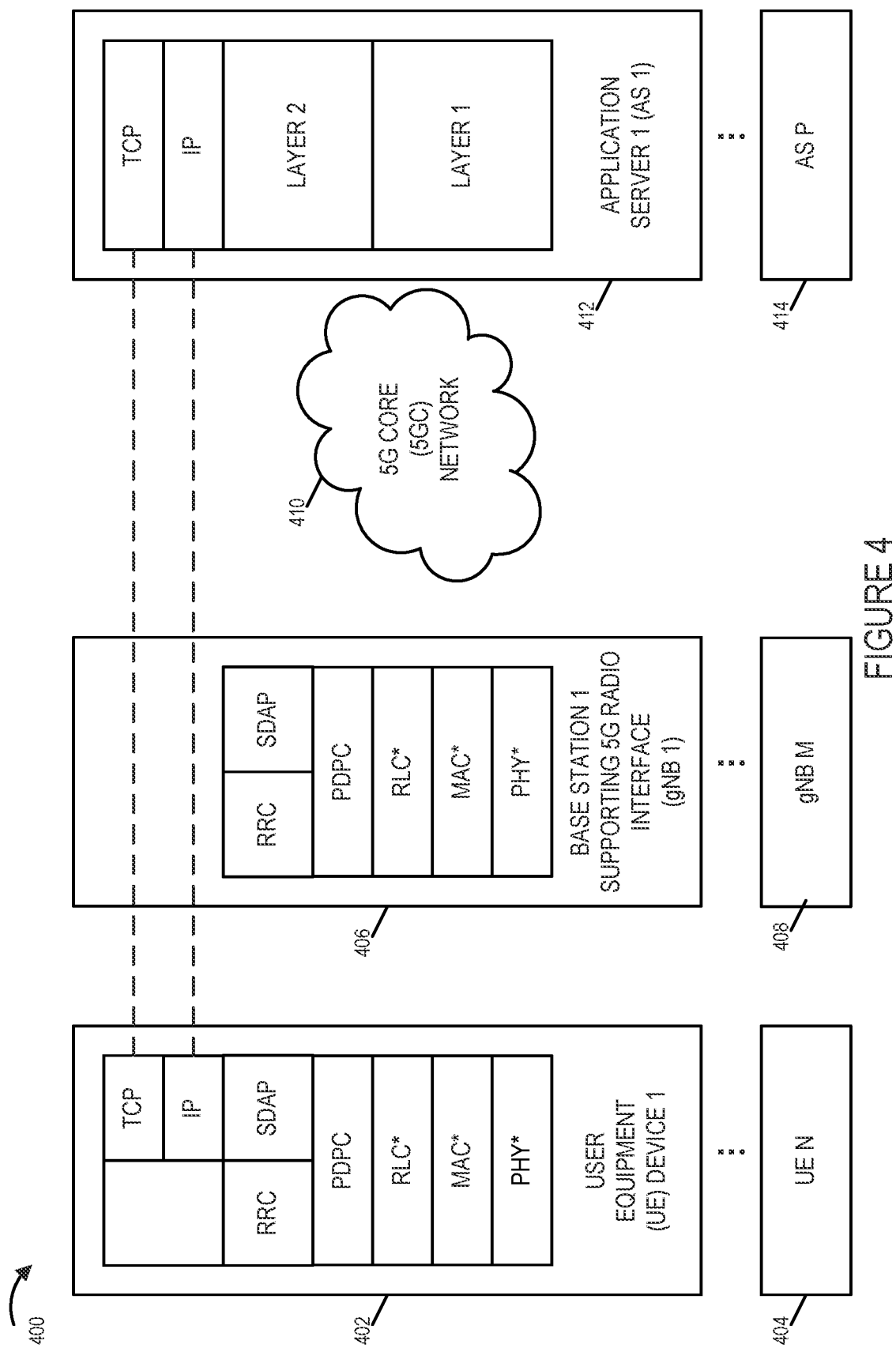
FIG. 4 is a drawing of an exemplary communications system in accordance with various exemplary embodiments.

FIG. 4 is a drawing of an exemplary communications system 400 in accordance with various exemplary embodiments. Exemplary communications system 400 includes a plurality of user equipment (UE) devices (UE 1 402, . . . , UE N 404), a plurality of base stations supporting a 5G radio interface (gNB 1 406, . . . , gNB M 408), a 5G core (5GC) network 410, and a plurality of application servers (AS 1 412, . . . , AS N 414). Each of the UE devices, e.g., UE 1 402, supports communications using: a Physical (PHY) layer, a Medium Access Control (MAC) layer, a Radio Link Control (RLC) layer, a Packet Data Convergence Protocol (PDPC) layer, a Radio Resource Control (RRC) layer, a Service Data Adaption Protocol (SDAP) layer, an Internet Protocol (IP) layer, and a Transmission Control Protocol (TCP) layer. The PHY layer is considered Layer 1; the MAC, RLC, PDCP, and SDAP layers are considered Layer 2; and the RRC layer is considered Layer 3.

Each of the base stations, e.g., gNB 1 406, supports communications using: a PHY layer, a MAC layer, a RLC layer, a PDCP layer, a PDPC layer, a RRC layer, and a SDAP layer. Each of the application servers, e.g., AS 1 412, supports communications using: layer 1, layer 2, an IP layer and a TCP layer.

Although FIG. 4 is used to describe the invention in the context of New Radio (NR) terminology, the invention may, and sometimes is used in an LTE system which in not a NR system, e.g., a 4G LTE system using eNBs instead of gNBs.

Exemplary novel features and/or aspects in accordance with some embodiments of the present invention Include one or more of: (i) methods and/or apparatus directed to selectively disabling Radio Link Control Acknowledgment Mode (RLC AM); ii) method and/or apparatus directed to selectively disabling Hybrid Automatic Repeat Request Acknowledgment/Negative Acknowledgment (HARQ ACK/NACK); and iii) methods and/or apparatus directed to selectively disabling both RLC AM and HARQ ACK/NACK.

Three alternative novel approaches to selectively disabling Hybrid Automatic Repeat Request Acknowledgment/Negative Acknowledgment (HARQ ACK/NACK) will now be described. In a first approach, each of the uplink/downlink (UL/DL) operations are changed to disable HARQ automatic repeat request (ARQ) in affected channels. In a second approach, only essential areas are changed to disable HARQ automatic request, and the behavior is introduced on the receiver where even if HARQ-ACK was sent, the corresponding fields and associated logic is ignored. In a third approach, since HARQ originates at the MAC layer, the HARQ process assignment behavior is fundamentally changed such that Transport Blocks (TBs) don't get slotted to a HARQ process.

High level steps involved in the propose solutions include: i) detection at an eNBs/gNB for DL and at UE for UL that a given packet is a TCP ACK and any additional service criteria (e.g. Quality Control Indicator (QCI)/5QI indicates Ultra-Reliable Low-Latency Communication (URLLC) packets); ii) upon such detection, dynamically disabling HARQ and/or RLC ACKS for send of such packets prior to transmission for both UL and DL directions; and iii) change in behavior at receiving end to account for the above.

Examples of URLLC packets include, e.g., packets belonging to an augmented reality or virtual reality stream, which are communicated over a high bandwidth low latency channel. Another type of exemplary additional service criteria includes, e.g. services for which the penalty for not providing the ACK is low, e.g., GMAIL, web browsing, a news CNN website, YOUTUBE web browsing, etc.

In some embodiments, whether or not to selectively disable both radio link control acknowledgment mode and HARQ ACK/NACK is to be governed by a new parameter in gNBs Operations Administration and Maintenance (OA & M) configuration.

An approach of disabling Acknowledgment (ACK) for Radio Link Control (RLC) Acknowledgment Mode (AM) by modifying Acknowledgment Mode Data (AMD) Protocol Data Unit (PDU) will now be described.

If a sender matches the selected Packet Data Convergence Protocol (PDCP) packet to Radio Link Control (RLC) Unacknowledged Mode (UM) mode, then by default there won't be an RLC-level acknowledgment. So, in such a scenario no additional action needs to be taken.

If the sender matches the selected PDCP packet to RLC Acknowledged Mode (AM) mode, then in one category of solutions, a new toggle bit 'No RLC ACK required', abbreviated as 'NRAR' is added to the different kinds of RLC AMD PDU (c.f. 3GPP TS 38.322v15.2.0 section 6.2.2.4). The remainder bits of the newly added Octet are Reserved for future use.

'NRAR' is a 1-bit value. The default value for NRAR is 0, which communicates RLC ACK expected. A value of 1 for NRAR communicates RLC ACK not required.

For RLC AMD PDUs with 'NRAR' set to 1, the sending RLC entity shall not expect ACK report from the receiving RLC entity in RLC STATUS PDU.

The receiving RLC entity shall not include S/N of AMD PDUs when generating RLC STATUS PDU (if requested).

Figure 5:
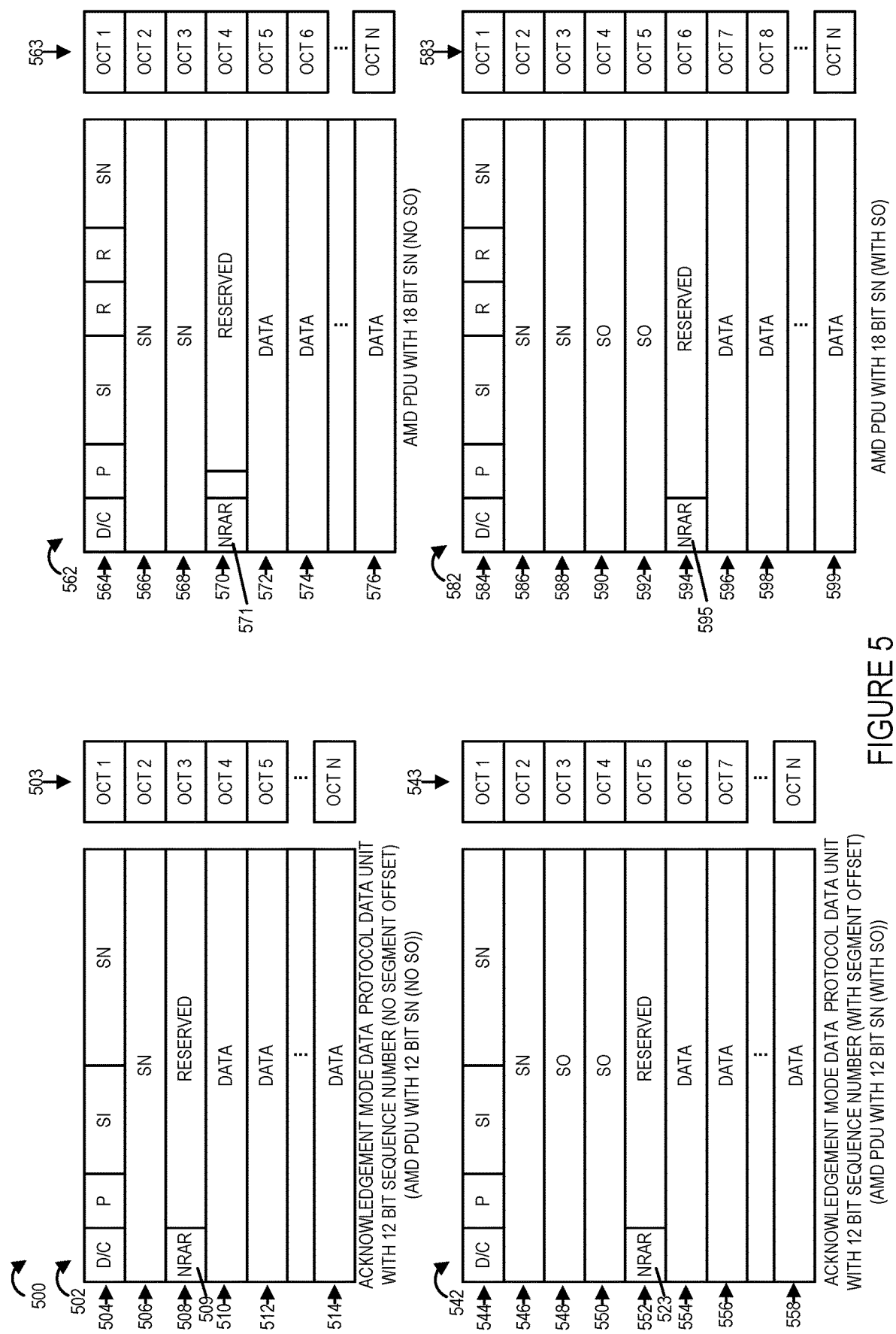
FIG. 5 is a drawing including four exemplary acknowledgment mode protocol data units, each including a 'No RLC ACK required (NRAR)' 1 bit field, in accordance with an exemplary embodiment.

FIG. 5 is a drawing 500 including four exemplary acknowledgment mode protocol data units (502, 542, 562, 582), each including a 'No RLC ACK required (NRAR)' 1 bit field (509, 523, 571, 595), in accordance with an exemplary embodiment.

Exemplary AM PDU 502 includes a 12 bit sequence number (SN) and does not include a segment offset (SO). Column 503, which corresponds to AM PDU 502, indicates that each row (504, 506, 508, 510, 512, . . . , 514) includes an octet of 8 bits. Octet 1 of row 504 includes a Data/Control (D/C) flag bit, a polling (P) bit, a 2 bit segment information field, and 4 bits for communicating part of the sequence number. Octet 2 of row 506 includes 8 bits for communicating part of the sequence number. Octet 3 of row 508 includes the 1 bit NRAR followed by 7 reserved bits. The additional rows (510, 512, . . . 514) convey data.

Exemplary AM PDU 542 includes a 12 bit sequence number and does include a segment offset. Column 543, which corresponds to AM PDU 542, indicates that each row (544, 546, 548, 550, 552, 554, 556, . . . , 558) includes an octet of 8 bits. Octet 1 of row 544 includes a Data/Control bit, a polling bit, a 2 bit segment information field, and 4 bits for communicating part of the sequence number. Octet 2 of row 546 includes 8 bits for communicating part of the sequence number. Octet 3 of row 548 includes 8 bit of the segment offset. Octet 4 of row 550 includes 8 bit of the segment offset. Octet 5 of row 552 includes the 1 bit NRAR followed by 7 reserved bits. The additional rows (554, 556, . . . , 558) convey data.

Exemplary AM PDU 562 includes an 18 bit sequence number (SN) and does not include a segment offset (SO). Column 563, which corresponds to AM PDU 562, indicates that each row (564, 566, 568, 570, 572, . . . , 574) includes an octet of 8 bits. Octet 1 of row 564 includes a Data/Control (D/C) flag bit, a polling (P) bit, a 2 bit segment information field, 2 reserved bits, and 2 bits for communicating part of the sequence number. Octet 2 of row 566 includes 8 bits for communicating part of the sequence number. Octet 3 of row 568 includes 8 bits for communicating part of the sequence number. Octet 4 of row 570 includes the 1 bit NRAR followed by 7 reserved bits. The additional rows (572, 574, . . . , 576) convey data.

Exemplary AM PDU 582 includes an 18 bit sequence number and does include a segment offset. Column 583, which corresponds to AM PDU 582, indicates that each row (584, 586, 588, 590, 592, 594, 596, 598, . . . , 599) includes an octet of 8 bits. Octet 1 of row 584 includes a Data/Control bit, a polling bit, a 2 bit segment information field, 2 reserved bits, and 2 bits for communicating part of the sequence number. Octet 2 of row 566 includes 8 bits for communicating part of the sequence number. Octet 3 of row 588 includes 8 bits for communicating part of the sequence number. Octet 4 of row 590 includes 8 bit of the segment offset. Octet 5 of row 592 includes 8 bit of the segment offset. Octet 6 of row 594 includes the 1 bit NRAR followed by 7 reserved bits. The additional rows (596, 598, . . . , 599) convey data.

An approach of disabling HARQ in all affected uplink and downlink procedures will now be described. In this category of solutions, the UE receives an explicit indication to skip HARQ feedback for one or more HARQ process IDs. In one aspect, for dynamic scheduling of DL, a new Downlink Control Information (DCI) field 'HARQ Off Indicator' is added to the following DCI formats, which is applicable to both TDD and FDD.

DCI format 1_0 (38.212 7.3.1.2.1) for Cell-Radio Network Temporary Identifier (C-RNTI), Configured Scheduling Radio Network Temporary Identifier (CS-RNTI) (set when 'Semi-Persistent Scheduling (SPS) HARQ Off Indicator' received in Resource Radio Control Information Element (RRC IE) 'SPS-Config').

DCI format 1_1 (38.212 7.3.1.2.1) for C-RNTI, CS-RNTI (set when 'SPS HARQ Off Indicator' received in RRC IE 'SPS-Config').

In various embodiments, the HARQ Off indictor is a 1 bit indicator, which is set when HARQ feedback is not required in response to the concerned transmission. If the HARQ Off indicator is set, then the HARQ process number field, and the Physical Downlink Shared CHannel (PDSCH)-to-HARQ feedback timing indicator field are ignored.

The corresponding UE behavior is as follows. When the UE decodes DCI format 1_0 or 1_1 with the HARQ Off indicator set, the UE shall not include HARQ-ACK in Uplink Control information (UCI) for Code Block Groups/Transport Blocks (CBGs/TBs) scheduled in that DCI.

Radio Resource Control Information Elements 'Semi-Persistent Scheduling-Config' (RRC IE 'SPS-Config') allows upper layers to inform lower layers of when and what configuration is to be used when applying SPS scheduling. In accordance with a feature of some embodiments, the HARQ disabling can be, and sometime is, performed semi-statically by adding an additional parameter, in accordance with a feature of the present invention, 'SPS HARQ Off Indicator' to the 'SPS-Config' RRC IE.

In the event of UL HARQ ACK/NACK reported by gNB/eNB, for e.g., in response to autonomous UL transmissions, the Autonomous Uplink—Uplink Control Information (AUL-UCI) that accompanies the Autonomous Uplink Physical Uplink Shared Channel (AUL PUSCH) indicates the disabling of UL HARQ feedback via a new parameter called 'AUL HARQ Off Indicator' which serves the same purpose.

In a second category of solutions, a specific value indicated via a higher layer parameter Slot-timing-value-K1 is used to indicate to the UE that HARQ feedback is not required whenever this value is received in DCI format 1_0 or 1_1 in the DCI field 'PDSCH-to-HARQ_feedback timing indicator'. Thus no additional field needs to be introduced in the DCI format itself.

Corresponding expected UE behavior, illustrated via change to TS 38.213 clauses 9.1.2, 9.1.3.1 is as follows: If the UE receives DCI format 1_0 or 1_1 scrambled with either C-RNTI or CS-RNTI with PDSCH-to-HARQ_feedback timing indicator set to [X], then the UE shall not include HARQ-ACK in UCI for Code Block Groups/Transport Blocks (CBGs/TBs) scheduled in that Downlink Control Information (DCI). Alternatively, UE always reports and ACK.

Another solution, which will now be described, includes ignoring HARQ-ACK even when a HARQ-ACK is received in the affected UL+DL procedures. In this category of solutions, no explicit changes are made to the DL/UL scheduling and HARQ feedback procedures at Layer 1 (L1). Instead, novel gNB and UE implementations are utilized. For the case of DL HARQ, the gNB scheduler is assumed to know, via OA & M configuration, which HARQ processes are used for TCP ACK. In this case, HARQ feedback for that HARQ processes is ignored by the gNB even if it is transmitted by the UE. UE ends up transmitting one or more acknowledgement bits, but the overhead is small when compared to the overall size of uplink control information (UCI) (considering HARQ ACK/NCK for other processes+ CSI feedback). A similar concept is applicable for UL HARQ ACK/NACK for Autonomous Uplink (AUL) Physical Uplink Shared Channel (PUSCH).

Another solution, which will now be described, includes changing the MAC functioning such that HARQ process ID does not get assigned to identified Transport Blocks (TBs) for which HARQ ACK/NACK is to be disabled. Two alternative designs are described below.

In a first alternative approach, a new dedicated HARQ process, similar to broadcast HARQ process, different to the HARQ processes available to MAC layer, is used. At the MAC layer, the MAC HARQ entity directs HARQ information and associated TBs received on the DL-SCH to the corresponding HARQ processes (NR uses 16 HARQ processes). Each time a TB is successfully decided, the MAC instructs the physical layer to generate acknowledgments(s) of the data in the TB, unless it is a broadcast transmission (which is mapped to broadcast HARQ process), or if the timing alignment time has expired. In accordance with a feature of some embodiments, a new HARQ process category id is defined and used for such flows for which suppression of ACK/NACK is desired, which also does not trigger generation of AC/NACK at the physical layer, similar to the broadcast HARQ process [captured in TS 38.321].

In a second alternative approach, existing HARQ processes are repurposed. New Radio (NR) allows the use of up to 16 HARQ processes. In some exemplary embodiments, of the present invention, the following are included: (i) K HARQ process IDs are designated to be used to mean "No HARQ ACK/NAK" expected for the given TB(s) such that K is controlled by a new 4-bit RRC IE 'HARQ Process ID for HARQ Suppression'; ii) a new 4-bit RRC IE 'HARQ Process ID for HARQ Suppression in DL' is used to indicate which HARQ process IDs are to be used for TB(s) received in DL direction which do not require HARQ feedback to sender; and iii) a new 4-bit RRC IE 'HARQ Process ID for HARQ Suppression in UL' is used to indicate which HARQ process IDs are to be used in UL direction for TB(s) identified to not require HARQ feedback from receiver.

Figure 6:
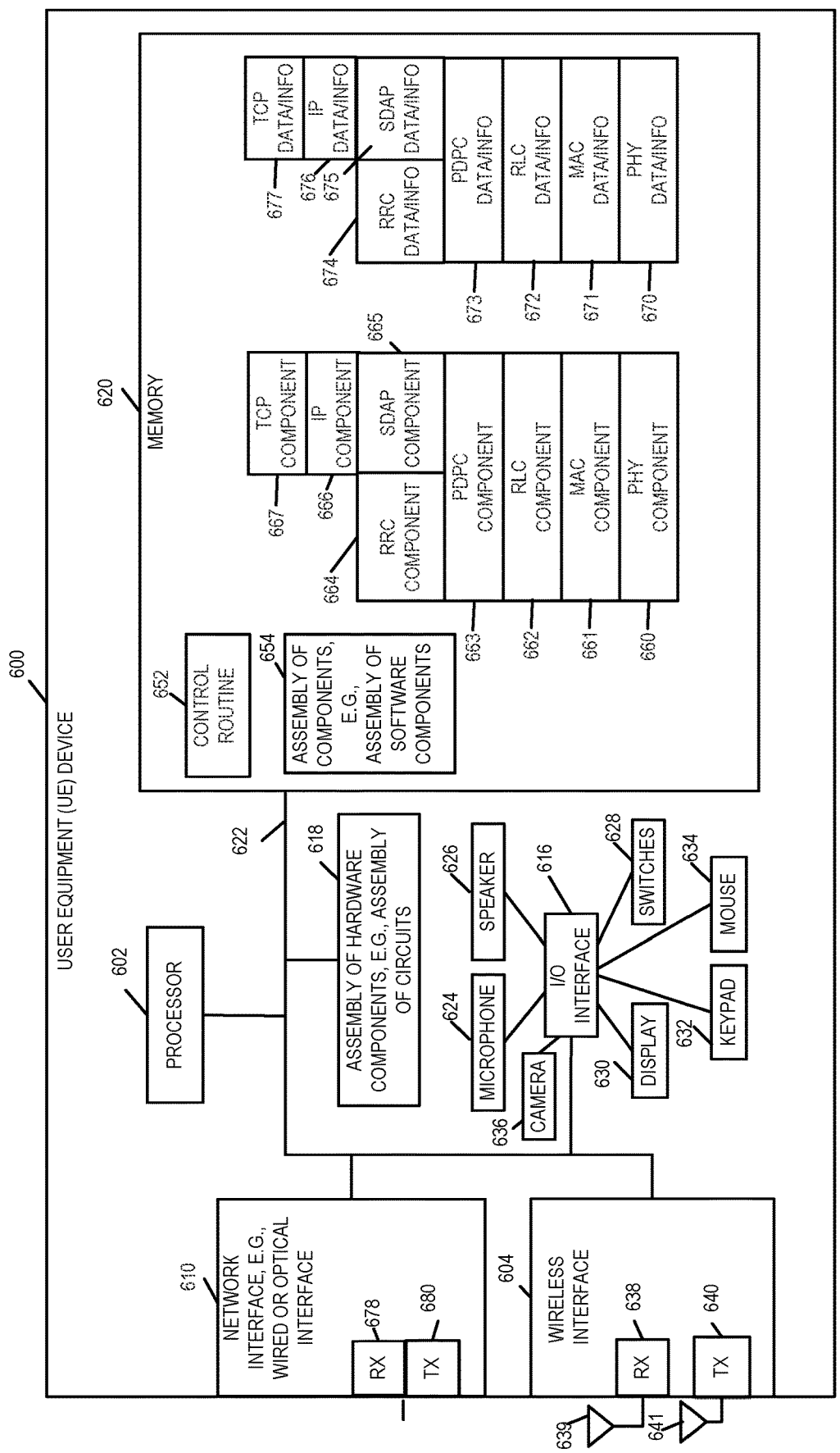
FIG. 6 is a drawing of an exemplary user equipment (UE) device in accordance with an exemplary embodiment.

FIG. 6 is a drawing of an exemplary user equipment (UE) device 600 in accordance with an exemplary embodiment. UE device 600 includes a processor 602, a wireless interface 604, a network interface 610, an I/O interface 616, an assembly of hardware components 616, e.g., an assembly of circuits, and memory 620 coupled together via a bus 622 over which the various elements may interchange data and information. Wireless interface 604 includes a wireless receiver 638 coupled to receive antenna 639, via which the UE may receive wireless signals, e.g., wireless downlink signals from a base station, e.g., a gNB. Wireless interface 604 includes a wireless transmitter 640 coupled to transmit antenna 641, via which the UE may transmit wireless signals, e.g., wireless uplink signals to a base station, e.g., a gNB. Network interface 610, e.g., a wired or optical interface 610 includes a receiver 678 and a transmitter 680.

UE device 600 further includes a microphone 624, a speaker 626, switches 628, a mouse 634, a keypad 632, a display 630 and a camera 636 coupled to I/O interface 616, via which the various input/output devices (624, 626, 628, 630, 632, 634, 636) may communicate with the other elements (602, 604, 610, 618, 620) of the UE device.

Memory 620 includes a control routine 652, an assembly of components 654, e.g., an assembly of software components, a TCP component 667, TCP data/information 677, an IP component 666, IP data/information 676, an RRC component 664, RRC data/information 674, an SDAP component 665, SDAP data/information 675, a PDPC component 663, PDPC data/information 673, an RLC component 662, RLC data/information 672, a MAC component 661, MAC data/information 671, a PHY component 660, PHY data/information 670.

Figure 14:
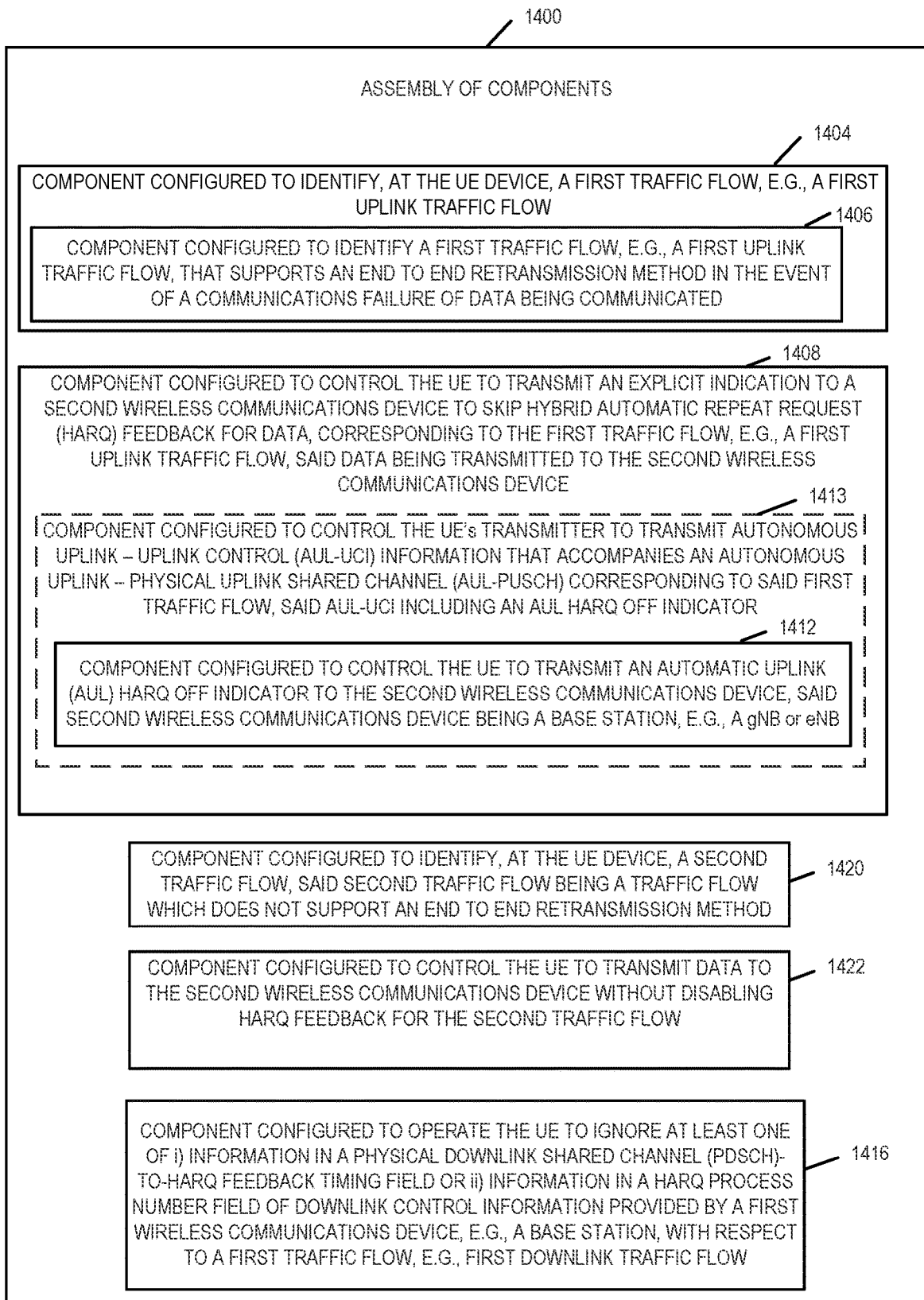
FIG. 14 is a drawing of an exemplary assembly of components which may be included in a wireless communications device, e.g., a UE such as the UE of FIG. 6, and implement steps of an exemplary method, e.g., steps of the method of the flowchart of FIG. 12.
Figure 17:
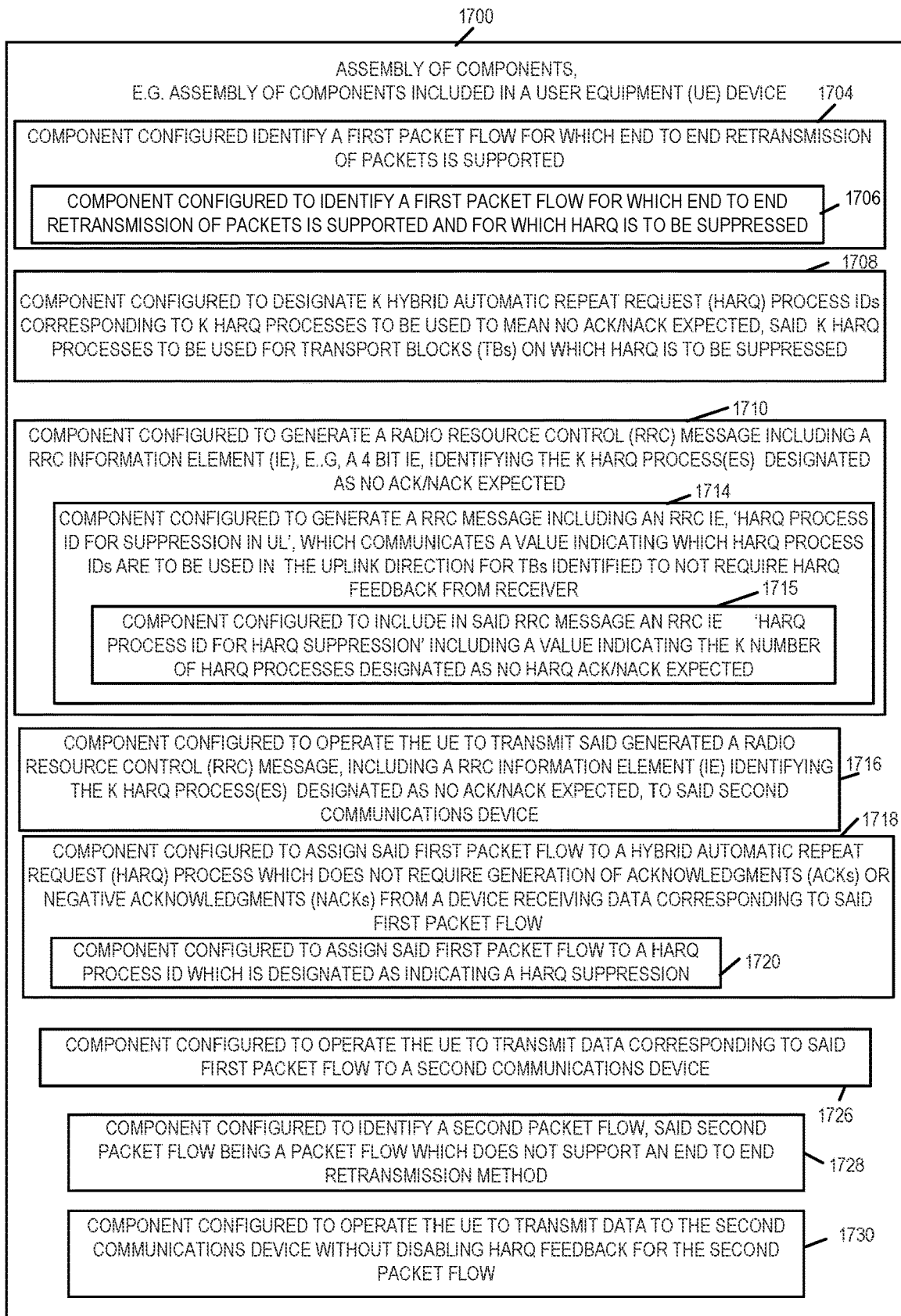
FIG. 17 is a drawing of an exemplary assembly of components which may be included in a wireless communications device, e.g., a UE such as the UE of FIG. 6, and implement steps of an exemplary method, e.g., steps of the method of the flowchart of FIG. 15.
Figure 20:
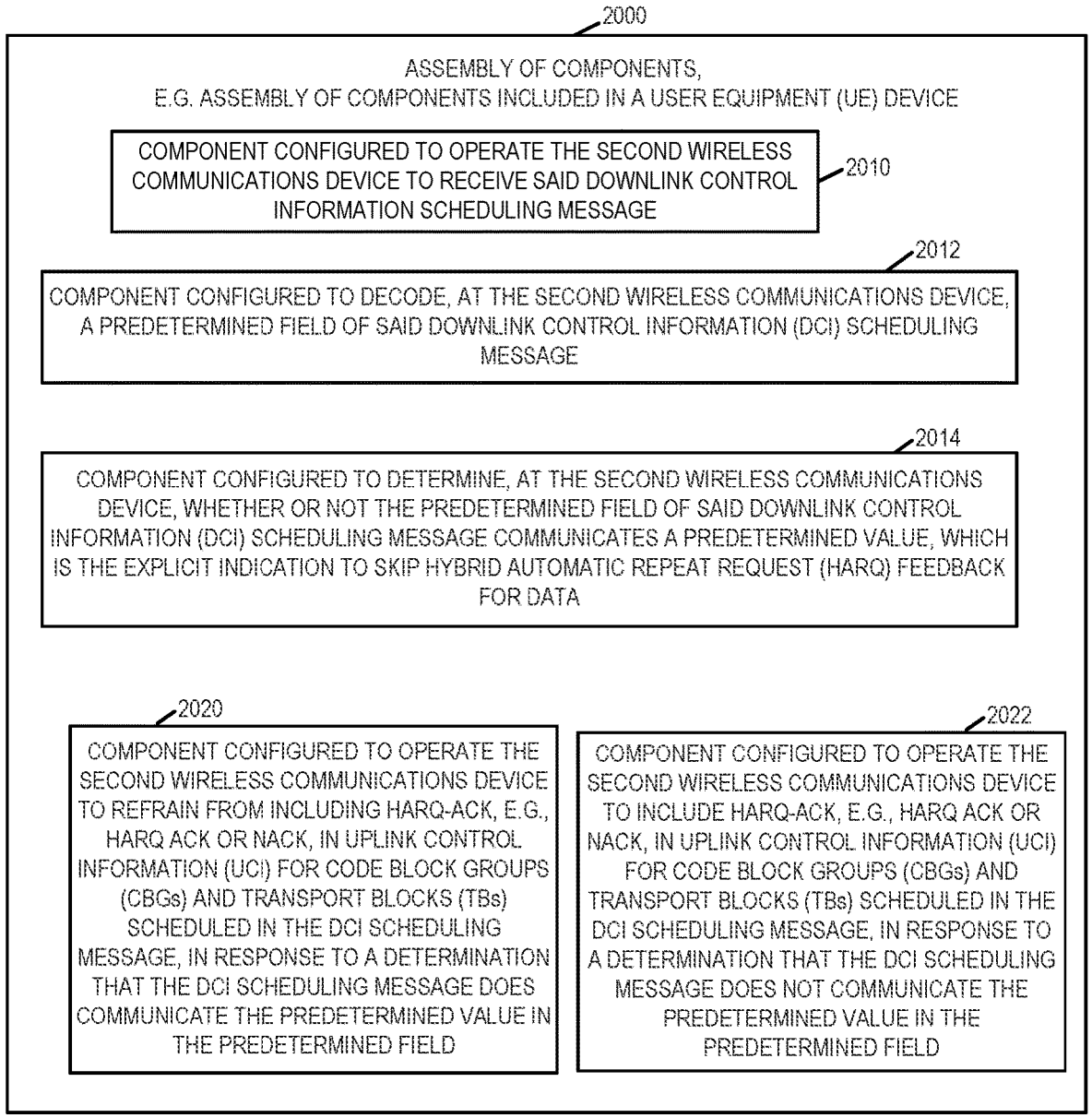
FIG. 20 is a drawing of an exemplary assembly of components which may be included in a wireless communications device, e.g., a UE such as the UE of FIG. 6, and implement steps of an exemplary method, e.g., steps of the method of the flowchart of FIG. 18.
Figure 24:
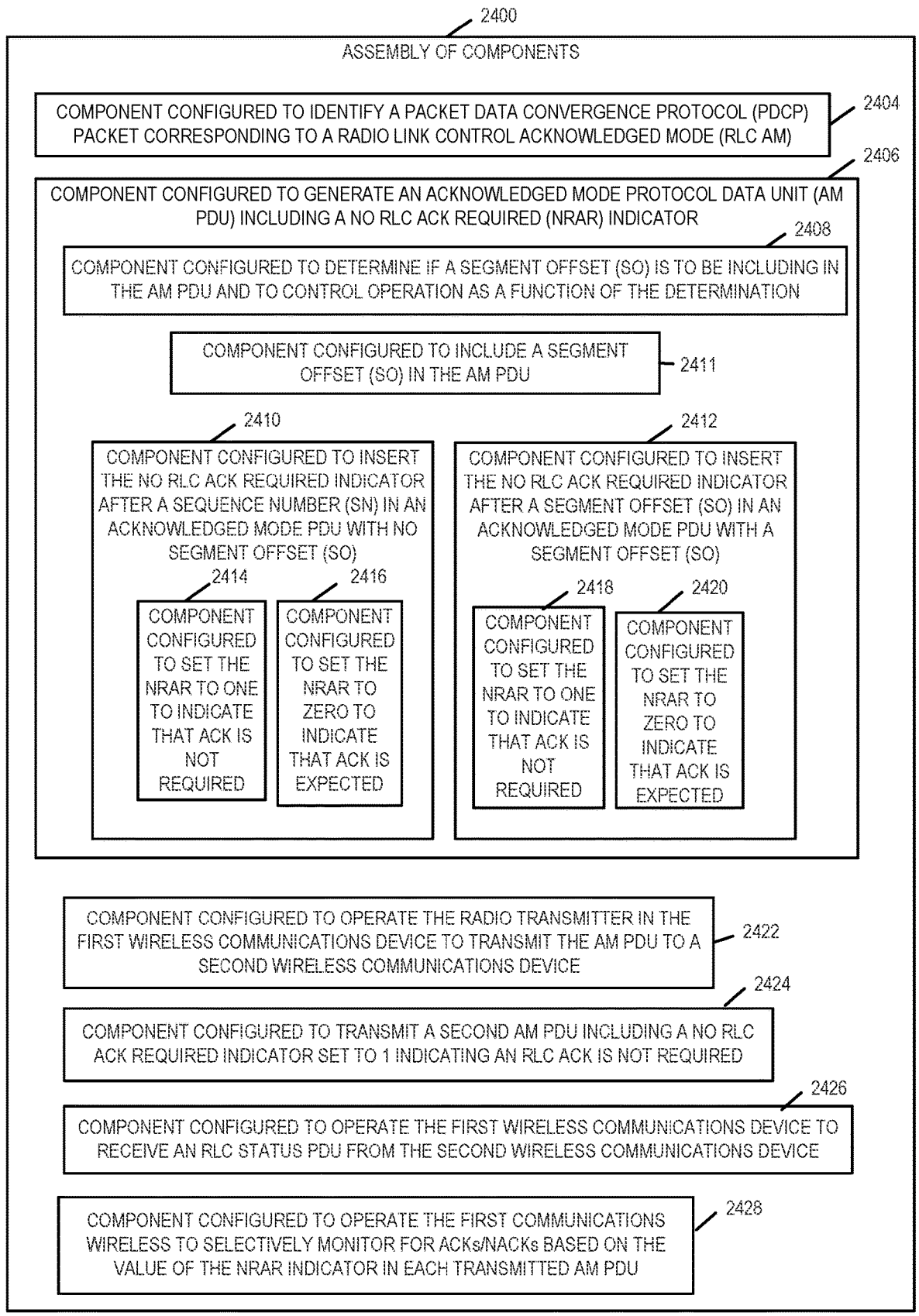
FIG. 24 is a drawing of an exemplary assembly of components which may be included in a first wireless communications device, e.g., a base station such as the exemplary base station of FIG. 7 or a UE such as the exemplary UE of FIG. 6, and implement steps of an exemplary method, e.g., steps of the method of the flowchart of FIG. 23.

In some embodiments, UE device 600 includes one or more or all of assembly of components 1400 of FIG. 14, assembly of components 1700 of FIG. 17, assembly of components 2000 of FIG. 20, and assembly of components 2400 of FIG. 24.

Figure 7:
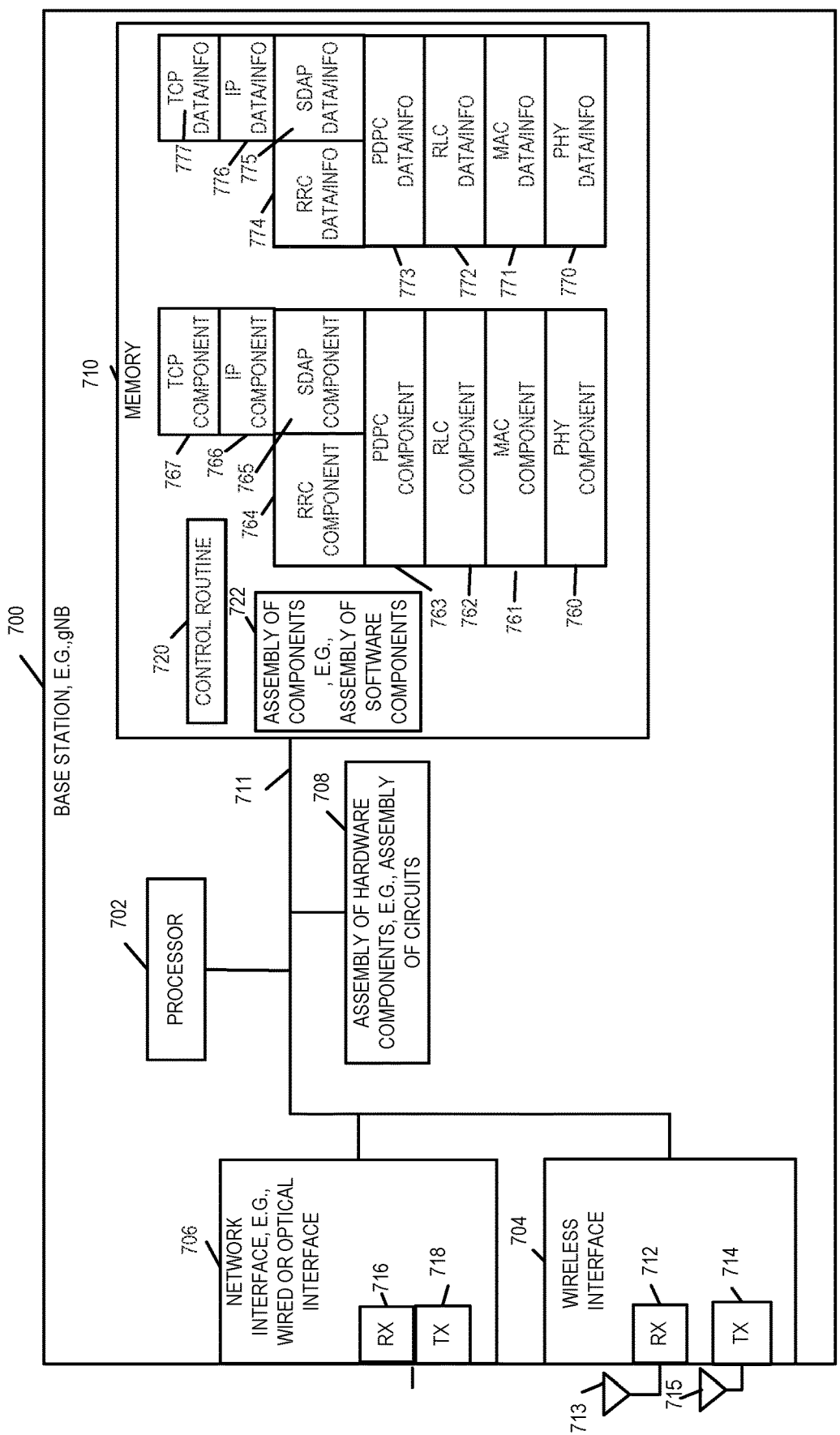
FIG. 7 is a drawing of an exemplary base station, e.g., a gNB or eNB, in accordance with an exemplary embodiment.

FIG. 7 is a drawing of an exemplary base station 700, e.g., a gNB or eNB, in accordance with an exemplary embodiment. Base station 700 includes a processor 702, a wireless interface 704, a network interface 706, an assembly of hardware components 708, e.g., an assembly of circuits, and memory 710 coupled together via a bus 711 over which the various elements may interchange data and information. Wireless interface 704 includes a wireless receiver 712 coupled to receive antenna 713, via which the base station 700 may receive wireless signals, e.g., wireless uplink signals from a UE device. Wireless interface 704 further includes a wireless transmitter 714 coupled to transmit antenna 715, via which the base station may transmit wireless signals, e.g., wireless downlink signals to a UE device. Network interface 706, e.g., a wired or optical interface 610 includes a receiver 716 and a transmitter 718.

Memory 710 includes a control routine 720, an assembly of components 722, e.g., an assembly of software components, a TCP component 767, TCP data/information 777, an IP component 766, IP data/information 776, an RRC component 765, RRC data/information 774, an SDAP component 765, SDAP data/information 775, a PDPC component 763, PDPC data/information 773, an RLC component 762, RLC data/information 772, a MAC component 761, MAC data/information 771, a PHY component 760, PHY data/information 770.

Figure 13:
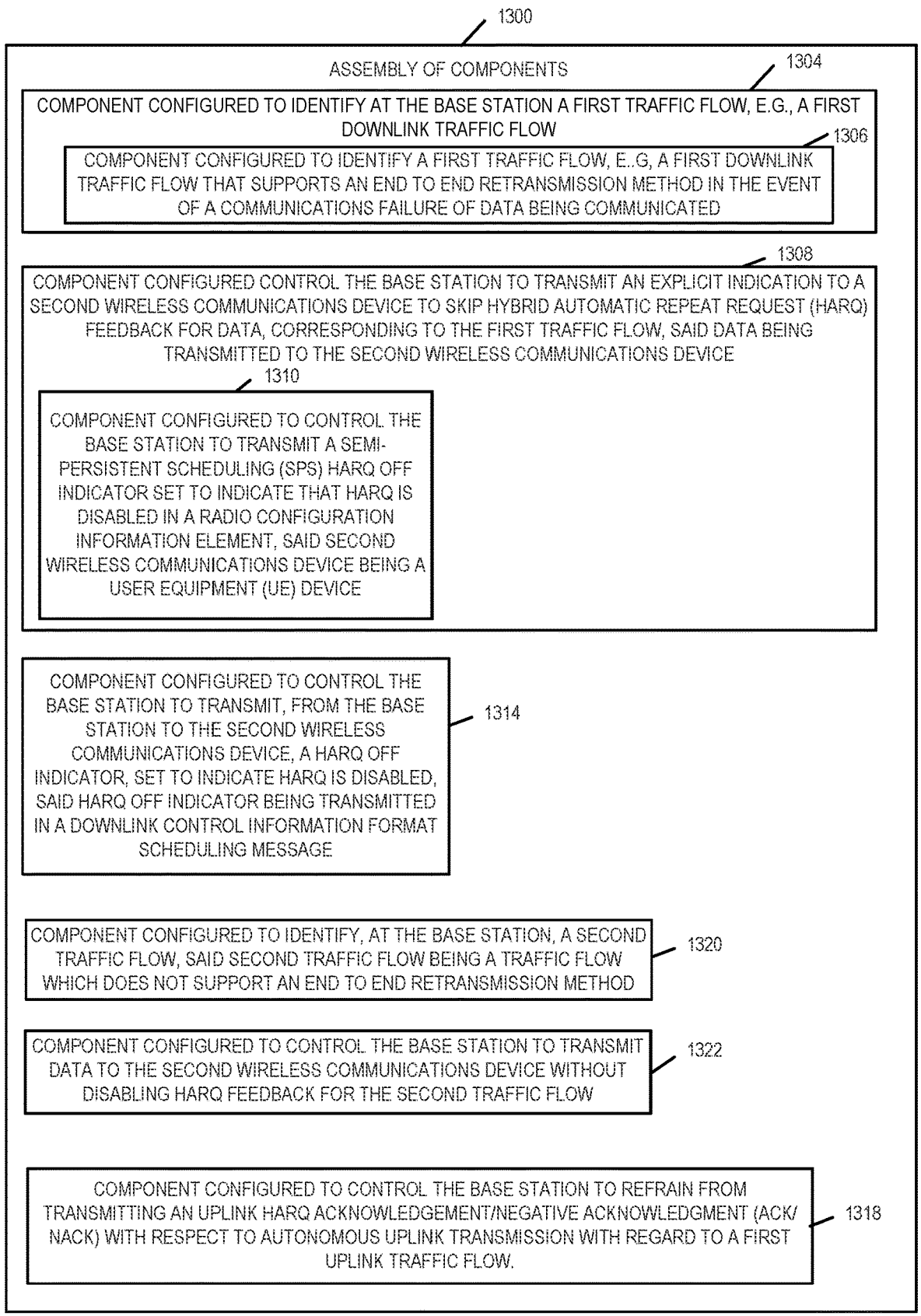
FIG. 13 is a drawing of an exemplary assembly of components which may be included in a wireless communications device, e.g., a base station such as the exemplary base station of FIG. 7, and implement steps of an exemplary method, e.g., steps of the method of the flowchart of FIG. 12.
Figure 16:
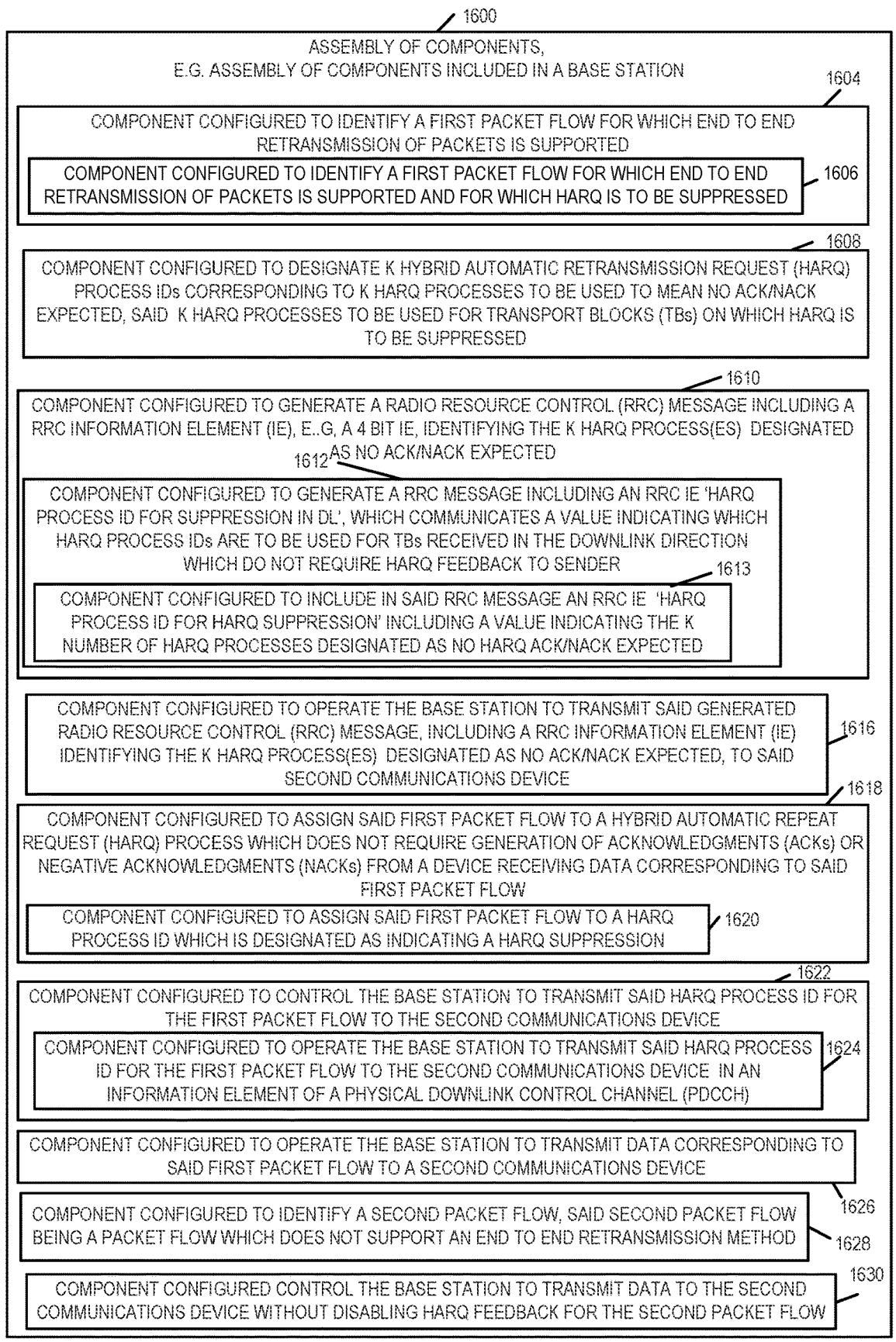
FIG. 16 is a drawing of an exemplary assembly of components which may be included in a wireless communications device, e.g., a base station such as the exemplary base station of FIG. 7, and implement steps of an exemplary method, e.g., steps of the method of the flowchart of FIG. 15.
Figure 19:
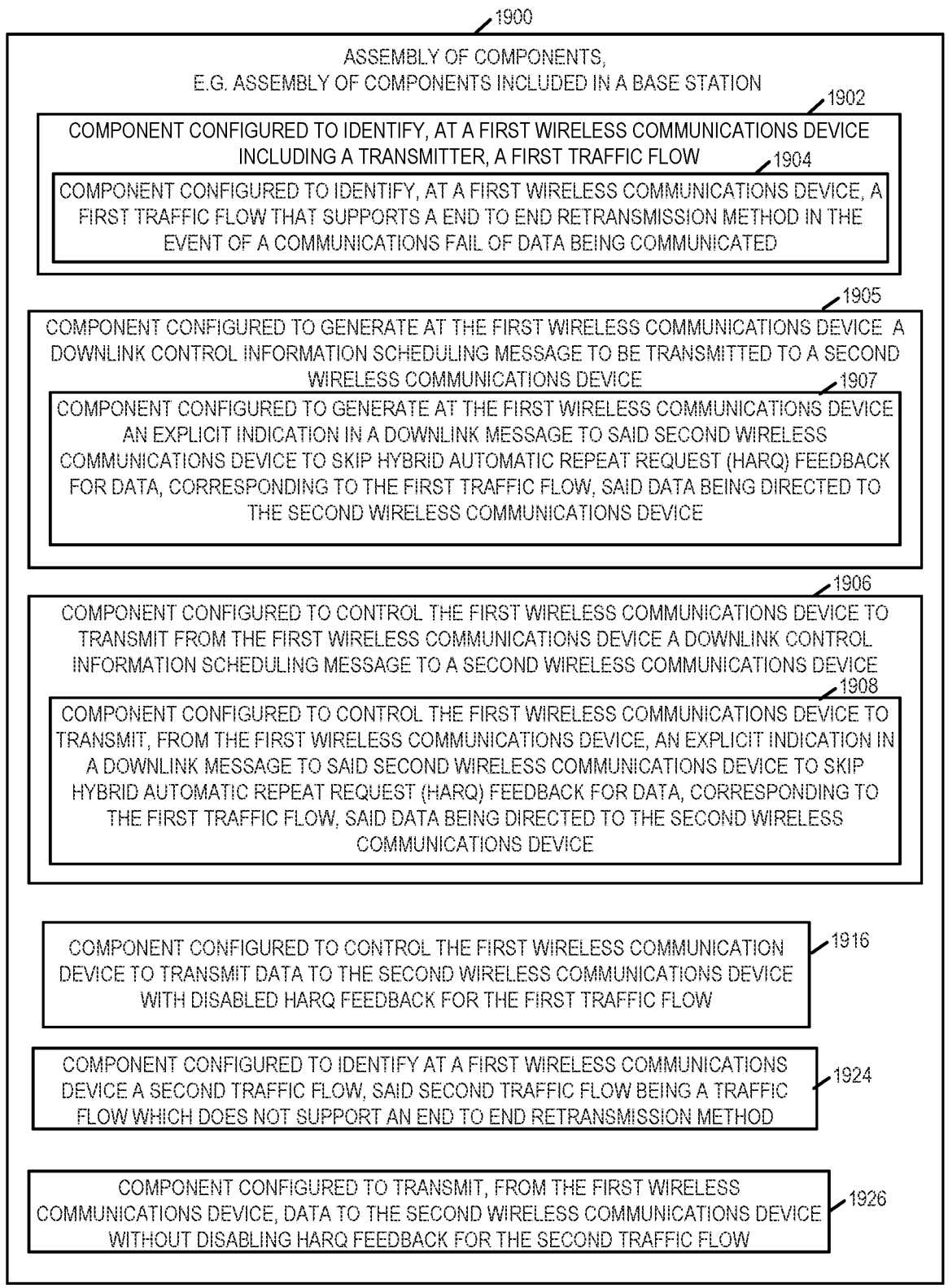
FIG. 19 is a drawing of an exemplary assembly of components which may be included in a wireless communications device, e.g., a base station such as the exemplary base station of FIG. 7, and implement steps of an exemplary method, e.g., steps of the method of the flowchart of FIG. 18.
Figure 22:
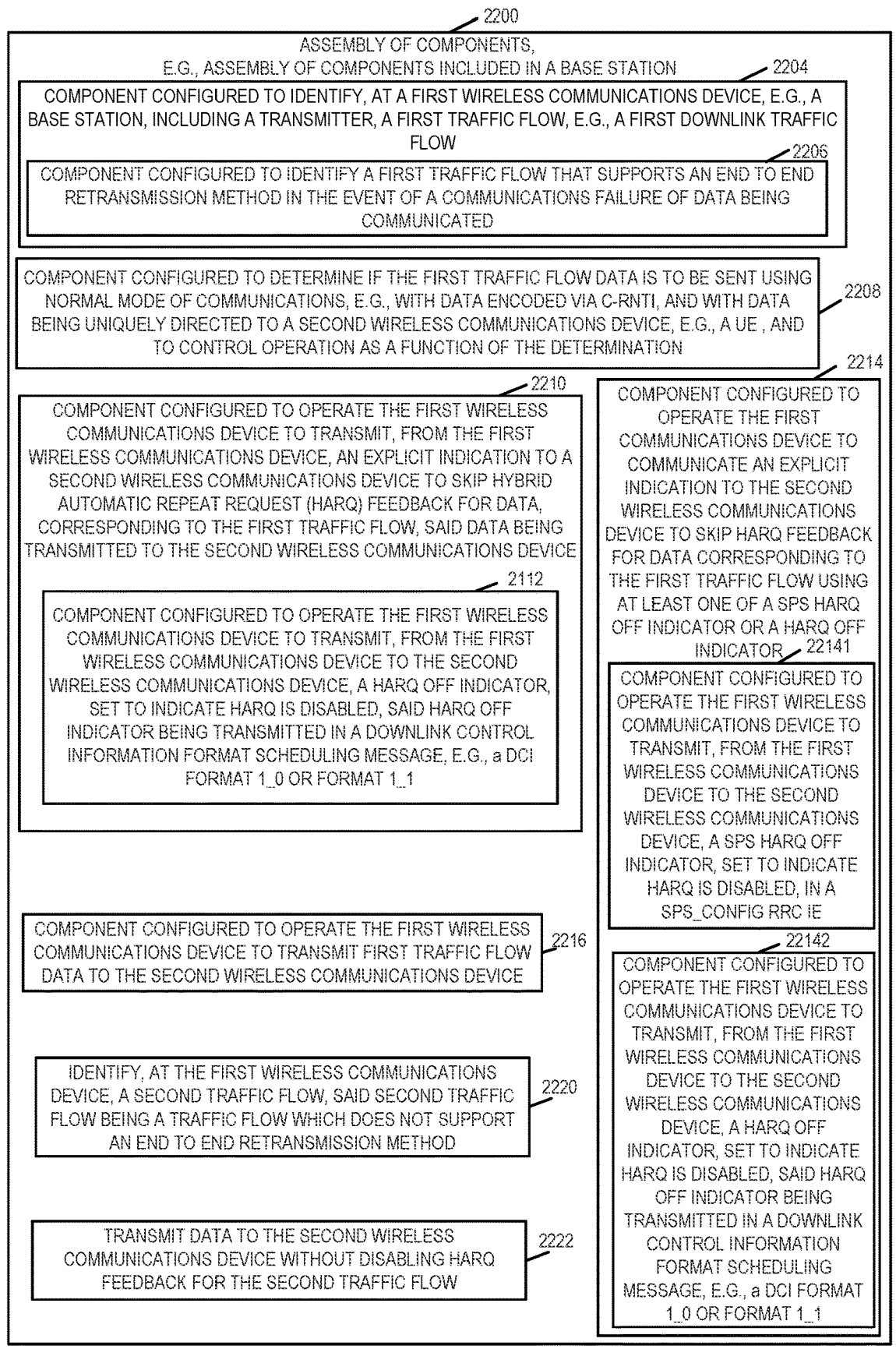
FIG. 22 is a drawing of an exemplary assembly of components which may be included in a wireless communications device, e.g., a base station such as the exemplary base station of FIG. 7, and implement steps of an exemplary method, e.g., steps of the method of the flowchart of FIG. 21.

In some embodiments, base station 700 includes one or more or all of assembly of components 1300 of FIG. 13, assembly of components 1600 of FIG. 16, assembly of components 1900 of FIG. 19, assembly of components 2200 of FIG. 22, and assembly of components 2400 of FIG. 24.

Figure 8:
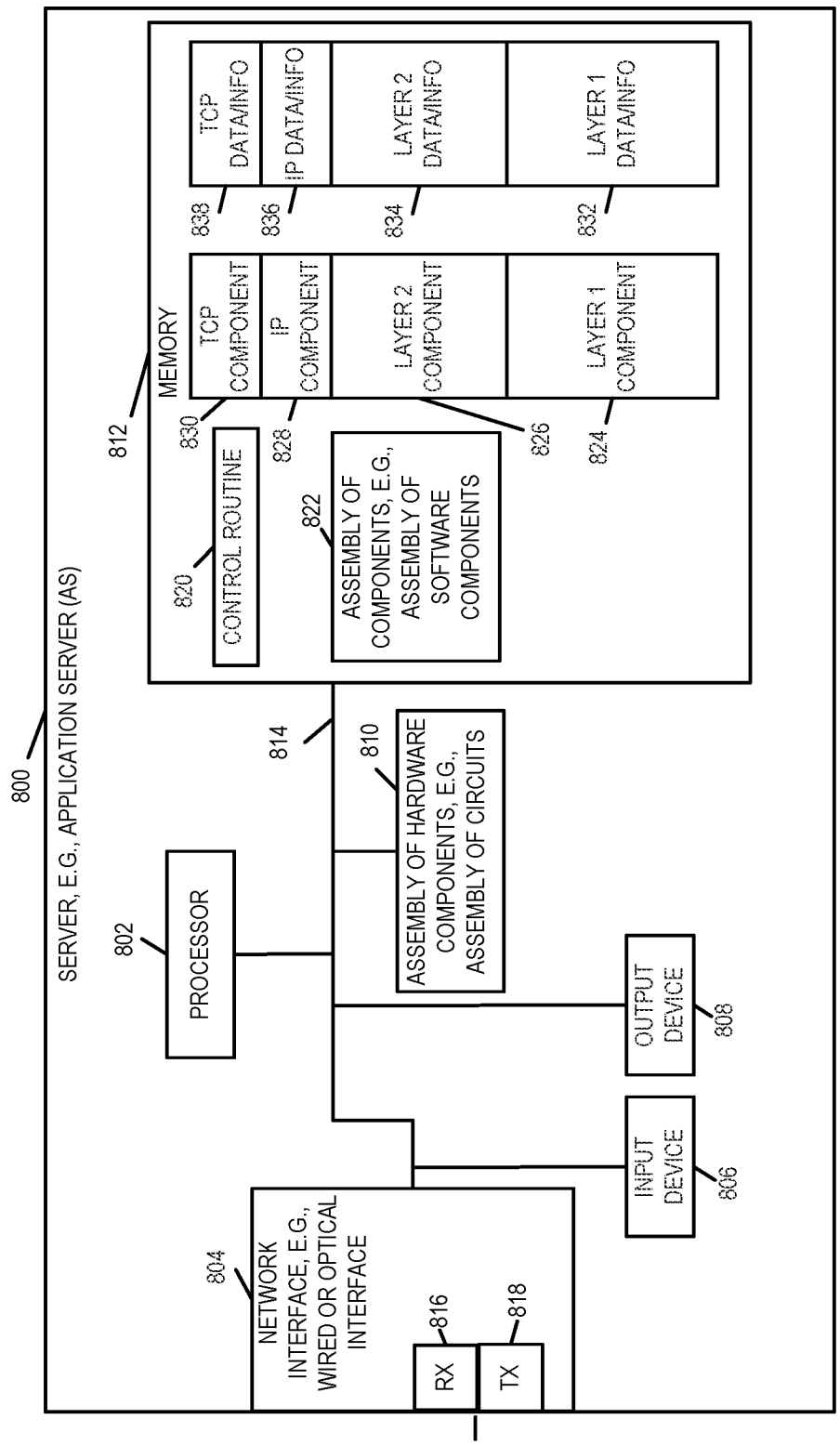
FIG. 8 is a drawing of an exemplary server, e.g., an Application server (AS) in accordance with an exemplary embodiment.

FIG. 8 is a drawing of an exemplary server 800, e.g., an Application Server (AS), in accordance with an exemplary embodiment. Server 800 includes a processor 802, a network interface 804, an input device 806, e.g., a keyboard, an output device 808, e.g., a display, an assembly of hardware components 810, e.g., an assembly of circuits, and memory 812 coupled together via a bus 814 over which the various elements may interchange data and information. Network interface 804, e.g., a wired or optical interface, includes a receiver 816 and a transmitter 818, via which server 800 may communicate with other devices, e.g., a base station, a core network element, etc., via a backhaul network.

Memory 812 includes a control routine 820, an assembly of components 822, e.g., an assembly of software components, a TCP component 830, TCP data/information 838, an IP component 828, IP data/information 836, layer 2 components 826, layer 2 data/information 834, layer 1 components 824, and layer 1 data/information 832.

Figure 9:
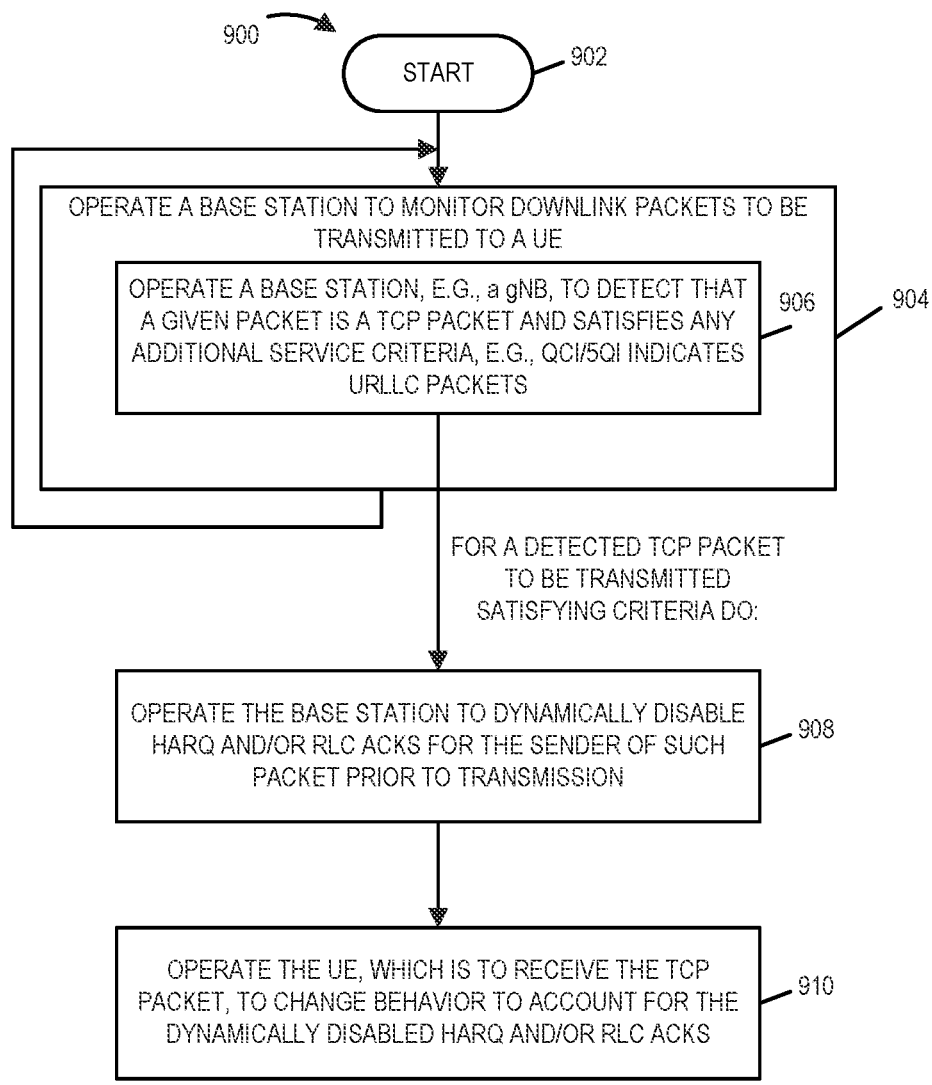
FIG. 9 is a flowchart of an exemplary method of operating a communications system, e.g., a communications system including a base station, e.g., a gNB or eNB, and a user equipment (UE) device, to disable Hybrid Automatic Repeat Request (HARQ) and/or Radio Link Control (RLC) ACKs for an identified traffic flow, e.g., a identified TCP traffic flow supporting ACK which satisfies an additional service criteria, e.g., Quality Control Indicator (QCI)/5QI indicating ultra-reliable low latency communication (URLLC) in downlink in accordance with an exemplary embodiment.

FIG. 9 is a flowchart 900 of an exemplary method of operating a communications system, e.g., a communications system including a base station, e.g., a gNB or eNB, and a user equipment (UE) device, to disable Hybrid Automatic Repeat Request (HARQ) and/or Radio Link Control (RLC) ACKs for an identified traffic flow, e.g., a identified TCP traffic flow supporting ACK which satisfies an additional service criteria, e.g., Quality Control Indicator (QCI)/5QI indicating ultra-reliable low latency communication (URLLC) in downlink in accordance with an exemplary embodiment. Operation starts in step 902 in which the communications system is powered on and initialized. Operation proceeds from start step 902 to step 904.

In step 904, the base station is operated to monitor downlink packets to be transmitted to the UE. Step 904 is performed on an ongoing basis. Step 904 includes step 906, in which the base station is operated to detect that a given packet is a TCP packet and satisfies any additional service criteria, e.g., QCI/5QI indicating URLLC packets. Operation proceeds from step 906 to step 908.

In step 908, the base station is operated to dynamically disable HARQ and/or RLC ACKs for the sender of such packet prior to transmission. Operation proceeds from step 908 to step 910.

In step 910, the UE, which is to receive the TCP packet, is operated to change its behavior to account for the dynamically disabled HARQ and/or RLC ACKs.

Figure 10:
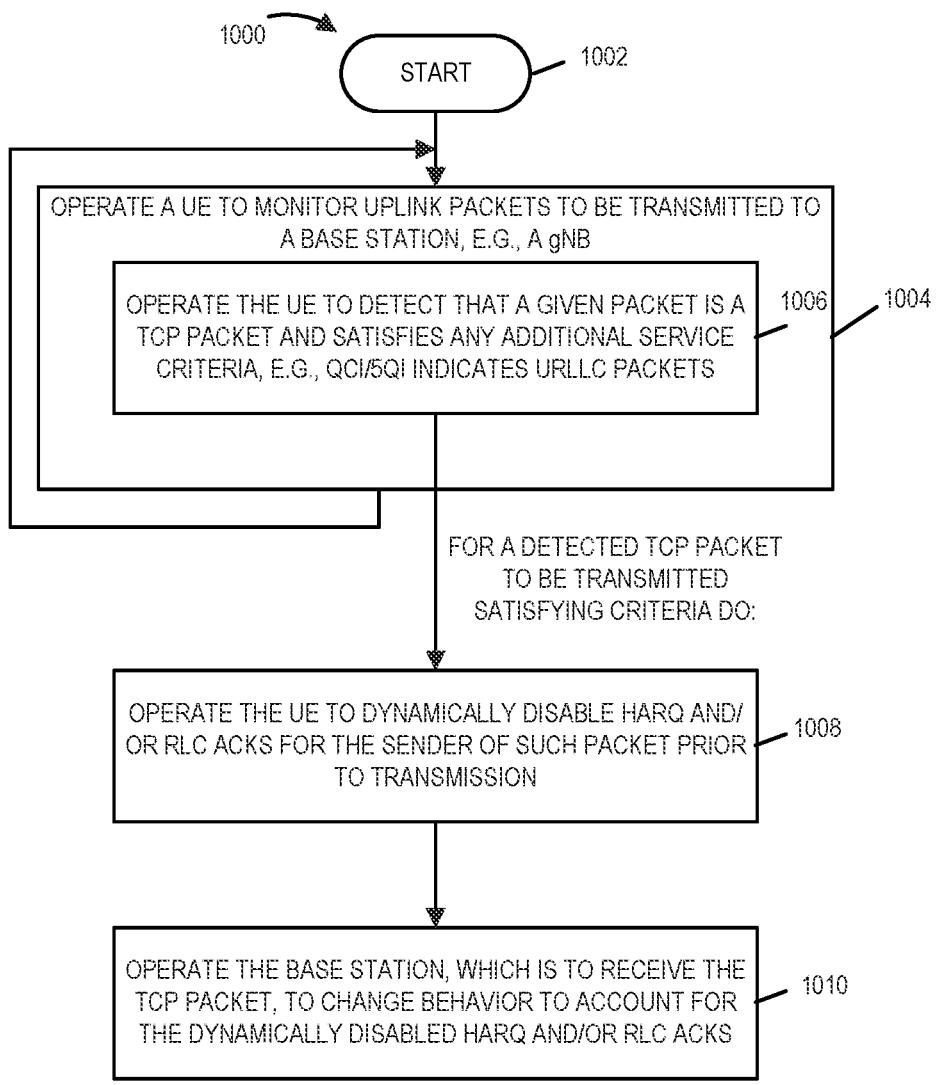
FIG. 10 is a flowchart of an exemplary method of operating a communications system, e.g., a communications system including a base station, e.g., a gNB or eNB, and a user equipment (UE) device, to disable Hybrid Automatic Repeat Request (HARQ) and/or Radio Link Control (RLC) ACKs for an identified traffic flow, e.g., a identified TCP traffic flow supporting ACK which satisfies an additional service criteria, e.g., Quality Control Indicator (QCI)/5QI indicating ultra-reliable low latency communication (URLLC) in uplink in accordance with an exemplary embodiment.

FIG. 10 is a flowchart 1000 of an exemplary method of operating a communications system, e.g., a communications system including a base station, e.g., a gNB or eNB, and a user equipment (UE) device, to disable Hybrid Automatic Repeat Request (HARQ) and/or Radio Link Control (RLC) ACKs for an identified traffic flow, e.g., a identified TCP traffic flow supporting ACK which satisfies an additional service criteria, e.g., Quality Control Indicator (QCI)/5QI indicating ultra-reliable low latency communication (URLLC) in uplink in accordance with an exemplary embodiment. Operation starts in step 1002 in which the communications system is powered on and initialized. Operation proceeds from start step 1002 to step 1004.

In step 1004, the UE is operated to monitor uplink packets to be transmitted to the base station. Step 1004 is performed on an ongoing basis. Step 1004 includes step 1006, in which the base station is operated to detect that a given packet is a TCP packet and satisfies any additional service criteria, e.g., QCI/5QI indicating URLLC packets. Operation proceeds from step 1006 to step 1008.

In step 1008, the UE is operated to dynamically disable HARQ and/or RLC acks for the sender of such packet prior to transmission. Operation proceeds from step 1008 to step 1010.

In step 1010, the base station, which is to receive the TCP packet, is operated to change its behavior to account for the dynamically disabled HARQ and/or RLC ACKs.

Figure 11:
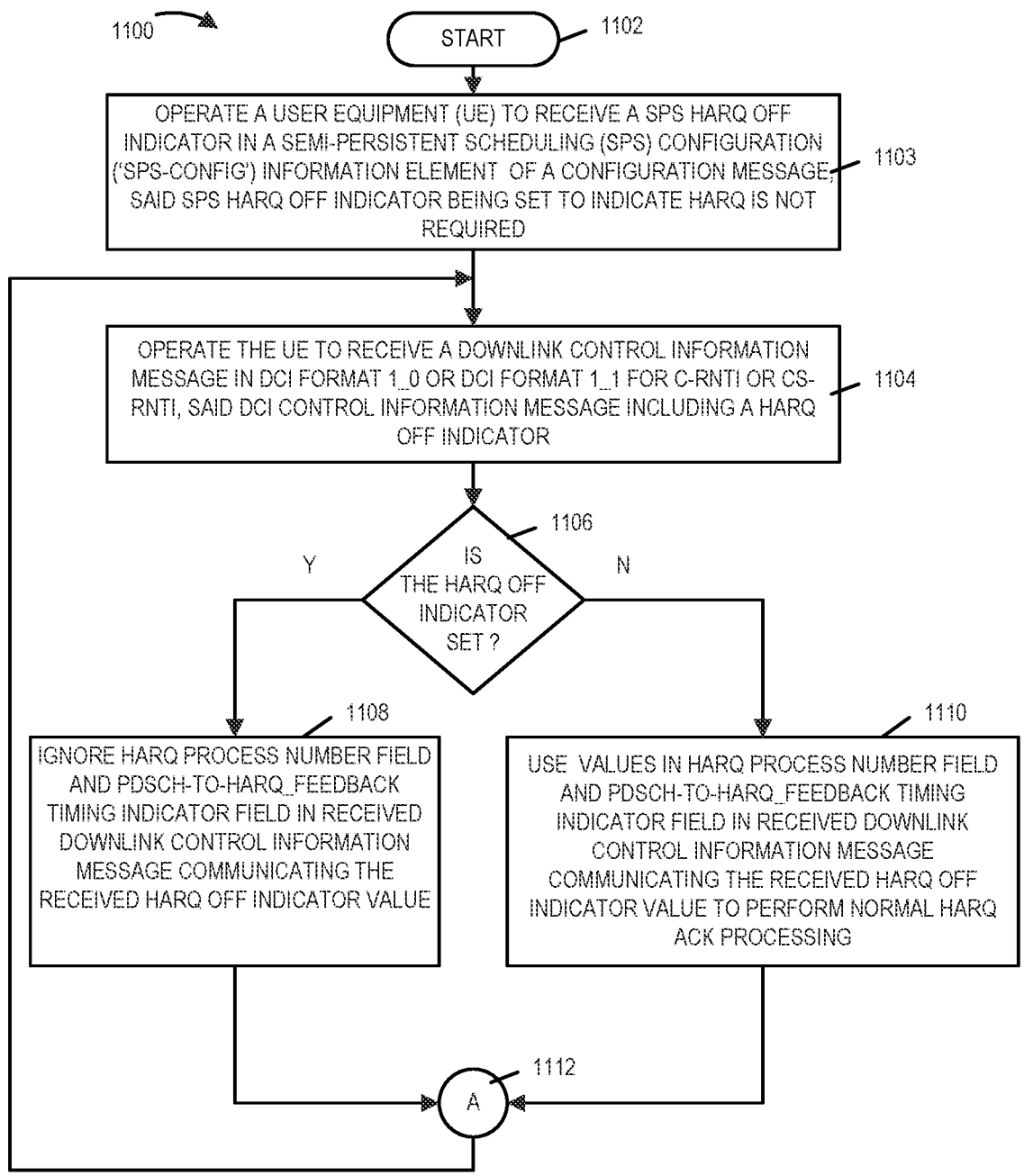
FIG. 11 is a flowchart of an exemplary method of operating a UE device in a communications system, e.g., a new radio (NR) or LTE communications system supporting selective disabling of HARQ ACK/NACK, e.g., for identified TCP downlink traffic flows, satisfying predetermined criteria, in accordance with an exemplary embodiment.

FIG. 11 is a flowchart 1100 of an exemplary method of operating a UE device in a communications system, e.g., a new radio (NR) or LTE communications system supporting selective disabling of HARQ ACK/NACK, e.g., for identified TCP downlink traffic flows, satisfying predetermined criteria, in accordance with an exemplary embodiment. Operation starts in step 1102 in which the UE is powered on and initialized. Operation proceeds from start step 1102 to step 1103.

In step 1103 the UE is operated to receive a SPS HARQ Off indicator in a Semi-Persistent Scheduling (SPS) Configuration ('SPS-Config') information element (IE) of a configuration message, said SPS HARQ Off Indicator being set to indicate that HARQ is not required. In some embodiments, the SPS HARQ Off Indicator is a 1 bit indicator. Operation proceeds from step 1103 to step 1104.

In step 1104 the UE is operated to receive a downlink control information messages, e.g., a scheduling message, in DCI format 1_0 (for TDD) or DCI format 1_1 (for FDD) for C-RNTI or CS-RNTI, said DCI control information message including a HARQ Off Indicator. In some embodiments, the HARQ Off Indicator is a 1 bit indicator. Operation proceeds from step 1104 to step 1106.

In step 1106, if the HARQ Off Indicator is set, then operation proceeds from step 1106 to step 1108. In step 1108 the UE ignores the HARQ process number field and Physical Downlink Shared Channel (PDSCH)-to-HARQ feedback timing indicator field in the received downlink control information message communicating the received HARQ Off Indicator value. Step 1108 causes the UE to refrain from transmitting a HARQ ACK/NACK corresponding to the communicated downlink traffic scheduled by the downlink control information of step 1104.

In step 1106, if the HARQ Off Indicator is not set, e.g., value=0, then operation proceeds from step 1106 to step 1110 in which the UE uses values in the HARQ process number field and PDSCH-to-HARQ feedback timing indicator field in the received downlink control information message communicating the received HARQ Off Indicator value to perform normal HARQ acknowledgement processing.

Operation proceeds from step 1108 or step 1110 via connecting node A 1112 to step 1104.

Figure 12:
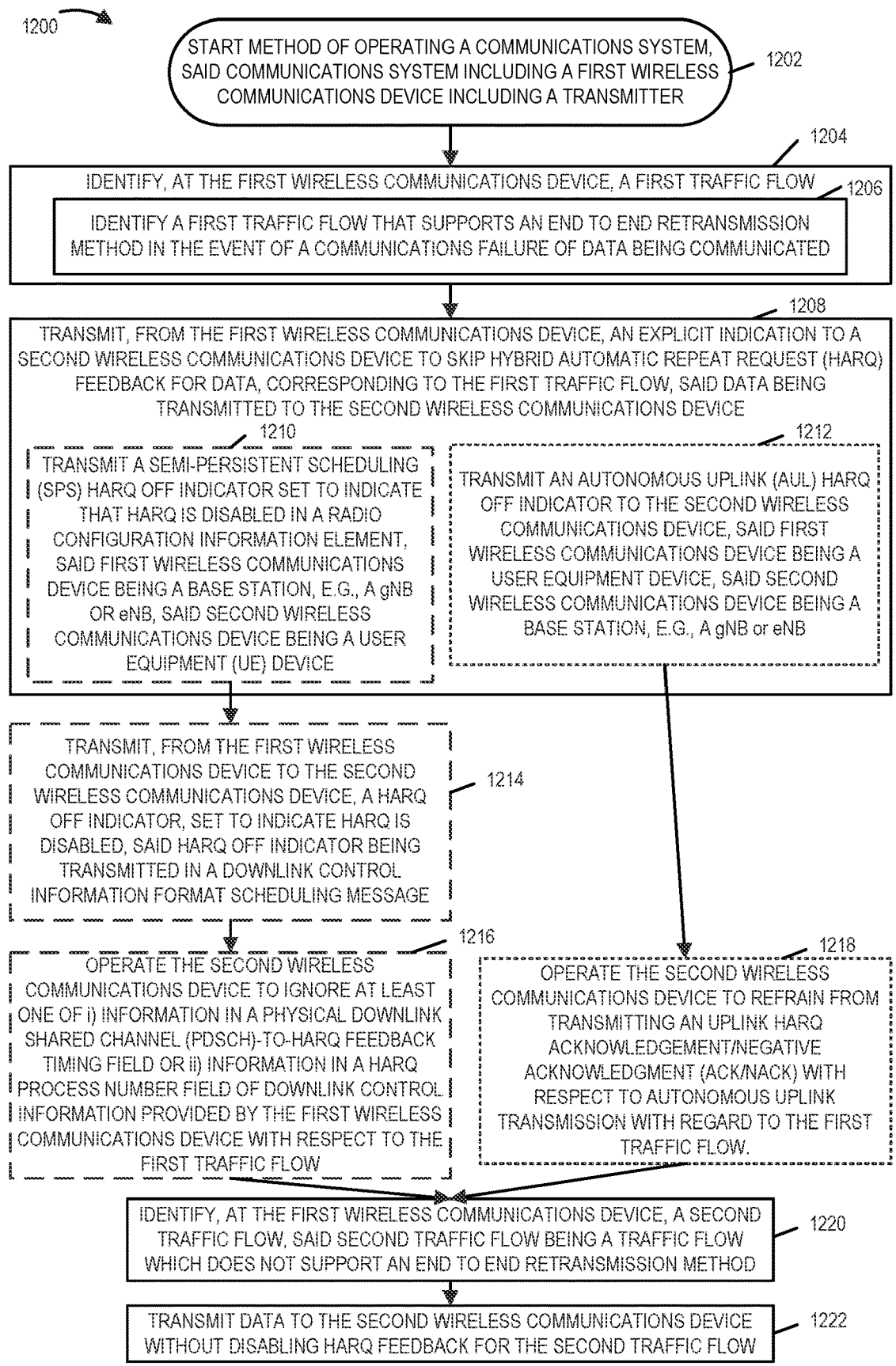
FIG. 12 is a flowchart of an exemplary method of operating a communications system in accordance with an exemplary embodiment, said method including disabling Hybrid Automatic Repeat Request (HARQ) in selected traffic flows.

FIG. 12 is a flowchart 1200 of an exemplary method of operating a communications system in accordance with an exemplary embodiment, said communications system including a first wireless communications device including a transmitter. In various embodiments, the communications system includes a second wireless communications device. In some embodiments, the first wireless communications device is a base station, e.g., a gNB or an eNB, and the second wireless communications device is a user equipment device (UE), said base station and said UE device implemented in accordance with various features and/or aspects of the present invention. In some other embodiments, the first wireless communications device is a user equipment device (UE), and second wireless communications device is a base station, e.g., a gNB or an eNB, and, said UE device and said base station implemented in accordance with various features and/or aspects of the present invention. Operation starts in step 1202 in which the communications system is powered on and initialized. Operation proceeds from start step 1202 to step 1204.

In step 1204, the first wireless communications device identifies, at the first wireless communications device, a first traffic flow. Step 1204 includes step 1206 in which the first wireless communications device identifies a first traffic flow that supports an end to end re-transmission method in the event of a communications failure of data being communicated. Operation proceeds from step 1204 to step 1208.

In step 1208 the first wireless communications device transmits, from the first wireless communications device, an explicit indication to the second wireless communications device to skip Hybrid Automatic Repeat Request (HARQ) feedback for data, corresponding to the first traffic flow, said data being transmitted to the second wireless communications device. Step 1208 includes step 1210 or step 1212, depending upon the exemplary embodiment. Step 1210 is included for an embodiment in which the first wireless communications device is a base station, e.g., a first base station; the second wireless communications device, e.g., a UE, is a device which includes a wireless receiver for receiving data from the first base station; and the first traffic flow is a downlink traffic flow. Step 1212 is included for an embodiment in which the first wireless communications device, e.g., a UE, includes a transmitter for transmitting to a base station; the second wireless communications device is a base station which includes a wireless receiver for receiving data from the first wireless communications device, e.g., the UE; and the first traffic flow is an uplink traffic flow.

In step 1210 the first wireless communications device, which is a base station, e.g., a gNB or eNB, transmits a Semi-Persistent Scheduling (SPS) HARQ Off Indicator set to indicate that HARQ is disabled in a radio configuration information element, e.g., in radio resource control (RRC) information element (IE) 'SPS-Config'. In some embodiments, the SPS HARQ Off Indicator is a one bit value set to a predetermined value, e.g., 1, when HARQ is disabled. Operation proceeds from step 1210 to step 1214.

In step 1214 the first wireless communications device, which is a base station, transmits from the first wireless communications device to the second wireless communications device, a HARQ Off Indicator, set to indicate HARQ is disabled, said HARQ Off Indicator being transmitted in a downlink control information (DCI) format, e.g., DCI format 1_0 or DCI format 1_1, scheduling message. In some embodiments, the HARQ Off Indicator is a one bit value set to a predetermined value, e.g., 1, when HARQ is disabled. Operation proceeds from step 1214 to step 1216.

In step 1216 the second wireless communications device, which is a UE, is operated to ignore at least one of: i) information in a Physical Downlink Shared Channel (PDSCH)-to-HARQ feedback timing indicator field or ii) information in a HARQ process number field of downlink control information provided by the first wireless communications device with respect to the first traffic flow.

Returning to step 1212, in step 1212, the first wireless communications device, which is a UE device, transmits an Autonomous Uplink (AUL) HARQ Off Indicator to the second wireless communications device, which is a base station. In various embodiments, the AUL HARQ Off Indicator is a one bit value set to a value indicating that HARQ is disabled with respect to the first traffic flow, e.g., AUL HARQ Off Indicator=1 indicates HARQ is disabled with respect to the first traffic flow.

Operation proceeds from step 1212 to step 1218. In step 1218, the second wireless communications device, which is a base station, is operated to refrain from transmitting an uplink HARQ acknowledgment/negative acknowledgment (ACK/NACK) with respect to autonomous uplink transmission with regard to the first traffic flow.

Operation proceeds from step 1216 or step 1218 to step 1220. In step 1220 the first wireless communications device, identifies at the first wireless communications device, a second traffic flow, said second traffic flow being a traffic flow which does not support an end to end re-transmission method. Operation proceeds from step 1220 to step 1222. In step 1222 the first wireless communications device is operated to transmit data to the second wireless communications device without disabling HARQ feedback for the second traffic flow.

FIG. 13 is a drawing of an exemplary assembly of components 1300 which may be included in a wireless communications device, e.g., a base station such as the exemplary base station 700 of FIG. 7, and implement steps of an exemplary method, e.g., steps of the method of the flowchart 1200 of FIG. 12.

Assembly of components 1300 can be, and in some embodiments is, used in base station 700, e.g., a gNB or eNB, of FIG. 7 or base station 406 or base station 408 of FIG. 4. The components in the assembly of components 1300 can, and in some embodiments are, implemented fully in hardware within the processor 702, e.g., as individual circuits. The components in the assembly of components 1300 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or eNB, with the components controlling operation of the base station to implement the functions corresponding to the components when the components are executed by a processor, e.g., processor 702. In some such embodiments, the assembly of components 1300 is included in the memory 710 as assembly of components 722. In still other embodiments, various components in assembly of components 1300 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 1300 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 1300 includes various components that perform functions of corresponding one or more described and/or illustrated steps of an exemplary method, e.g., steps of the method of flowchart 1200 of FIG. 12 and/or described or shown with respect to any of the other figures.

Assembly of components 1300 includes a component 1204 configured to identify at the base station a first traffic flow, e.g., a first downlink traffic flow. Component 1304 includes a component 1306 configured to identify a first traffic flow, e.g., a first downlink traffic flow that supports end to end retransmission method in the event of a communications failure of data being communicated. Assembly of components 1300 further includes a component 1308 configured to control the base station to transmit an explicit indication to a second wireless communications device to skip Hybrid Automatic Repeat Request (HARQ) feedback for data, corresponding to the first traffic flow, said data being transmitted to the second wireless communications device. Component 1308 includes a component 1310 configured to control the base station to transmit a semi-persistent scheduling (SPS) HARQ Off Indicator set to indicate that HARQ is disabled, said SPS HARQ Off Indicator being sent in a radio configuration information element, said second wireless communications device being a user equipment (UE) device. In some embodiments, the SPS HARQ Off indicator is a one bit value set to a predetermined value, e.g., 1, when HARQ is disabled.

Assembly of components 1300 further includes a component 1314 configured to control the base station to transmit, from the base station to the second wireless communications device, a HARQ Off Indicator set to indicate that HARQ is disabled, as HARQ Off Indicator being transmitted in a downlink control information format scheduling message. In some embodiments, the HARQ Off Indicator is a one bit value set to a predetermined value, e.g., 1, when HARQ is disabled. In some embodiments, the DCI format is one of a DCI format 1_0 or a DCI format 1_1.

Assembly of components 1300 further includes a component 1320 configured to identify, at the base station, a second traffic flow, said second traffic flow being a traffic flow which does not support an end to end retransmission method, a component 1322 configured to control the base station to transmit data to the second wireless communications device without disabling HARQ feedback for the second traffic flow, and a component 1318 configured to control the base station to refrain from transmitting an uplink HARQ acknowledgment/negative acknowledgment (ACK/NACK) with respect to autonomous uplink transmission with regard to a first uplink traffic flow.

FIG. 14 is a drawing of an exemplary assembly of components 1400 which may be included in a wireless communications device, e.g., a UE such as the UE 600 of FIG. 6, and implement steps of an exemplary method, e.g., steps of the method of the flowchart 1200 of FIG. 12.

Assembly of components 1400 can be, and in some embodiments is, used in UE device 600 of FIG. 6 or UE 402 or UE 404 of FIG. 4. The components in the assembly of components 1400 can, and in some embodiments are, implemented fully in hardware within the processor 602, e.g., as individual circuits. The components in the assembly of components 1400 can, and in some embodiments are, implemented fully in hardware within the assembly of components 618, e.g., as individual circuits corresponding to the different components. In other embodiments some of the components are implemented, e.g., as circuits, within the processor 602 with other components being implemented, e.g., as circuits within assembly of components 618, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 620 of the UE 600, with the components controlling operation of the UE 600 to implement the functions corresponding to the components when the components are executed by a processor, e.g., processor 602. In some such embodiments, the assembly of components 1400 is included in the memory 620 as assembly of components 654. In still other embodiments, various components in assembly of components 1400 are implemented as a combination of hardware and software, e.g., with another circuit external to the processor providing input to the processor 602 which then under software control operates to perform a portion of a component's function. While processor 602 is shown in the FIG. 6 embodiment as a single processor, e.g., computer, it should be appreciated that the processor 602 may be implemented as one or more processors, e.g., computers.

When implemented in software the components include code, which when executed by the processor 602, configure the processor 602 to implement the function corresponding to the component. In embodiments where the assembly of components 1400 is stored in the memory 620, the memory 620 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the UE 600, or elements therein such as the processor 602, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method, e.g., steps of the method of flowchart 1200 of FIG. 12 and/or described or shown with respect to any of the other figures.

Assembly of components 1400 includes a component 1404 configured to identify at the UE device, a first traffic flow, e.g., a first uplink traffic flow. Component 1404 includes a component 1406 configured to identify a first traffic flow, e.g., a first uplink traffic flow, that supports an end to end retransmission method in the event of a communications failure of data being communicated. Assembly of components 1400 further includes a component 1408 configured to control the UE to transmit an explicit indication to a second wireless communications device, e.g., a base station such as a gNB or eNB, to skip Hybrid Automatic Repeat Request (HARQ) feedback for data, corresponding to the first traffic flow, e.g., a first uplink traffic flow, said data being communicated to the second wireless device. Component 1408 includes a component 1412 configured to control the UE to transmit an automatic uplink (AUL) HARQ Off Indicator to the second wireless communications device, said second wireless communications device being a base station, e.g., a gNB or eNB. In some embodiments, assembly of components includes a component 1413 configured to control a transmitter in the UE device to transmit autonomous uplink-uplink control information (AUL-UCI) that accompanies an autonomous uplink-physical uplink shared channel (AUL-PUSCH) corresponding to said first traffic flow, said AUL-UCI including an AUL HARQ Off Indicator. In some embodiments, component 1413 includes component 1212. In some embodiments the automatic uplink HARQ Off Indicator is referred to as an autonomous uplink HARQ Off Indicator.

In some embodiments, the AUL HARQ Off Indicator is a one bit indicator. In some such embodiments, when the value of the AUL HARQ Off Indicator is set to 1, the AUL HARQ Off Indicator indicates that the HARQ is disabled with respect to the first traffic flow, and when the value of the AUL HARQ Off Indicator is set to 0, the AUL HARQ Off indicator indicates that HARQ is enabled with respect to the first traffic flow.

Assembly of components 1400 further includes a component 1420 configured to identify, at the UE device, a second traffic flow, said second traffic flow being a traffic flow which does not support an end to end retransmission method, a component 1422 configured to control the UE to transmit data to the second wireless communications device without disabling HARQ feedback for the second traffic flow, an a component 1416 configured to operate the UE to ignore at least one of: i) information in a physical downlink shared channel (PDSCH)-to-HARQ Feedback Timing field or ii) information in a HARQ process number field of downlink control information provided by a first wireless communications device, e.g., a base station, with respect to a first traffic flow, e.g., a first downlink traffic flow.

Figure 15:
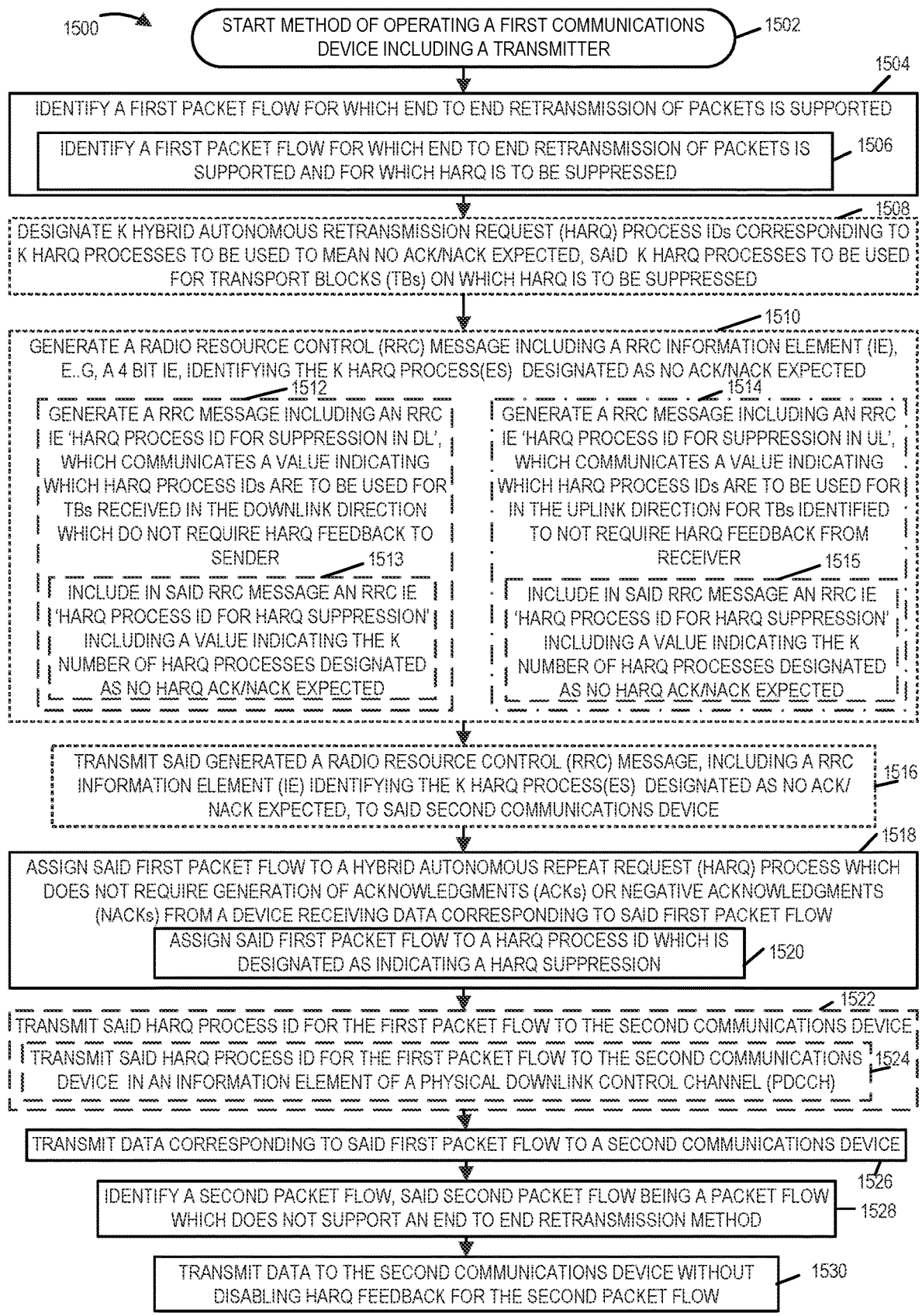
FIG. 15 is a flowchart of an exemplary method of operating a first communications device including a transmitter in accordance with various exemplary embodiments, said method including disabling Hybrid Automatic Repeat Request (HARQ) in selected traffic flows.

FIG. 15 is a flowchart 1500 of an exemplary method of operating a first communications device including a transmitter in accordance with various exemplary embodiments. In some exemplary embodiments, the first communications device is a base station, e.g., a gNB or an eNB. In some other embodiments, the first communications device is a user equipment (UE) device. Operation starts in step 1502 in which the first communications device is powered on and initialized. Operation proceeds from step 1502 to step 1504, in which the first communications device identifies a first packet flow for which end to end retransmission of packets is supported. Step 1504 includes step 1506 in which the first communications device identifies a first packet flow for which end to end retransmission of packets is supported and for which Hybrid Automatic Repeat Request (HARQ) is to be suppressed, e.g., a TCP packet flow supporting ACK which meets certain criteria, e.g., QCI/5QI indicating ultra-reliable low latency communications (URLLC) packets or another criteria. In some embodiments, e.g., some embodiments in which some of the HARQ processes are dedicated to be no ACK/NACK expected processes, operation proceeds from step 1504 to step 1518. In other embodiments, e.g., some embodiments in which the first communications device can, and sometimes does, repurpose, e.g., dynamically repurpose, HARQ processes, operation proceeds from step 1504 to step 1508.

In step 1508, the first communications device designates K Hybrid Automatic Repeat Request (HARQ) process IDs, corresponding to K HARQ processes, said K HARQ process IDs being used to mean no ACK/NACK expected, said K HARQ processes to be used for Transport Blocks (TBs) on which HARQ is to be suppressed. Operation proceeds from step 1508 to step 1510.

In step 1510 the first communications device generates a radio resource control (RRC) message including a RRC information element (IE), e.g., a 4 bit IE, identifying the K HARQ processes designated as No ACK/NACK expected. In some embodiments, RRC information element (IE) identifying the K HARQ processes designated as a No ACK/NACK expected, is a four bit information element.

In some such embodiments, K is an integer in the range of {0 . . . 15}. In some such embodiments, K is an integer in the range of {1 . . . 15}. In some such embodiments, K is an integer in the range of {1 . . . 16}.

In some embodiments, the first communications is a base station, e.g., a gNB or eNB, the first packet flow is a downlink packet flow, and step 1510 includes step 1512. In step 1512 the first communications device generates a radio resource control message including an RRC IE 'HARQ process ID for suppression in DL', which communicates a value indicating which HARQ process IDs are to be used for TBs received in the downlink direction which do not require HARQ feedback to the sender. In some embodiments, the RRC IE' HARQ process ID for HARQ SUPPRESSION in DL' is a four bit information element. In some such embodiments, step 1512 includes step 1513 in which the first communications device includes in said RRC message an RRC IE 'HARQ process ID for HARQ SUPPRESSION' including a value indicating the K number of HARQ processes designated as No HARQ ACK/NACK expected. In some embodiments, the RRC IE 'HARQ process ID for HARQ SUPPRESSION' is a four bit information element.

In some embodiments, the first communications is a UE, the first packet flow is an uplink packet flow, and step 1510 includes step 1514. In step 1514 the first communications device generates a radio resource control message including an RRC IE 'HARQ process ID for suppression in UL', which communicates a value indicating which HARQ process IDs are to be used in the uplink direction for TBs identified to not require HARQ feedback from receiver. In some such embodiments, step 1514 includes step 1515 in which the first communications device includes in said RRC message an RRC IE 'HARQ process ID for HARQ SUPPRESSION' including a value indicating the K number of HARQ processes designated as No HARQ ACK/NACK expected. In some embodiments, the RRC IE 'HARQ process ID for HARQ SUPPRESSION' is a four bit information element.

In some embodiments the value communicated in the RRC IE 'HARQ process ID for HARQ SUPPRESSION' communicates the number K, and the value communicated in the RRC IE 'HARQ process ID for HARQ SUPPRESSION in DL' identified a specific set of K HARQ processes, each HARQ process associated with a HARQ process ID.

For example, in some embodiments, when K=4, and HARQ process with IDs 0, 1, 2, and 3 are designated as a No ACK/NACK expected, the RRC IE 'HARQ process ID for HARQ SUPPRESSION' communicates a value, e.g., 4, which indicates that K=4, and the RRC IE 'HARQ process ID for HARQ SUPPRESSION in DL' communicates that a value 1, which indicates that HARQ process with IDs 0, 1, 2, and 3 are designated as a No ACK/NACK expected. Continuing with the example, in some embodiments, when K=4, and HARQ process with IDs 16, 15, 14, and 13 are designated as a No ACK/NACK expected, the RRC IE 'HARQ process ID for HARQ SUPPRESSION' communicates a value, e.g., 4, which indicates that K=4, and the RRC IE 'HARQ process ID for HARQ SUPPRESSION in DL' communicates that a value 2, which indicates that HARQ process with IDs 16, 15, 14, and 13 are designated as a No ACK/NACK expected.

In some embodiments, in the RRC message, there is a single RRC IE 'HARQ process ID for HARQ SUPPRESSION' communicating the value K, and there are K instances of the RRC IE 'HARQ process ID for HARQ SUPPRESSION in DL', each of the K instances communicating an identifier of a HARQ process which has been designated as a No HARQ ACK/NACK process.

In some embodiments the value communicated in the RRC IE 'HARQ process ID for HARQ SUPPRESSION' communicates the number K, and the value communicated in the RRC IE 'HARQ process ID for HARQ SUPPRESSION in UL' identified a specific set of K HARQ processes, each HARQ process associated with a HARQ process ID.

For example, in some embodiments, when K=5, and HARQ process with IDs 0, 1, 2, 3 and 4 are designated as a No ACK/NACK expected, the RRC IE 'HARQ process ID for HARQ SUPPRESSION' communicates a value, e.g., 5, which indicates that K=5, and the RRC IE 'HARQ process ID for HARQ SUPPRESSION in DL' communicates that a value 1, which indicates that HARQ process with IDs 0, 1, 2, 3 and 4 are designated as a No ACK/NACK expected. Continuing with the example, in some embodiments, when K=5, and HARQ process with IDs 16, 15, 14, 13 and 12 are designated as a No ACK/NACK expected, the RRC IE 'HARQ process ID for HARQ SUPPRESSION' communicates a value, e.g., 5, which indicates that K=5, and the RRC IE 'HARQ process ID for HARQ SUPPRESSION in DL' communicates that a value 2, which indicates that HARQ process with IDs 16, 15, 14, 13 and 12 are designated as a No ACK/NACK expected.

In some embodiments, in the RRC message, there is a single RRC IE 'HARQ process ID for HARQ SUPPRESSION' communicating the value K, and there are K instances of the RRC IE 'HARQ process ID for HARQ SUPPRESSION in UL', each of the K instances communicating an identifier of a HARQ process which has been designated as a No HARQ ACK/NACK process.

Operation proceeds from step 1510 to step 1516, in which the first communications device transmits said generated radio resource control (RRC) message, including a RCC information element (IE) identifying the K HARQ processes designated as no ACK/NACK expected, to said second communications device. Operation proceeds from step 1516 to step 1518.

In step 1518 the first communications device assigns said first packet flow to a hybrid automatic repeat request (HARQ) process which does not require generation of acknowledgment (ACKs) or negative acknowledgment (NACKs) from a device receiving data corresponding to said first packet flow.

In some embodiments, the HARQ process is a HARQ process for a TCP packet flow which supports end to end retransmission of packets, said HARQ process not supporting retransmission of data in response to a NACK and not requiring transmission of ACKs/NACKs from the receiving device to which data was transmitted. In some such embodiments, e.g., some embodiments in which steps 1508, 1510 and 1516 are bypassed, said HARQ process assigned in step 1518 is a dedicated HARQ process for a flow for which suppression of ACK/NACK is required, said dedicated HARQ process for the flow not triggering generation of ACK/NACK at the physical layer.

In some embodiments, e.g., some embodiments in which steps 1508, 1510 and 1516 are performed, the HARQ process assigned in step 1518 is one of the K designated HARQ processes of step 1508.

Step 1518 includes step 1520 in which the first communications device assigns said first packet flow to a HARQ process ID which is designated as indicating a HARQ suppression. In some embodiments, the HARQ process ID for the first packet flow is communicated in a Radio Resource Control information Element (RRC IE). In some embodiments, the HARQ Process ID is a 4 bit ID.

In some embodiments, the first communications device is a base station and the second communications device is a UE and the RRC IE indicates a HARQ process to be used for a corresponding transmission block (TB) transmitted in the downlink channel.

In some embodiments, the first communications device is a UE and the second communications device is a base station and the HARQ process to which the first packet flow is assigned is to be used for a corresponding uplink (UL) transmission block (TB) transmitted in an uplink channel.

In some embodiments, e.g., some embodiments, in which the first communications device is a base station and the first packet flow is a downlink packet flow, operation proceeds from step 1518 to step 1522. In some other embodiments, e.g., some embodiments, in which the first communications device is a UE device and the first packet flow is an uplink packet flow, operation proceeds from step 1518 to step 1526.

In step 1522 the first communications device transmits said HARQ process ID for the first packet flow to the second communications device. Step 1522 includes step 1524 in which the first communications device transmits said HARQ process ID for the first packet flow to second communications device in an information element (IE) of a physical downlink control channel (PDCCH). In some embodiments the IE of the PDCCH is a Radio Resource Control (RRC) IE, e.g., of a RCC message. Operation proceeds from step 1522 to step 1526.

In step 1526, the first communications device transmits data corresponding to said first packet flow to the second communications device.

In some embodiments, in step 1526, the first communications device is a base station, which transmits data corresponding to said first packet flow to the second communications device, which is a UE, which includes a receiver, and the second communications device is one end of the first packet flow, and the first packet flow has another endpoint, which is a third communications device, e.g., another UE or a server, e.g., an application server.

In some embodiments, in step 1526, the first communications device is a UE, which transmits data corresponding to said first packet flow to the second communications device, which is a base station, which includes a receiver, and the second communications device is an intermediary point of the first packet flow, and the first packet flow has another endpoint, which is a third communications device, e.g., another UE or a server, e.g., an application server.

In some embodiments, in which the first communications device is a UE, different uplink transmission slots are mapped to different known HARQ process IDs, and the mapping is known the base station and the UE. Therefore the base station can determine the HARQ process ID corresponding to the received packets of the first packet flow, and based on predetermined known information or received information as to which HARQ IDs correspond to a no HARQ ACK/NACK designation, the base station is able to determine that the first packet flow packets corresponds to no HARQ ACK/NACK, since the UE has transmitted the data packets in a slot corresponding to an HARQ ID which is designated as no ACK/NACK required, sometimes alternatively referred to as No ACK/NACK expected or No ACK/NACK suppression.

Operation proceeds from step 1526 to step 1528. In step 1528 the first communications device identifies a second packet flow, said second packet flow being a packet flow which does not support and end to end retransmission method. Operation proceeds from step 1528 to step 1530. In step 1530 the first communications device transmits data to the second communications device without disabling HARQ feedback for the second packet flow.

FIG. 16 is a drawing of an exemplary assembly of components 1600 which may be included in a wireless communications device, e.g., a base station such as the exemplary base station 700, e.g. a fNB or eNB, of FIG. 7, and implement steps of an exemplary method, e.g., steps of the method of the flowchart 1500 of FIG. 15.

Assembly of components 1600 can be, and in some embodiments is, used in base station 700, e.g., a gNB or eNB, of FIG. 7 or base station 406 or base station 408 of FIG. 4. The components in the assembly of components 1600 can, and in some embodiments are, implemented fully in hardware within the processor 702, e.g., as individual circuits. The components in the assembly of components 1600 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or eNB, with the components controlling operation of the base station to implement the functions corresponding to the components when the components are executed by a processor, e.g., processor 702. In some such embodiments, the assembly of components 1600 is included in the memory 710 as assembly of components 722. In still other embodiments, various components in assembly of components 1600 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 1600 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method, e.g., steps of the method of flowchart 1500 of FIG. 15 and/or described or shown with respect to any of the other figures.

FIG. 16 is a drawing of an assembly of components 1600 including a component 1604 configured to identify a first packet flow for which end to end transmission of packets is supported. Component 1604 includes a component 1606 configured to identify a first packet flow for which end to end retransmission of packets is supported and which HARQ is to be suppressed. Assembly of components 1600 further includes a component 1608 configured to designate K Hybrid automatic retransmission request (HARQ) process IDs corresponding to K HARQ processes to be used to mean no ACK/ACK expected, said K HARQ processes to be used for transport blocks (TBs) on which HARQ is to be suppressed, and a component 1610 configured to generate a radio resource control RRC message indicating a RRC information element (IE), e.g., a 4 bit IE, identifying the K HARQ processes designated as no ACK/NACK expected. Component 1610 includes a component configured to generate a RRC message including a RRC IE 'HARQ Process ID for Suppression in DL' which communicates a value indicating which HARQ Process IDs are to be used for TBs received in the downlink direction which do not require HARQ feedback to send. Component 1612 includes a component 1613 configured to include in said RRC message an RRC IE 'HARQ Process ID for HARQ Suppression' including a value indicating the K number of HARQ processes designated as a No HARQ ACK/NACK expected.

Assembly of components 1600 further includes a component 1616 configured to operate the base station to transmit said generated radio resource control (RRC) message, including a RRC information element (IE) identifying the K HARQ processes designated as no ACK/NACK expected, to said second communications device. In some embodiments, the RRC IE identifying the K HARQ processes designated a No ACK/NACK expected is a four bit information element.

Assembly of components 1600 further includes a component 1618 configured to assign said first packet flow to a Hybrid Automatic Repeat Request (HARQ) process which does not require generate of acknowledgments (ACKs) or negative acknowledgments (NACKs) from a device, e.g., a UE, receiving data corresponding to said first packet flow. Component 1618 includes a component 1620 configured to assign said first packet flow to a HARQ process ID which is designated as indicating a HARQ suppression. In some embodiments, some HARQ process ID(s) are dedicated for HARQ suppression. In some embodiments, some HARQ process IDs, e.g., K HARQ processes are temporarily designated for HARQ suppression, e.g., with the value of K changing over time depending upon current conditions.

In some embodiments, the HARQ process to which the first packet flow is assigned is a HARQ process for a TCP packet flow which supports end to end retransmission of packets, said HARQ process not supporting retransmission of data in response to a NACK and not requiring transmission of ACKs/NACKs from the receiving device to which data was transmitted. In some such embodiments, the HARQ process to which the first packet flow is assigned is a dedicated HARQ process for a flow for which suppression of ACK/NACK is required, said dedicated HARQ process for the flow not triggering generation of ACK/NACK at the physical layer.

In various embodiments, the HARQ process ID for the first packet flow is communicated in a RRC IE (Radio Resource Control Information Element), e.g., a RRC IE of a Physical Downlink Control Channel (PDCCH), e.g., of a RRC message. In some embodiments, the RRC IE indicates a HARQ process to be used for a corresponding transmission block (TB) in a downlink channel.

Assembly of components 1600 further includes a component 1622 configured to control the base station to transmit the HARQ process ID for the first packet flow to the second communications device. Component 1622 includes component 1624 configured to operate the base station to transmit the HARQ process ID for the first packet flow to the second communications device in an information element (IE) of a physical downlink control channel (PDCCH). Assembly of components 1600 further includes a component 1626 configured to operate the base station to transmit data corresponding to the first packet flow to a second communication device, a component 1628 configured to identify a second packet flow, e.g., a second downlink packet flow, said second packet flow being a packet flow which does not support and end to end retransmission method, and a component 1630 configured to control the base station to transmit data to the second communications device, e.g., a UE, without disabling HARQ feedback for the second packet flow.

FIG. 17 is a drawing of an exemplary assembly of components which may be included in a wireless communications device, e.g., a UE such as the UE 600 of FIG. 6, and implement steps of an exemplary method, e.g., steps of the method of the flowchart 1500 of FIG. 15.

Assembly of components 1700 can be, and in some embodiments is, used in UE device 600 of FIG. 6 or UE 402 or UE 404 of FIG. 4. The components in the assembly of components 1700 can, and in some embodiments are, implemented fully in hardware within the processor 602, e.g., as individual circuits. The components in the assembly of components 1700 can, and in some embodiments are, implemented fully in hardware within the assembly of components 618, e.g., as individual circuits corresponding to the different components. In other embodiments some of the components are implemented, e.g., as circuits, within the processor 602 with other components being implemented, e.g., as circuits within assembly of components 618, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 620 of the UE 600, with the components controlling operation of the UE 600 to implement the functions corresponding to the components when the components are executed by a processor, e.g., processor 602. In some such embodiments, the assembly of components 1400 is included in the memory 620 as assembly of components 654. In still other embodiments, various components in assembly of components 1700 are implemented as a combination of hardware and software, e.g., with another circuit external to the processor providing input to the processor 602 which then under software control operates to perform a portion of a component's function. While processor 602 is shown in the FIG. 6 embodiment as a single processor, e.g., computer, it should be appreciated that the processor 602 may be implemented as one or more processors, e.g., computers.

When implemented in software the components include code, which when executed by the processor 602, configure the processor 602 to implement the function corresponding to the component. In embodiments where the assembly of components 1700 is stored in the memory 620, the memory 620 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the UE 600, or elements therein such as the processor 602, to perform the functions of corresponding steps illustrated and/or described in the method of one or more of the flowcharts, signaling diagrams and/or described with respect to any of the Figures. Thus the assembly of components 1700 includes various components that perform functions of corresponding one or more described and/or illustrated steps of an exemplary method, e.g., steps of the method of flowchart 1500 of FIG. 15 and/or described or shown with respect to any of the other figures.

Assembly of components 1700 includes a component 1704 configured to identify a first packet flow for which end to end retransmission of packets is supported. Component 1704 includes a component 1706 configured to identify a first packet flow for which HARQ is to be suppressed. Assembly of components 1700 further includes a component 1708 configured to designate K Hybrid Automatic Repeat Request (HARQ) process IDs corresponding to K HARQ processes to be used to mean No ACK/NACK expected, said K HARQ processing to be used for Transport Blocks (TBs) on which HARQ is to be suppressed and a component 1710 configured to generate a radio resource control (RRC) message including a RRC information element (IE), e.g., a 4 IE, identifying the K HARQ processes designated as no ACK/NACK expected. Component 1710 includes a component 1714 configured to generate a RRC message including an RRC IE, 'HARQ Process ID for Suppression in UL', e.g., a 4 bit IE, which communicates a value indicating which HARQ process IDs are to be used for the uplink direction for TBs identified to not require HARQ feedback from receiver. Component 1714 includes a component 1715 configured to include in said RRC message an RRC IE, 'HARQ process ID for HARQ suppression', including a value indicating the K number of HARQ processes designated as no HARQ ACK/NACK expected.

Assembly of components 1700 further includes a component 1716 configured to operate the UE to transmit said generated radio resource control (RRC) message, including a RRC resource information element (IE) identifying the K HARQ processes designated as no ACK/NACK expected, to said second communications device, e.g., a base station, a component 1718 configured to assign said first packet flow to a Hybrid Automatic Repeat Request (HARQ) process which does not require generation of acknowledgments (ACKs) or negative acknowledgments (NACKs) for a device receiving data corresponding to said first packet flow. Component 1718 includes a component 1720 configured to assign said first packet flow to a HARQ process ID which is designated as indicating a HARQ suppression.

In some embodiments, some HARQ process ID(s) are dedicated for HARQ suppression. In some embodiments, some HARQ process IDs, e.g., K HARQ process IDs, are temporarily designated for HARQ suppression, e.g., with the value of K changing over time depending upon current conditions.

In some embodiments, the HARQ process to which the first packet flow is assigned is a HARQ process for a TCP packet flow which supports end to end retransmission of packets, said HARQ process not supporting retransmission of data in response to a NACK and not requiring transmission of ACKs/NACKs from the receiving device to which data was transmitted. In some such embodiments, the HARQ process to which the first packet flow is assigned is a dedicated HARQ process for a flow for which suppression of ACK/NACK is required, said dedicated HARQ process for the flow not triggering generation of ACK/NACK at the physical layer.

In various embodiments, the HARQ process ID for the first packet flow is communicated in a Radio Resource Control Information Element (RRC IE). In some embodiments, the HARQ process ID is a four bit ID.

In some embodiments, the HARQ process ID to which the first packet flow is assigned identifies a HARQ process to be used for a corresponding uplink transmission block (UL TB) transmitted in an uplink channel.

Assembly of components 1700 further includes a component 1726 configured to operate the UE to transmit data corresponding to said first packet flow to a second communications device, e.g., a base station, a component 1728 configured to identify a second packet flow, said second packet flow being a packet flow which does not support and end to end retransmission method, and a component 1730 configured to operate the UE to transmit data to the second communications device without disabling HARQ feedback for the second packet flow.

Figure 18:
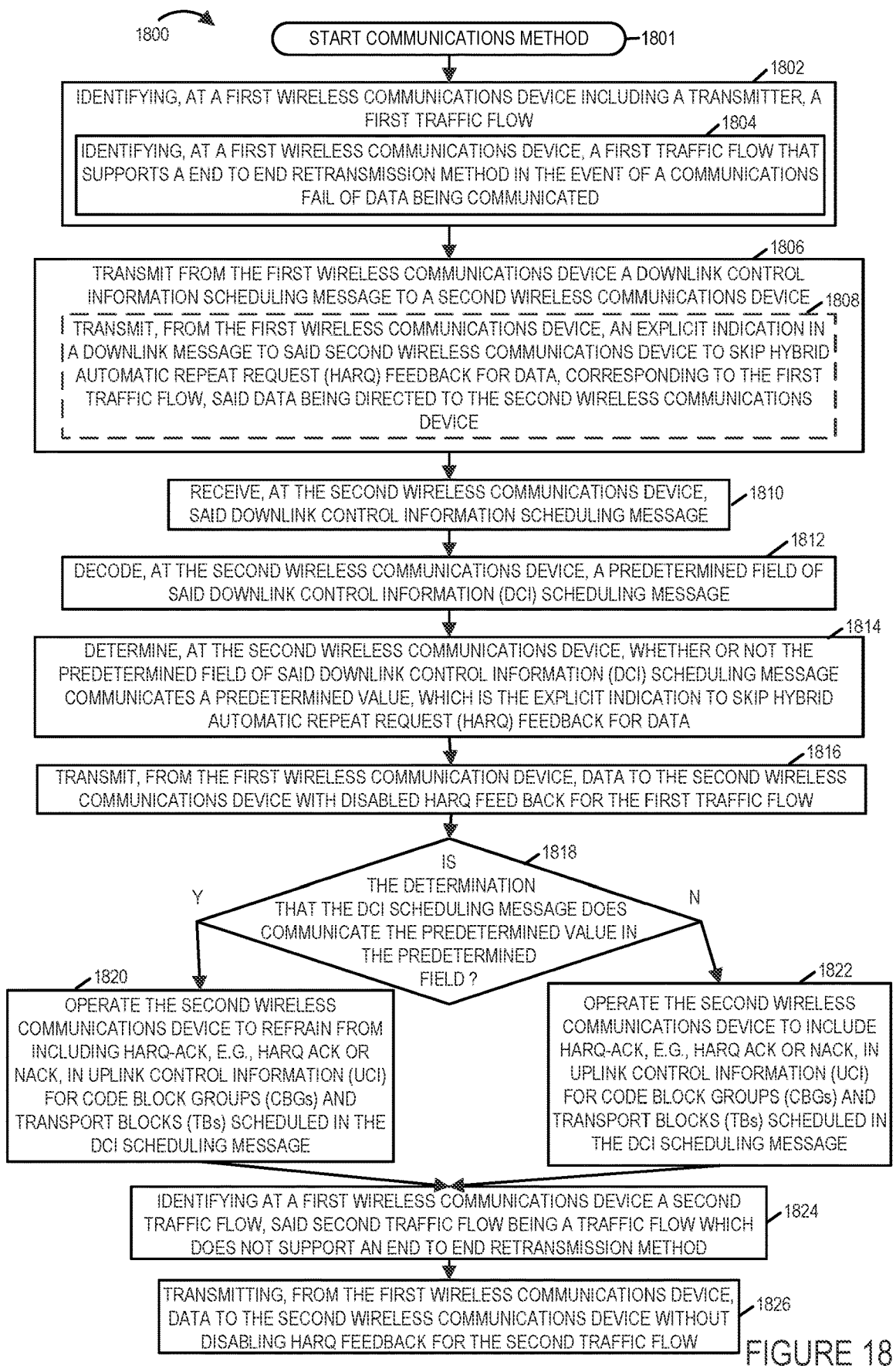
FIG. 18 is a flowchart of an exemplary communications method, e.g., a communications method supporting disabling of HARQ for some traffic flows, in accordance with an exemplary embodiment.

FIG. 18 is a flowchart 1800 of an exemplary communications method, e.g., a communications method supporting disabling of HARQ for some traffic flows, in accordance with an exemplary embodiment. Operation starts in step 1801 in which the communications system is powered on and initialized and proceeds to step 1802.

In step 1802 a first wireless communications device, e.g., a base station such as a gNB or eNB, including a transmitter, identifies, at the first wireless communications device, a first traffic flow. Step 1802 includes step 1804 in which the first wireless communications device identifies a first traffic flow that supports an end to end retransmission method in the event of a communications fail of data being communicated, e.g., the first wireless communications device identifies a TCP traffic flow supporting ACK which satisfies certain criteria, e.g., QCI/5QI indicating URLLC packets.

Operation proceeds from step 1802 to step 1806. In step 1806 the first wireless communications device transmits a downlink control information (DCI) scheduling message to a second wireless communications device. In various embodiments, the second wireless communications device is an endpoint of said first traffic flow. Step 1806 includes step 1808 in which the first wireless communications device transmits an explicit indication in a downlink message to said second wireless communications device to skip hybrid automatic repeat request (HARQ) feedback for data, corresponding to the first traffic flow, said data being directed to the second wireless communications device. In some embodiments, said explicit indication to skip Hybrid Automatic Repeat Request (HARQ) feedback for data is a predetermined value in a predetermined field of a downlink control information (DCI) scheduling message. In some such embodiments said DCI scheduling message is one of a DCI format 1_0 or DCI format 1_1 scheduling message. In some embodiments, said predetermined field is a 'PDSCH-to-HARQ_feedback timing indicator' field. In some embodiments, the predetermined value is a value outside an expected range of values for a PDSCH-to-HARQ feedback timing indicator. In various embodiments said predetermined value is a specific value which is indicated via a higher layer parameter. In some embodiments said higher layer parameter is a Slot-timing-value-K1 parameter. Operation proceeds from step 1806 to step 1810.

In step 1810 the second wireless communications device receives said downlink control information scheduling message. Operation proceeds from step 1810 to step 1812. In step 1812 the second wireless communications device decodes a predetermined field of said downlink control information (DCI) scheduling message. Operation proceeds from step 1812 to step 1814.

In step 1814 the second wireless communications device determines whether or not the predetermined field of the said DCI scheduling message communicates a predetermined value, which is the explicit indication to skip hybrid automatic repeat request (HARQ) feedback for data. Operation proceeds from step 1814 to step 1816.

In step 1816 the first wireless communications device transmits data to the second wireless communications device with disabled HARQ feedback for the first traffic flow. Operation proceeds from step 1816 to step 1818.

In step 1818, the second wireless device controls operation as a function of the determination in step 1814 as to whether or not the DCI scheduling message communicated the predated value in the predetermined field which indicated that the second wireless communications device should skip HARQ feedback for data of the first traffic flow. If the determination of step 1818 is that the DCI scheduling message does communicate the predetermined value in the predetermined field, then operation proceeds from step 1818 to step 1820, in which the second wireless communications device is operated to refrain from including HARQ-ACK, e.g., HARK ACK or NACK, in uplink control information (UPI) for code block groups (CBGs) and transport blocks (TBs) scheduled in the DCI scheduling message, e.g., corresponding to the first traffic flow. However, if the determination of step 1818 is that the DCI scheduling message did not communicate the predetermined value in the predetermined field, then operation proceeds from step 1818 to step 1822, in which the second wireless communications device is operated to include HARQ-ACK, e.g., HARK ACK or NACK, in uplink control information (UPI) for code block groups (CBGs) and transport blocks (TBs) scheduled in the DCI scheduling message, e.g., corresponding to the first traffic flow. Operation proceeds from step 1820 or step 1822 to step 1824.

In step 1824 the first wireless communications device is operated to identify a second traffic flow, said second traffic flow being a traffic flow which does not support an end to end retransmission method. Operation proceeds from step 1824 to step 1826. In step 1826 the first wireless communications device is operated to transmit data to the second wireless communications device without disabling HARQ feedback for the second traffic flow.

FIG. 19 is a drawing of an exemplary assembly of components 1900 which may be included in a wireless communications device, e.g., a base station such as the exemplary base station 700, e.g., a gnB or eNB, of FIG. 7, and implement steps of an exemplary method, e.g., steps of the method of the flowchart 1800 of FIG. 18.

Assembly of components 1900 can be, and in some embodiments is, used in base station 700, e.g., a gNB or eNB, of FIG. 7 or base station 406 or base station 408 of FIG. 4. The components in the assembly of components 1900 can, and in some embodiments are, implemented fully in hardware within the processor 702, e.g., as individual circuits. The components in the assembly of components 1900 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or eNB, with the components controlling operation of the base station to implement the functions corresponding to the components when the components are executed by a processor, e.g., processor 702. In some such embodiments, the assembly of components 1900 is included in the memory 710 as assembly of components 722. In still other embodiments, various components in assembly of components 1900 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 1900 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 19 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 1900 includes various components that perform functions of corresponding one or more described and/or illustrated steps of an exemplary method, e.g., steps of the method of flowchart 1800 of FIG. 18 and/or described or shown with respect to any of the other figures.

Assembly of components 1900 includes a component 1902 configured to identify, at a first wireless communications device including a transmitter, a first traffic flow. Component 1902 includes a component 1904 configured to identify, at a first wireless communications device, a first traffic flow that supports an end to end retransmission method in the event of a communications fail of data being communicated.

Assembly of components 1900 further includes a component 1905 configured to generate at the first wireless communications device a downlink control information (DCI) scheduling message to be transmitted to a second wireless communications device, e.g. a UE. Component 1905 includes a component 1907 configured to generate at the first wireless communications device an explicit indication in a downlink message to said second wireless communications device to skip hybrid automatic repeat request (HARQ) feedback for data, corresponding to said first traffic flow, said data being directed to the second wireless communications device. In various embodiments, the first traffic flow is a downlink traffic flow, e.g., a first downlink traffic flow.

In some embodiments, the explicit indication to skip HARQ feedback for data is a predetermined value in a predetermined field of a downlink control information (DCI) scheduling message. In some such embodiments, the DCI scheduling message is one of DCI format 1_0 or DCI format 1_1 scheduling message. In some embodiments, the predetermined field is a "PDSCH-to-HARQ_feedback timing indicator" field. In some embodiments, the predetermined value is a value outside an expected range of values for a PDSCH-to-HARQ feedback timing indicator. In various embodiments said predetermined value is a specific value which is indicated via a higher layer parameter. In some embodiments said higher layer parameter is a Slot-timing-value-K1 parameter.

Assembly of components 1900 further includes a component 1906 configured to control the first wireless communications device to transmit form the first wireless communications device a downlink control information scheduling message to a second wireless communications device. Component 1906 includes a component 1908 configured to control the first wireless communication device to transmit, from the first wireless communications device, an explicit indication in a downlink message to said second wireless communications device to skip hybrid automatic repeat request (HARQ) feedback for data, corresponding to said first traffic flow, said data being directed to the second wireless communications device.

In some embodiments, said second wireless communications device is an endpoint of said first traffic flow.

Assembly of component 1900 further includes a component 1918 configured to control the first wireless communications device to transmit data to second wireless communications device with disabled HARQ feedback for the first traffic flow, a component 1924 configured to identify at a first wireless communications device a second traffic flow, e.g., a second downlink traffic flow, said second traffic flow being a traffic flow which does not support and end to end retransmission method, and a component 1926 configured to transmit, from the first wireless communications device, data to the second wireless communications device without disabling HARQ feedback for the second traffic flow.

FIG. 20 is a drawing of an exemplary assembly of components 2000 which may be included in a wireless communications device, e.g., a UE such as the UE 600 of FIG. 6, and implement steps of an exemplary method, e.g., steps of the method of the flowchart of FIG. 18.

Assembly of components 2000 can be, and in some embodiments is, used in UE device 600 of FIG. 6 or UE 402 or UE 404 of FIG. 4. The components in the assembly of components 2000 can, and in some embodiments are, implemented fully in hardware within the processor 602, e.g., as individual circuits. The components in the assembly of components 2000 can, and in some embodiments are, implemented fully in hardware within the assembly of components 618, e.g., as individual circuits corresponding to the different components. In other embodiments some of the components are implemented, e.g., as circuits, within the processor 602 with other components being implemented, e.g., as circuits within assembly of components 618, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 620 of the UE 600, with the components controlling operation of the UE 600 to implement the functions corresponding to the components when the components are executed by a processor, e.g., processor 602. In some such embodiments, the assembly of components 2000 is included in the memory 620 as assembly of components 654. In still other embodiments, various components in assembly of components 2000 are implemented as a combination of hardware and software, e.g., with another circuit external to the processor providing input to the processor 602 which then under software control operates to perform a portion of a component's function. While processor 602 is shown in the FIG. 6 embodiment as a single processor, e.g., computer, it should be appreciated that the processor 602 may be implemented as one or more processors, e.g., computers.

When implemented in software the components include code, which when executed by the processor 602, configure the processor 602 to implement the function corresponding to the component. In embodiments where the assembly of components 2000 is stored in the memory 620, the memory 620 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 20 control and/or configure the UE 600, or elements therein such as the processor 602, to perform the functions of corresponding steps illustrated and/or described in the method of one or more of the flowcharts, signaling diagrams and/or described with respect to any of the Figures. Thus the assembly of components 2000 includes various components that perform functions of corresponding one or more described and/or illustrated steps of an exemplary method, e.g., steps of the method of flowchart 1800 of FIG. 18 and/or described or shown with respect to any of the other figures.

Assembly of components 2000 includes a component 2010 configured to operate the second wireless communications device to received said downlink control information scheduling message, a component 2012 configured to decode, at the second wireless communications device, a predetermined field of said downlink control information (DCI) scheduling message, a component 2104 configured to determine, at the second wireless communications device, whether or not the predetermined field of said downlink control information (DCI) scheduling message communicates a predetermined value, which is the explicit indication to skip hybrid automatic repeat request (HARQ) feedback for data, a component 2020 configured to operate the second wireless communications device to refrain from including the HARQ-ACK, e.g., HARQ ACK or NACK, in the uplink control information (UPI) for code block groups (CBGs) and transport blocks (TBs) scheduled in the DCI scheduling message, in response to a determination that the DCI scheduling message does communicate the predetermined value in the predetermined field, and a component 2022 configured to operate the second wireless communications device to include HARQ-ACK, e.g., HARQ ACK or NACK, in the uplink control information (UPI) for code block groups (CBGs) and transport blocks (TBs) scheduled in the DCI scheduling message, in response to a determination that the DCI scheduling message does not communicate the predetermined value in the predetermined field.

Figure 21:
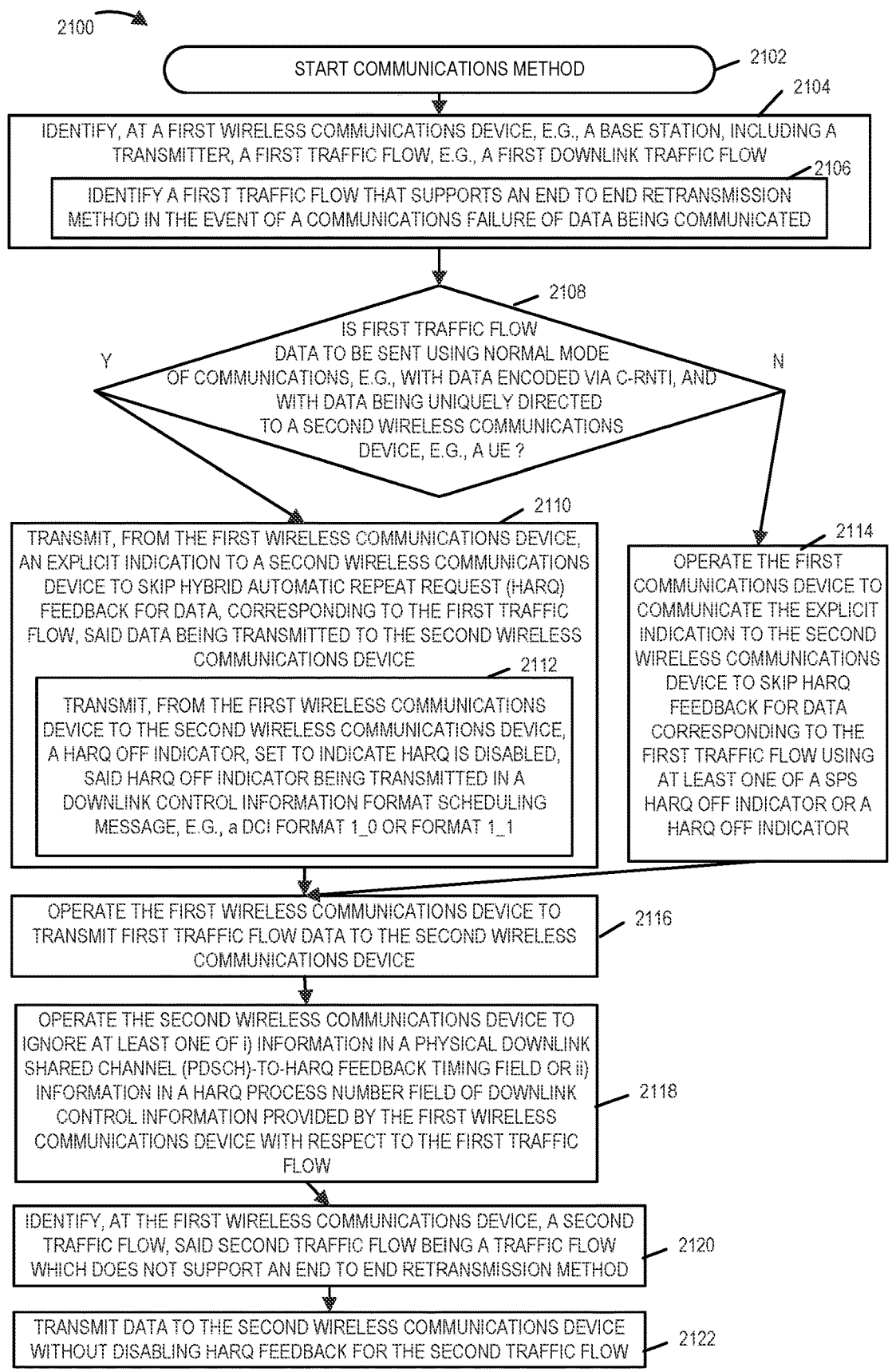
FIG. 21 is a flowchart of an exemplary communications method in accordance with an exemplary embodiment, said method including disabling Hybrid Automatic Repeat Request (HARQ) in selected traffic flows.

FIG. 21 is a flowchart 2100 of an exemplary communications method in accordance with an exemplary embodiment. Operation starts in 2102 in which the communications system implementing the method is powered on and initialized. Operation proceeds from step 2102 to step 2104. In step 2104 a first wireless communications device, e.g., a base station such as a gNB or eNB, including a transmitter, identifies, at the first wireless communications device, a first traffic flow, e.g., a first downlink traffic flow. Step 2104 includes step 2106, in which the first wireless communications device identifies a first traffic flow, e.g., a first downlink traffic flow, that supports an end to end retransmission method in the event of a communications failure of data being communicated. Operation proceeds from step 2104 to step 2108.

In step 2108 the first wireless communications device determines if the first traffic flow is to be sent using normal mode of communications, e.g., with data encoded via C-RNTI, and with data being uniquely directed to a second wireless communications device, e.g., a UE. If the determination is that first traffic flow is to be sent using normal mode of communications, e.g., with data encoded via C-RNTI, and with data being uniquely directed to a second wireless communications device, then operation proceeds from step 2108 to step 2110; otherwise operation proceeds from step 2108 to step 2114.

In step 2110 the first wireless communications device transmits, from the first wireless communications device, an explicit indication to the second wireless communications device to skip hybrid automatic repeat request (HARQ) feedback for data, corresponding to the first traffic flow, said data being transmitted to the second wireless communications device. Step 2110 includes step 2112 in which the first wireless communications device transmits, from the first wireless communications device, a HARQ Off Indicator, set to indicate HARQ is disabled, said HARQ Off indicator being transmitted in a downlink control information (DCI) format scheduling message, e.g., a DCI Format 1_0 or DCI Format 1_1.

In step 2114, the first wireless communications device is operated to communicate, e.g., transmit, an explicit indication to the second wireless communications device to skip HARQ feedback for data corresponding to the first traffic flow using at least one of a SPS HARQ_Off Indicator or a HARQ_Off_Indciator, e.g., using a SPS HARQ Off Indicator in a 'SPS-Config' RRC IE set to indicate that HARQ is disabled and including a HARQ Off Indicator, set to indicate HARQ is disabled, said HARQ Off indicator being transmitted in a downlink control information (DCI) format scheduling message, e.g., a DCI Format 1_0 or DCI Format 1_1.

Operation proceeds from step 2110 or step 2114 to step 2116. In step 2116 the first wireless communications device is operated to transmit first traffic flow data to the second wireless communications device. Operation proceeds from step 2116 to step 2118.

In step 2118 the first second wireless communications device is operated to ignore at least one of: i) information in a physical downlink shared channel (PDSCH)-to-HARQ_feedback_timing field or ii) information in a HARQ process number field of downlink control information provided by the first wireless communications device with respect to the first traffic flow. Operation proceeds from step 2118 to step 2120.

In step 2120 the first wireless communications device identifies, at the first wireless communications device, a second traffic flow, said second traffic flow being a traffic flow which does not support an end to end retransmission method. Operation proceeds from step 2120 to step 2122.

In step 2122 the first wireless communications device transmits data to the second wireless communications device without disabling HARQ feedback for the second traffic flow.

FIG. 22 is a drawing of an exemplary assembly of components 2200 which may be included in a wireless communications device, e.g., a base station such as the exemplary base station 700, e.g., a gNB or eNB, of FIG. 7, and implement steps of an exemplary method, e.g., steps of the method of the flowchart 2100 of FIG. 21.

Assembly of components 2200 can be, and in some embodiments is, used in base station 700, e.g., a gNB or eNB, of FIG. 7 or base station 406 or base station 408 of FIG. 4. The components in the assembly of components 2200 can, and in some embodiments are, implemented fully in hardware within the processor 702, e.g., as individual circuits. The components in the assembly of components 2200 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or eNB, with the components controlling operation of the base station to implement the functions corresponding to the components when the components are executed by a processor, e.g., processor 702. In some such embodiments, the assembly of components 2200 is included in the memory 710 as assembly of components 722. In still other embodiments, various components in assembly of components 2200 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 2200 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 22 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 2200 includes various components that perform functions of corresponding one or more described and/or illustrated steps of an exemplary method, e.g., steps of the method of flowchart 2100 of FIG. 21 and/or described or shown with respect to any of the other figures.

Assembly of components 2200 includes a component 2204 configured to identify, at a first wireless communications device, e.g., a base station, including a transmitter, a first traffic flow, e.g., a first downlink traffic flow. Component 2204 includes a component 2206 configured to identify a first traffic flow that supports an end to end retransmission method in the event of a communications failure of data being communicated. Assembly of components 2200 further includes a component 2208 configured to determine if the first traffic flow data is to be sent using normal mode of communications, e.g., with data encoded via C-RNTI, and with data being uniquely directed to a second wireless communications device, e.g., a UE, and to control operation as a function of the determination.

Assembly of components 2200 further includes a component 2210 configured to operate the first wireless communications device to transmit, from the first wireless communications device, an explicit indication to a second wireless communications device to skip hybrid automatic repeat request (HARQ) feedback for data, corresponding to the first traffic flow, said data being transmitted to the second wireless communications device, e.g., in response to a determination that the first traffic flow is to be sent using the normal mode of communications. Component 2210 includes a component 2212 configured to operate the first wireless communications device to transmit, from the first wireless communications to the second wireless communications device, a HARQ Off Indicator set to indicate HARQ is disabled, said HARQ Off Indicator being transmitted in a downlink control information format scheduling message, e.g., a DCI Format 1_0 or Format 1_1. In some embodiments, the HARQ Off Indicator is a one bit value set to a predetermined value, e.g. 1, when HARQ is disabled.

Assembly of components 2200 further includes a component 2214 configured to operate the first communications device to communicate an explicit indication to the second wireless communications device to sjip HARQ feedback for data corresponding to the first traffic flow using at least one of a SPS HARQ Off Indicator or a HARQ Off Indicator, e.g., e.g., in response to a determination that the first traffic flow is to be sent using an semi-persistent scheduling SPS mode of communications. Component 2214 includes a component 22141 configured to operate the first wireless communications device to transmit, from the first wireless communications device to the second wireless communications device, a SPS HARQ Off Indicator, set to indicate HARQ is disabled in a SPS_CONFIG RRC IE, and a component 22142 configured to operate the first wireless communications device to transmit from the first wireless communications device to the second wireless communications device, a HARQ Off Indicator set to indicate HARQ is disabled, said HARQ Off Indicator being transmitted in a downlink control information format scheduling message, e.g., a DCI Format 1_0 or Format 1_1. In some embodiments, the SPS HARQ Off Indicator is a one bit value set to a predetermined value, e.g. 1, when HARQ is disabled. In some embodiments, the HARQ Off Indicator is a one bit value set to a predetermined value, e.g. 1, when HARQ is disabled.

Assembly of component 2200 further includes a component 2216 configured to operate the first wireless communications device to transmit first traffic flow data to the second wireless communications device, a component 2220 configured to identify, at the first wireless communications device, a second traffic flow, said second traffic flow being a traffic flow which does not support and end to end retransmission method, an a component 2222 configured to transmit data to the second wireless communications device without disabling HARQ feedback for the second traffic flow.

Figure 23:
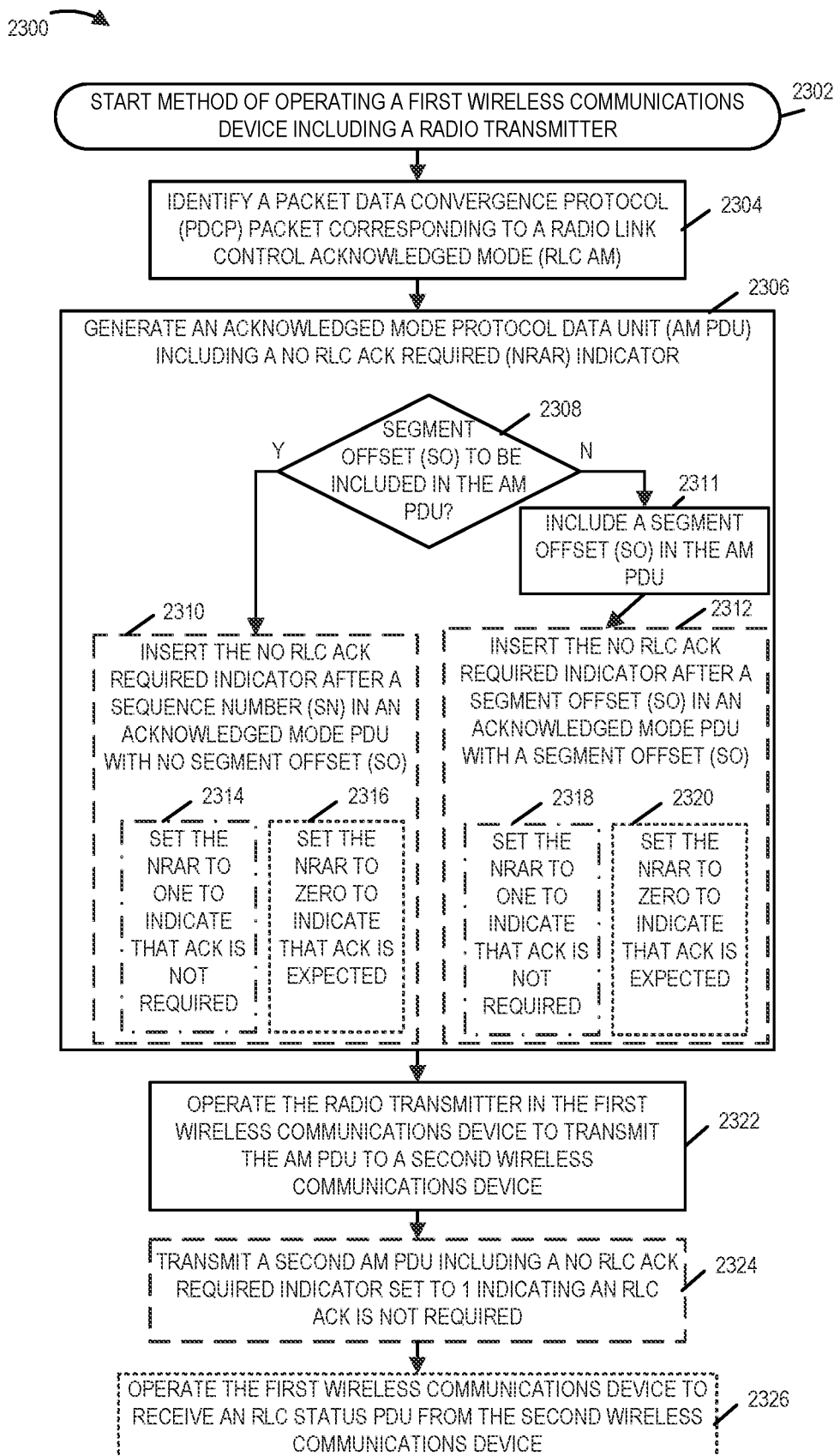
FIG. 23 is a flowchart of an exemplary method of operating a first wireless communications device including a transmitter in accordance with an exemplary embodiment, e.g., an exemplary method of operating the first wireless communications device to signal suppression and suppress RLC ACK/NACK corresponding to selected acknowledged mode protocol data units (AM PDUs), in accordance with an exemplary embodiment.

FIG. 23 is a flowchart 2300 of an exemplary method of operating a first wireless communications device including a transmitter in accordance with an exemplary embodiment, e.g., an exemplary method of operating the first wireless communications device to signal suppression and suppress RLC ACK/NACK corresponding to selected acknowledged mode protocol data units (AM PDUs), in accordance with an exemplary embodiment. The first wireless communications device is, e.g., a base station such as gNB or eNB, or a user equipment (UE) device. Operation starts in step 2302 in which the first wireless communications device is powered on and initialized. Operation proceeds from start step 2302 to step 2304.

In step 2304, the first wireless communications device identifies a packet data convergence protocol (PDCP) packet corresponding to radio link control acknowledged mode (RLC AM). Operation proceeds from step 2304 to step 2306.

In step 2306 the first wireless communications device generates an acknowledged mode protocol data unit (AM PDU) including a No RLC ACK Required (NRAR) indicator from the identified PDCP packet. In various embodiments, the AM PDU is an acknowledged mode data protocol data unit (AMD PDU). In some embodiments, the NRAR indicator is a one bit indicator. In some embodiments, the NRAR indicator is the first bit in an octet. In some embodiments, the NRAR indicator is set to one to indicate an RLC ACK is not required. In some such embodiments, the NRAR indicator is set to zero to indicate that an RLC ACK is expected.

Step 2306 includes steps 2308, 2310, 2311 and 2312. In step 2308, the first wireless communications device determines if a segment offset (SO) is to be included in the AM PDU. If a segment offset is not to be included in the AM PDU which is being generated, then operation proceeds from step 2308 to step 2310; otherwise, operation proceeds from step 2308 to step 2311.

In step 2310, the first wireless communications device inserts the No RLC ACK Required (NRAR) indicator after a sequence number (SN) in an acknowledged mode (AM) PDU, which is being generated, said AM PDU which is being generated not including a segment offset (SO). Step 2310 includes steps 2314 and 2316. One of step 2314 and 2316 is performed for an iteration of step 2310, e.g., based on whether or not the first wireless communications device wants to suppress RLC ACK for the AM PDU being generated, e.g., based on whether or not the generated AM PDU corresponds to a PDCP packet of a flow for which RLC ACK is to be suppressed, e.g., a TCP traffic flow supporting end to end retransmission in the event of a communications failure.

In step 2314 the first wireless communications device sets the NRAR to one to indicate that ACK is not required. In step 2316 the first wireless communications device sets the NRAR to zero to indicate that ACK is expected.

In step 2311 the first wireless communications device includes a segment offset (SO) in the AM PDU which is being generated. Operation proceeds from step 2311 to step 2312.

In step 2312, the first wireless communications device inserts the No RLC ACK Required (NRAR) indicator after a sequence office (SO) in an acknowledged mode (AM) PDU, which is being generated, said AM PDU which is being generated including a segment offset (SO). Step 2312 includes steps 2318 and 2320. One of step 2318 and 2320 is performed for an iteration of step 2312, e.g., based on whether or not the first wireless communications device wants to suppress RLC ACK for the AM PDU being generated, e.g., based on whether or not the generated AM PDU corresponds to a PDCP packet of a flow for which RLC ACK is to be suppressed, e.g., a TCP traffic flow supporting end to end retransmission in the event of a communications failure.

In step 2318 the first wireless communications device sets the NRAR to one to indicate that ACK is not required. In step 2320 the first wireless communications device sets the NRAR to zero to indicate that ACK is expected.

In some embodiments, step 2306 may, be and sometimes is performed multiple times, e.g., with a set of AM PDUs being generated corresponding to the identified PDCP packet.

Operation proceeds from step 2306 to step 2322. In step 2322 the radio transmitter in the wireless communications device is operated to transmit the AMD PDU to a second wireless communications, e.g., a UE or base station. For example, if the first communications device is a base station, the second communications device is, in some embodiments, a user equipment device. As another example, if the first communications device is a UE device, the second communications device is, in some embodiments, a base station.

In some embodiments, operation proceeds from step 2322 to step 2324. In some other embodiments, operation proceeds from step 2322 to step 2326.

In step 2324 the first wireless communications device in transmits a second AM PDU, e.g., a second AMD PDU, to the second wireless communications device, said second AM PDU including a NRAR indicator set to 1 indicating an RLC ACK is not required.

In step 2326 the first wireless communications device receives an RLC status PDU from the second wireless communications device, said RLC status PDU including an ACK report from the second wireless communications device.

In one exemplary embodiment, the transmitted AMD PDU, e.g., of step 2322, included a NRAR indicator set to 0, and the received RLC status PDU includes: i) a sequence number for the transmitted PDU and ii) an ACK/NACK indication corresponding to the transmitted AM PDU.

In another exemplary embodiment, the transmitted PDU of step 2322 included a NRAR indicator set to 0; step 2324 is performed, and the transmitted second AM PDU of step 2324 included a NRAR indicator set to 1 indicating an RLC ACK is not required, and the received RLC status PDU of step 2326 includes: i) a sequence number for the AM PDU, and ii) a ACK/NACK indication corresponding to the AM PDU with NRAR indicator set to 0, and said RLC status PDU does not include a sequence number or an ACK/NACK indication corresponding to the transmitted second AM PDU, which included the status bit set to one, said second wireless communications device having intentionally left out the sequence number corresponding to the second AM PDU.

In another exemplary embodiment, both the transmitted AM PDU of step 2322 and the second AM PDU of step 2324 have their NRAR indicator set to 1, and step 2326 is not performed. In some embodiments, the first wireless communications device stores information as to which AM PDUs have been transmitted with the NRAR indicator set to 1, and the first wireless communications device is controlled to refrain from monitoring to receive for ACK/NACK reports corresponding to those AM PDUs.

FIG. 24 is a drawing of an exemplary assembly of components 2400 which may be included in a first wireless communications device, e.g., a base station such as the exemplary base station 700, e.g., a gNB or eNB, of FIG. 7 or a UE such as the exemplary UE 600 of FIG. 6, and implement steps of an exemplary method, e.g., steps of the method of the flowchart 2300 of FIG. 23.

Assembly of components 2400 can be, and in some embodiments is, used in base station 700, e.g., a gNB or eNB, of FIG. 7 or base station 406 or base station 408 of FIG. 4. The components in the assembly of components 2400 can, and in some embodiments are, implemented fully in hardware within the processor 702, e.g., as individual circuits. The components in the assembly of components 2400 can, and in some embodiments are, implemented fully in hardware within the assembly of components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the base station 700, e.g., a gNB or eNB, with the components controlling operation of the base station to implement the functions corresponding to the components when the components are executed by a processor, e.g., processor 702. In some such embodiments, the assembly of components 2400 is included in the memory 710 as assembly of components 722. In still other embodiments, various components in assembly of components 2400 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 2400 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 24 control and/or configure the base station 700, or elements therein such as the processor 702, to perform the functions of corresponding steps illustrated and/or described in the method of one or more of the flowcharts, signaling diagrams and/or described with respect to any of the Figures. Thus the assembly of components 2400 includes various components that perform functions of corresponding one or more described and/or illustrated steps of an exemplary method, e.g., steps of the method of flowchart 2300 of FIG. 23 and/or described or shown with respect to any of the other figures.

Assembly of components 2400 can be, and in some embodiments is, used in UE device 600 of FIG. 6 or UE 402 or UE 404 of FIG. 4. The components in the assembly of components 2400 can, and in some embodiments are, implemented fully in hardware within the processor 602, e.g., as individual circuits. The components in the assembly of components 2400 can, and in some embodiments are, implemented fully in hardware within the assembly of components 618, e.g., as individual circuits corresponding to the different components. In other embodiments some of the components are implemented, e.g., as circuits, within the processor 602 with other components being implemented, e.g., as circuits within assembly of components 618, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 620 of the UE 600, with the components controlling operation of the UE 600 to implement the functions corresponding to the components when the components are executed by a processor, e.g., processor 602. In some such embodiments, the assembly of components 2400 is included in the memory 620 as assembly of components 654. In still other embodiments, various components in assembly of components 2400 are implemented as a combination of hardware and software, e.g., with another circuit external to the processor providing input to the processor 602 which then under software control operates to perform a portion of a component's function. While processor 602 is shown in the FIG. 6 embodiment as a single processor, e.g., computer, it should be appreciated that the processor 602 may be implemented as one or more processors, e.g., computers.

When implemented in software the components include code, which when executed by the processor 602, configure the processor 602 to implement the function corresponding to the component. In embodiments where the assembly of components 2400 is stored in the memory 620, the memory 620 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 24 control and/or configure the UE 600, or elements therein such as the processor 602, to perform the functions of corresponding steps illustrated and/or described in the method of one or more of the flowcharts, signaling diagrams and/or described with respect to any of the Figures. Thus the assembly of components 2400 includes various components that perform functions of corresponding one or more described and/or illustrated steps of an exemplary method, e.g., steps of the method of flowchart 2300 of FIG. 23 and/or described or shown with respect to any of the other figures.

Assembly of components 2400 includes a component 2404 configured to identify a packet data convergence protocol (PDCP) packet corresponding to radio link control acknowledged mode (RLC AM), a component 2406 configured to generate an acknowledged mode protocol data unit (AM PDU), e.g., an AMD PDU, including a No RLC ACK Required (NRAR) indicator, a component 2422 configured to operate the radio transmitter in the first wireless communications device to transmit the AM PDU to a second wireless communications device, a component 2424 configured to transmit a second AM PDU, e.g., a second AMD PDU, including a No RLC ACK Required indicator set to 1 indicating RLC ACK is not required, and a component 2426 configured to operate the first wireless communications device to receive a RLC status PDU from the second wireless communications device and recover information communicated in the RLC status PDU.

In some embodiments, the NRAR indicator is a one bit indicator. In some embodiments, the NRAR indicator is the first bit in an octet. In some embodiments, the NRAR indicator is set to one to indicate an RLC ACK is not required. In some such embodiments, the NRAR indicator is set to zero to indicate that an RLC ACK is expected.

Component 2406 includes a component 2408 configured to determine if a segment offset (SO) is to be included in the AM PDU and to control operation as a function of the determination, a component 2409 configured to include a segment offset (SO) in the AM PDU which is being generated, a component 2410 configured to insert the No RLC ACK Required (NRAR) after a sequence number in an acknowledged mode PDU with no segment offset, and a component 2412 configured to insert the No RLC ACK Required (NRAR) indicator after a segment offset (SO) in an acknowledged mode PDU with a SO.

Component 2410 includes a component 2414 configured to set the NRAR to one to indicate that ACK/NACK is not required, e.g., in response to a determination by the first wireless communications device that ACK feedback is not required in response to this generated AM PDU which is to be transmitted. Component 2410 further includes a component 2416 configured to set the NRAR to zero to indicate that ACK/NCK is expected, e.g., in response to a determination by the first wireless communications device that ACK feedback is expected in response to this generated AM PDU which is to be transmitted.

Component 2412 includes a component 2418 configured to set the NRAR to one to indicate that ACK/NACK is not required, e.g., in response to a determination by the first wireless communications device that ACK feedback is not required in response to this generated AM PDU which is to be transmitted. Component 2412 further includes a component 2420 configured to set the NRAR to zero to indicate that ACK/NACK is expected, e.g., in response to a determination by the first wireless communications device that ACK feedback is expected in response to this generated AM PDU which is to be transmitted.

In some embodiments, the RLC STATUS PDU received by component 2426 may, and sometimes does, include: i) a sequence number and ii) an ACK/NACK indication corresponding to the transmitted AM PDU which included a NRAR set to zero, but does not include: i) a sequence number and ii) an ACK/NACK indication corresponding to the second transmitted AM PDU which included the NRAR indicator set to one, said second wireless communications device having intentionally omitted the sequence number corresponding to second transmitted AM PDU and an ACK/NACK indication corresponding to second transmitted AM PDU.

Assembly of components 2400 includes a component 2428 configured to operate the first wireless communications device to selectively monitor for ACKs/NACKs based on the value of the NRAR indicator in each transmitted AM PDU, which included an NRAR indicator. In one embodiment, if the value of the NRAR indicator in the transmitted AM PDU was one, then component 2428 controls the first wireless communications device to refrain from monitoring for an ACK/NACK corresponding to that transmitted AM PDU, and if the value of the NRAR indicator in the transmitted AM PDU was zero, then component 2428 control the first wireless communications device to monitor for an ACK/NACK corresponding to that transmitted AM PDU.

Figure 25:
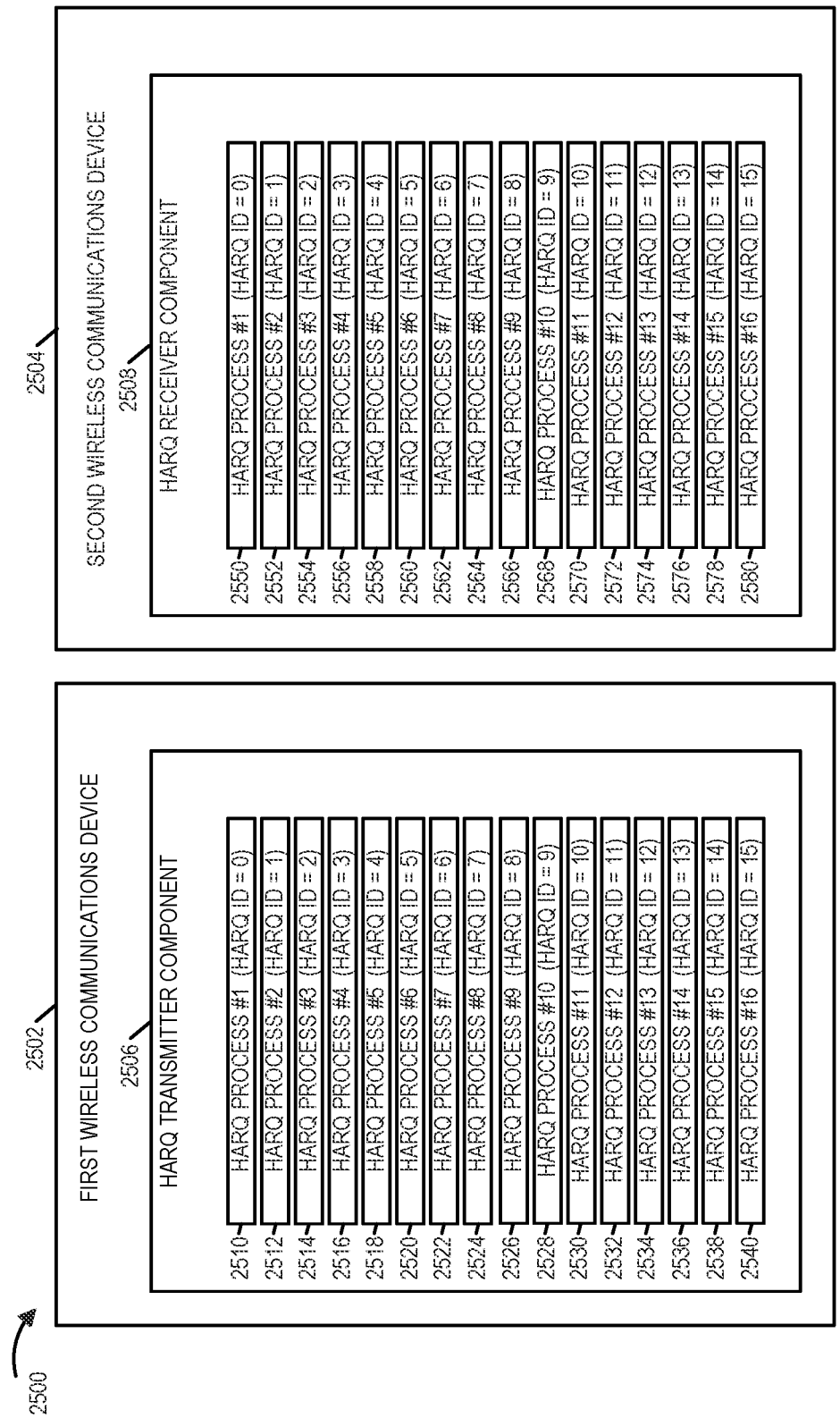
FIG. 25 is a drawing illustrating exemplary wireless communications devices in which one or more HARQ processes, e.g., K HARQ processes, may be, and sometimes are, designated and used, e.g., temporarily designated and used, as HARQ suppression processes, in which HARQ ACK/NACK is suppressed, in accordance with an exemplary embodiment.

FIG. 25 is a drawing 2500 illustrating exemplary wireless communications devices (first wireless communications device 2502, second wireless communications device 2504) in which one or more HARQ processes may be, and sometimes are, designated and used, e.g., temporarily designated and used as HARQ suppression processes. In one embodiment, first wireless communications device 2502 is a base station, e.g., a gNB or eNB, and second wireless communications device 2504 is a user equipment (UE) device. In another embodiment, first wireless communications device 2502 is a user equipment (UE) device, and second wireless communications device 2504 is a base station, e.g., a gNB or eNB. The device shown in FIG. 25 which is a UE is, e.g., UE 600 of FIG. 6, and the device shown in FIG. 25 which is a base station is, e.g., base station 700 of FIG. 7.

First wireless communications device 2502 includes a HARQ transmitter component 2506. HARQ transmitter component 2506 includes 16 HARQ processes (HARQ process #1 2510 with corresponding HARQ process ID=0, HARQ process #2 2512 with corresponding HARQ process ID=1, HARQ process #3 2514 with corresponding HARQ process ID=2, HARQ process #4 2516 with corresponding HARQ process ID=3, HARQ process #5 2518 with corresponding HARQ process ID=4, HARQ process #6 2520 with corresponding HARQ process ID=5, HARQ process #7 2522 with corresponding HARQ process ID=6, HARQ process #8 2524 with corresponding HARQ process ID=7, HARQ process #9 2526 with corresponding HARQ process ID=8, HARQ process #10 2528 with corresponding HARQ process ID=9, HARQ process #11 2530 with corresponding HARQ process ID=10, HARQ process #12 2532 with corresponding HARQ process ID=11, HARQ process #13 2534 with corresponding HARQ process ID=12, HARQ process #14 2536 with corresponding HARQ process ID=13, HARQ process #15 2538 with corresponding HARQ process ID=14, HARQ process #16 2540 with corresponding HARQ process ID=15).

Second wireless communications device 2505 includes a HARQ receiver component 2508. HARQ receiver component 2508 includes 16 HARQ processes (HARQ process #1 2550 with corresponding HARQ process ID=0, HARQ process #2 2552 with corresponding HARQ process ID=1, HARQ process #3 2554 with corresponding HARQ process ID=2, HARQ process #4 2556 with corresponding HARQ process ID=3, HARQ process #5 2558 with corresponding HARQ process ID=4, HARQ process #6 2560 with corresponding HARQ process ID=5, HARQ process #7 2562 with corresponding HARQ process ID=6, HARQ process #8 2564 with corresponding HARQ process ID=7, HARQ process #9 2566 with corresponding HARQ process ID=8, HARQ process #10 2568 with corresponding HARQ process ID=9, HARQ process #11 2570 with corresponding HARQ process ID=10, HARQ process #12 2572 with corresponding HARQ process ID=11, HARQ process #13 2574 with corresponding HARQ process ID=12, HARQ process #14 2576 with corresponding HARQ process ID=13, HARQ process #15 2578 with corresponding HARQ process ID=14, HARQ process #16 2580 with corresponding HARQ process ID=15).

In various embodiments, K of the 16 HARQ processes may be, and sometimes are, designated, e.g., temporarily designated, as HARQ processes for which ACK/NACK feedback for data is to be suppressed, e.g., HARQ suppression processes. In some embodiments, a designated HARQ suppression process does not expect ACK/NACK feedback in response to transmitted data, does not generate ACK/NACK feedback in response to transmitted data, and/or proceeds under the assumption that there will not be ACK/NACK feedback in response to transmitted data.

Figure 26:
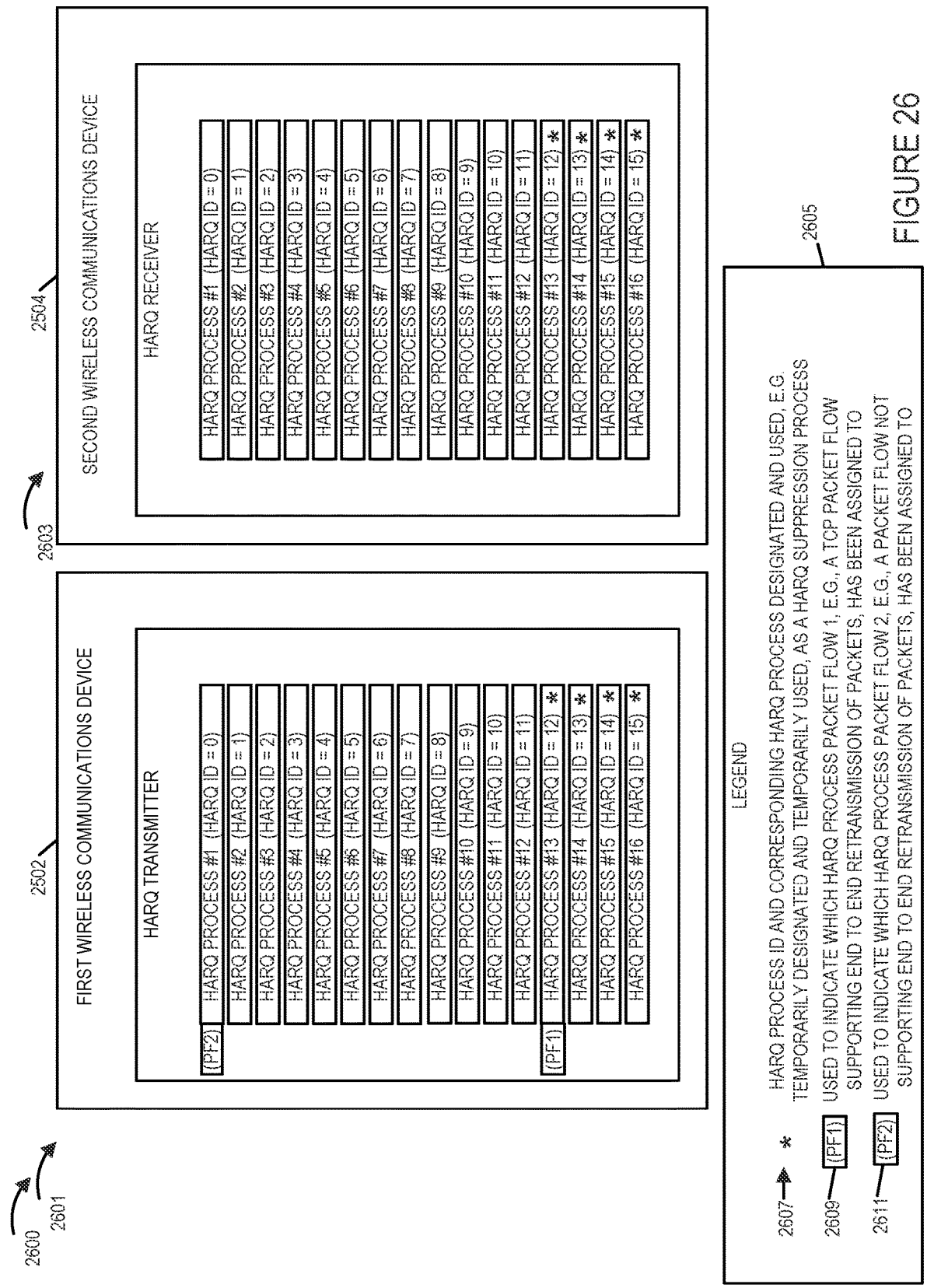
FIG. 26 is a drawing illustrating an example of the first and second communications devices of FIG. 25, in which 4 of the 16 HARQ processes have been designated as HARQ suppression processes, and further illustrates assignment of a first type of packet flow to a designated HARQ suppression process, and assignment of a second type of packet flow to a HARQ process which does not suppress feedback of ACK/NACK for data.

FIG. 26 is a drawing 2600 illustrating an example of the first and second communications devices (2502, 2504) of FIG. 25, in which K=4, and 4 of the 16 HARQ processes have been designated as HARQ suppression processes, and further illustrating assignment of a first type of packet flow to a designated HARQ suppression process, and assignment of a second type of packet flow to a HARQ process which does not suppress feedback of ACK/NACK for data. Drawing 2600 of FIG. 26 further includes legend 2605. Legend 2605 identifies that the * symbol 2607 is used to indicate a HARQ process ID and corresponding HARQ process which is designated and used, e.g., temporarily designated and used, as a HARQ suppression process, e.g. in which ACK/NACK feedback for data is skipped.

Legend 2605 further indicates that symbol 2609, which is a box including (PF1), is used to indicated which HARQ process packet flow 1, e.g., a TCP packet flow supporting end to end retransmission of packets, has been assigned to. Legend 2605 further indicates that symbol 2611, which is a box including (PF2), is used to indicate which HARQ process packet flow 2, e.g., a packet flow not supporting end to end retransmission of packets, has been assigned to.

Drawings 2601 and 2603 of FIG. 26 illustrates, by use of the * symbol 2607, that the 4 selected HARQ processes which are designated as HARQ suppression processes are HARQ process #13 with HARQ process ID=12, HARQ process #14 with HARQ process ID=13, HARQ process #15 with HARQ process ID=14, and HARQ process #14 with HARQ process ID=15.

Drawing 2601 further illustrates that packet flow 1, e.g., a TCP packet flow supporting end to end retransmission of packets, has been assigned to HARQ process #13 with HARQ process ID=12, which has been designated as a HARQ suppression process, which does not provide ACK/NACK feedback in response to transmitted data.

Drawing 2601 further illustrates that packet flow 2, e.g., a packet flow that does not support end to end retransmission of packets, has been assigned to HARQ process #1 with HARQ process ID=0, which is a normal HARQ process which supports ACK/NACK feedback in response to transmitted data.

Figure 27:
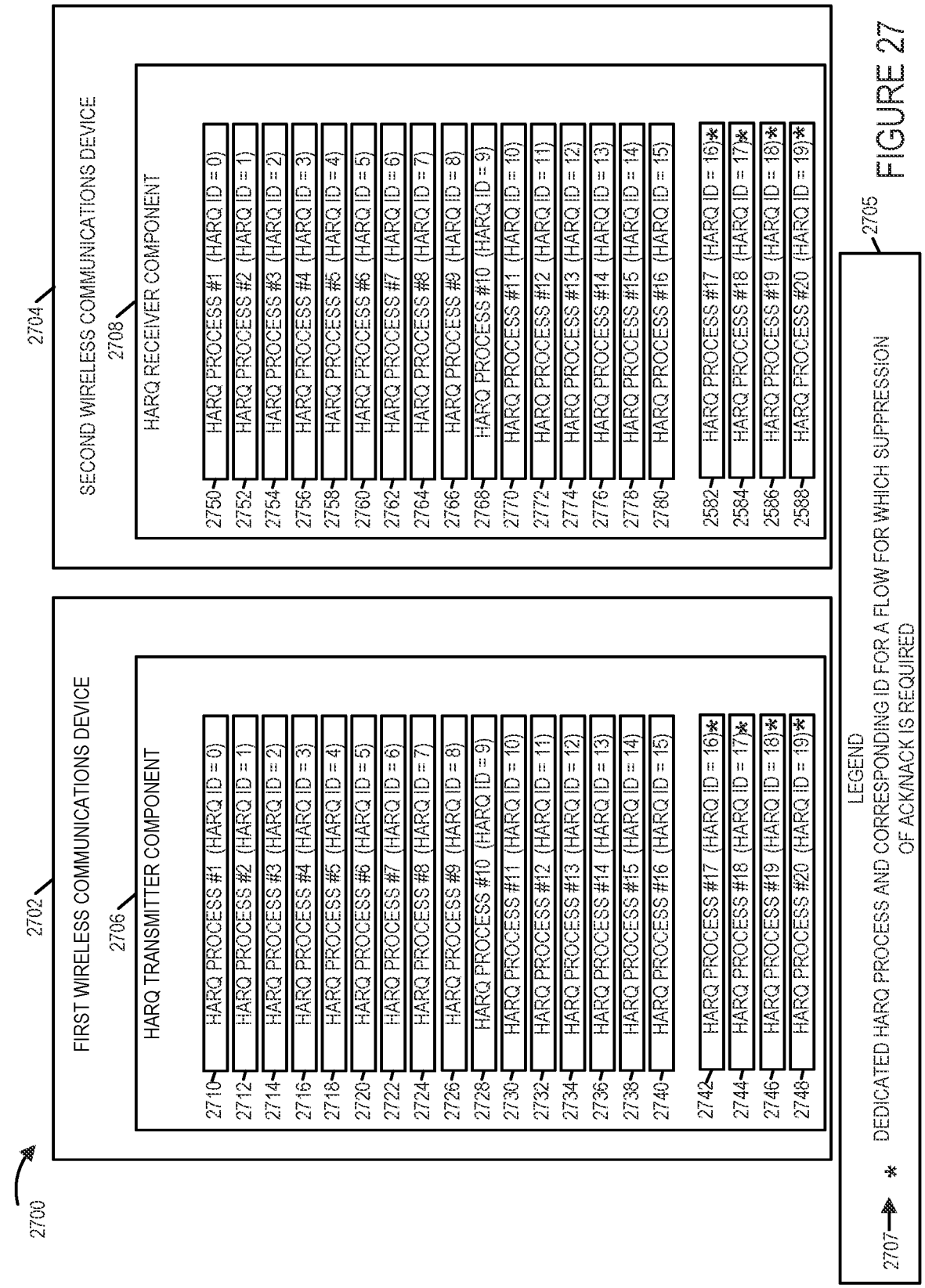
FIG. 27 is a drawing illustrating exemplary wireless communications devices in which some HARQ processes are dedicated HARQ processes with a corresponding ID intended for a flow for which suppression of ACK/NACK is required or desired and ACK/NACK feedback in response to data is not communicated or used, while other HARQ processes are normal HARQ processes in which ACK/NACK feedback in response to data is supported, in accordance with an exemplary embodiment.

FIG. 27 is a drawing 2700 illustrating exemplary wireless communications devices (first wireless communications device 2702, second wireless communications device 2704) in which some HARQ processes are dedicated HARQ processes with a corresponding ID for a flow for which suppression of ACK/NACK is required and ACK/NACK feedback in response to data is not communicated or used, while other HARQ processes are normal HARQ processes in which ACK/NACK feedback in response to data is supported. In one embodiment, first wireless communications device 2702 is a base station, e.g., a gNB or eNB, and second wireless communications device 2704 is a user equipment (UE) device. In another embodiment, first wireless communications device 2702 is a user equipment (UE) device, and second wireless communications device 2704 is a base station, e.g., a gNB or eNB. The device shown in FIG. 27 which is a UE is, e.g. UE 600 of FIG. 6, and the device shown in FIG. 27 which is a base station is, e.g., base station 700 of FIG. 7.

First wireless communications device 2702 includes a HARQ transmitter component 2706. HARQ transmitter component 2706 includes 20 HARQ processes (HARQ process #1 2710 with corresponding HARQ process ID=0, HARQ process #2 2712 with corresponding HARQ process ID=1, HARQ process #3 2714 with corresponding HARQ process ID=2, HARQ process #4 2716 with corresponding HARQ process ID=3, HARQ process #5 2718 with corresponding HARQ process ID=4, HARQ process #6 2720 with corresponding HARQ process ID=5, HARQ process #7 2722 with corresponding HARQ process ID=6, HARQ process #8 2724 with corresponding HARQ process ID=7, HARQ process #9 2726 with corresponding HARQ process ID=8, HARQ process #10 2728 with corresponding HARQ process ID=9, HARQ process #11 2730 with corresponding HARQ process ID=10, HARQ process #12 2732 with corresponding HARQ process ID=11, HARQ process #13 2734 with corresponding HARQ process ID=12, HARQ process #14 2736 with corresponding HARQ process ID=13, HARQ process #15 2738 with corresponding HARQ process ID=14, HARQ process #16 2740 with corresponding HARQ process ID=15, HARQ process #2 2742 with corresponding HARQ process ID=16, HARQ process #3 2744 with corresponding HARQ process ID=17, HARQ process #4 2746 with corresponding HARQ process ID=18, HARQ process #5 2748 with corresponding HARQ process ID=19).

Second wireless communications device 2705 includes a HARQ receiver component 2708. HARQ receiver component 2708 includes 16 HARQ processes (HARQ process #1 2750 with corresponding HARQ process ID=0, HARQ process #2 2752 with corresponding HARQ process ID=1, HARQ process #3 2754 with corresponding HARQ process ID=2, HARQ process #4 2756 with corresponding HARQ process ID=3, HARQ process #5 2758 with corresponding HARQ process ID=4, HARQ process #6 2760 with corresponding HARQ process ID=5, HARQ process #7 2762 with corresponding HARQ process ID=6, HARQ process #8 2764 with corresponding HARQ process ID=7, HARQ process #9 2766 with corresponding HARQ process ID=8, HARQ process #10 2768 with corresponding HARQ process ID=9, HARQ process #11 2770 with corresponding HARQ process ID=10, HARQ process #12 2772 with corresponding HARQ process ID=11, HARQ process #13 2774 with corresponding HARQ process ID=12, HARQ process #14 2776 with corresponding HARQ process ID=13, HARQ process #15 2778 with corresponding HARQ process ID=14, HARQ process #16 2780 with corresponding HARQ process ID=15, HARQ process #2 2782 with corresponding HARQ process ID=16, HARQ process #3 2784 with corresponding HARQ process ID=17, HARQ process #4 2786 with corresponding HARQ process ID=18, HARQ process #5 2788 with corresponding HARQ process ID=19).

Drawing 2700 of FIG. 27 further includes legend 2705. Legend 2705 identifies that the * symbol 2707 is used to indicate a dedicated HARQ process and corresponding HARQ process ID, which is intended to be used for a flow for which suppression of ACK/NACK is required or desired. In some embodiments, such HARQ processes are designated as HARQ suppression processes. In the example of FIG. 27, the first 16 HARQ processes and corresponding IDs, support ACK/NACK in response to transmitted data, while the last 4 16 HARQ processes and corresponding IDs, are dedicated HARQ suppression processes which do not support ACK/NACK in response to transmitted data.

Figure 28:
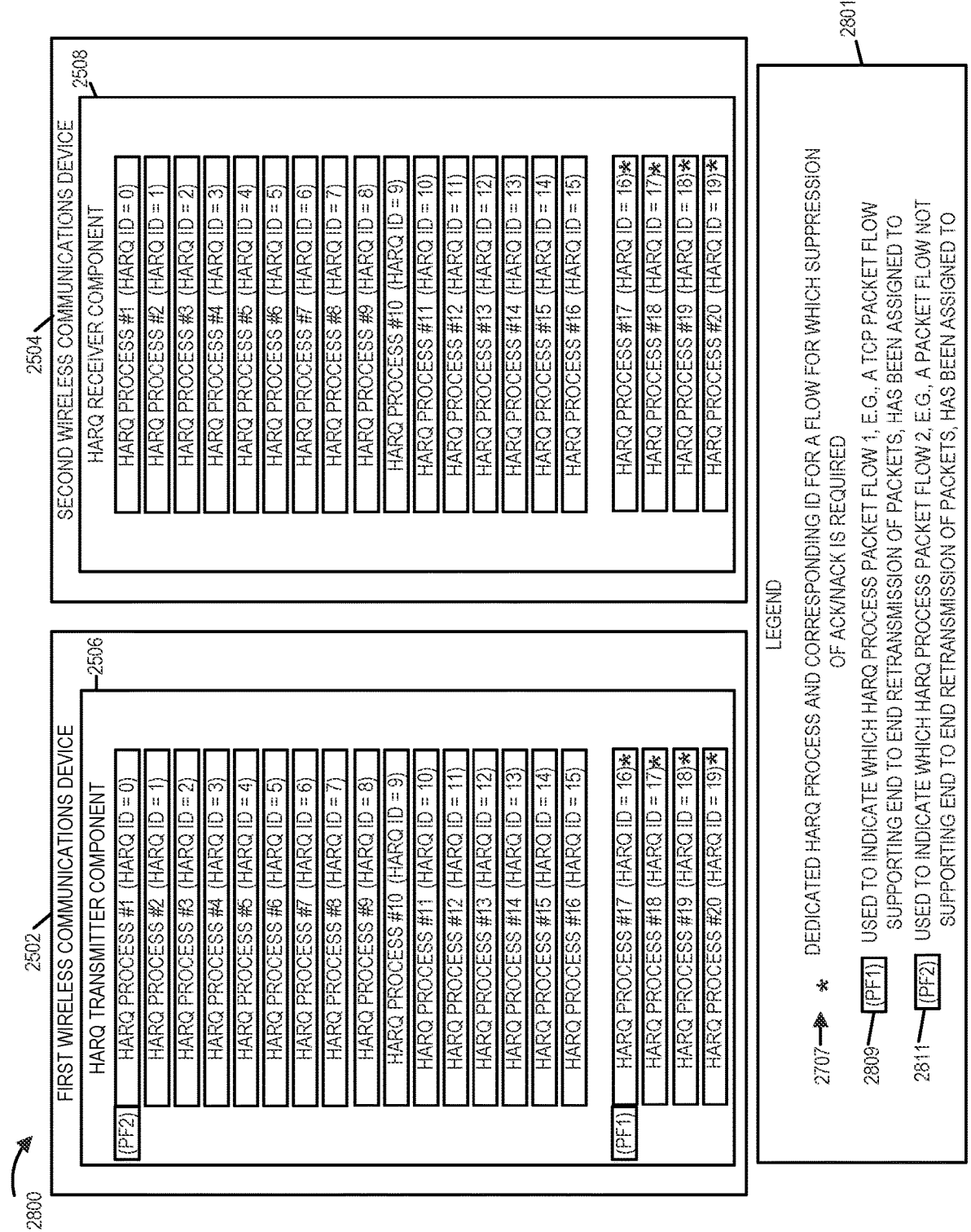
FIG. 28 is a drawing illustrating an example of the first and second communications devices of FIG. 27, in which 4 of the 20 HARQ processes are dedicated HARQ suppression processes, and further illustrating assignment of a first type of packet flow to a dedicated HARQ suppression process, and assignment of a second type of packet flow to a HARQ process which does not suppress feedback of ACK/NACK for data.

FIG. 28 is a drawing 2800 illustrating an example of the first and second communications devices (2702, 2704) of FIG. 27, in which 4 of the 20 HARQ processes are dedicated HARQ suppression processes, and further illustrating assignment of a first type of packet flow to a dedicated HARQ suppression process, and assignment of a second type of packet flow to a HARQ process which does not suppress feedback of ACK/NACK for data. Drawing 2800 of FIG. 28 further includes legend 2801. Legend 2801 identifies that the * symbol 2707 is used to indicate a HARQ process ID and corresponding HARQ process which is dedicate a HARQ suppression process, e.g. in which ACK/NACK feedback for data is not communicated, expected, or used.

Legend 2810 further indicates that symbol 2809, which is a box including (PF1), is used to indicated which HARQ process packet flow 1, e.g., a TCP packet flow supporting end to end retransmission of packets, has been assigned to. Legend 2801 further indicates that symbol 2811, which is a box including (PF2), is used to indicate which HARQ process packet flow 2, e.g., a packet flow not supporting end to end retransmission of packets, has been assigned to.

Drawings 2800 illustrates, by use of the * symbol 2807, that HARQ processes which are dedicated HARQ suppression processes are HARQ process #17 with HARQ process ID=16, HARQ process #18 with HARQ process ID=17, HARQ process #19 with HARQ process ID=18, and HARQ process #20 with HARQ process ID=19.

Drawing 2800 further illustrates that packet flow 1, e.g., a TCP packet flow supporting end to end retransmission of packets, has been assigned to HARQ process #17 with HARQ process ID=16, which is a dedicated HARQ suppression process, which does not provide ACK/NACK feedback in response to transmitted data.

Drawing 2800 further illustrates that packet flow 2, e.g., a packet flow that does not support end to end retransmission of packets, has been assigned to HARQ process #1 with HARQ process ID=0, which is a normal HARQ process which supports ACK/NACK feedback in response to transmitted data.

Figure 29:
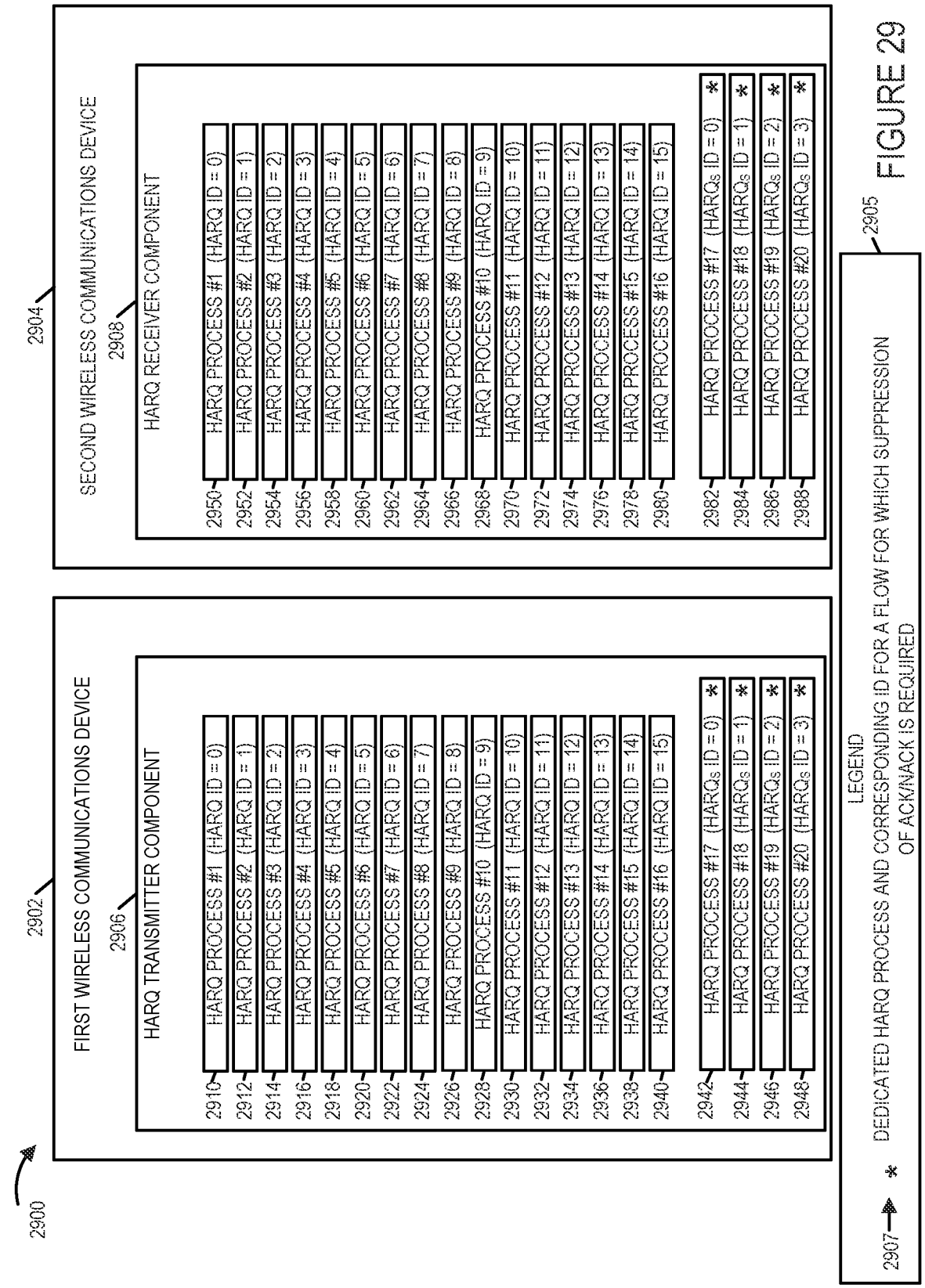
FIG. 29 is a drawing illustrating exemplary wireless communications devices in which some HARQ processes are dedicated HARQ processes with a corresponding HARQS process ID intended for a flow for which suppression of ACK/NACK is required or desired and ACK/NACK feedback in response to data is not communicated or used, while other HARQ processes are normal HARQ processes with a corresponding HARQ process ID in which ACK/NACK feedback in response to data is supported, said HARQS process ID and said HARQ process ID, being communicated in different variables and/or different fields, in accordance with an exemplary embodiment.

FIG. 29 is a drawing 2900 illustrating exemplary wireless communications devices (first wireless communications device 2902, second wireless communications device 2904) in which some HARQ processes are dedicated HARQ processes with a corresponding ID for a flow for which suppression of ACK/NACK is required and ACK/NACK feedback in response to data is not communicated or used, while other HARQ processes are normal HARQ processes in which ACK/NACK feedback in response to data is supported. In one embodiment, first wireless communications device 2902 is a base station, e.g., a gNB or eNB, and second wireless communications device 2904 is a user equipment (UE) device. In another embodiment, first wireless communications device 2902 is a user equipment (UE) device, and second wireless communications device 2904 is a base station, e.g., a gNB or eNB. The device shown in FIG. 29 which is a UE is, e.g. UE 600 of FIG. 6, and the device shown in FIG. 29 which is a base station is, e.g., base station 700 of FIG. 7.

First wireless communications device 2902 includes a HARQ transmitter component 2906. HARQ transmitter component 2906 includes 20 HARQ processes (HARQ process #1 2910 with corresponding HARQ process ID=0, HARQ process #2 2912 with corresponding HARQ process ID=1, HARQ process #3 2914 with corresponding HARQ process ID=2, HARQ process #4 2916 with corresponding HARQ process ID=3, HARQ process #5 2918 with corresponding HARQ process ID=4, HARQ process #6 2920 with corresponding HARQ process ID=5, HARQ process #7 2922 with corresponding HARQ process ID=6, HARQ process #8 2924 with corresponding HARQ process ID=7, HARQ process #9 2926 with corresponding HARQ process ID=8, HARQ process #10 2928 with corresponding HARQ process ID=9, HARQ process #11 2930 with corresponding HARQ process ID=10, HARQ process #12 2932 with corresponding HARQ process ID=11, HARQ process #13 2934 with corresponding HARQ process ID=12, HARQ process #14 2936 with corresponding HARQ process ID=13, HARQ process #15 2938 with corresponding HARQ process ID=14, HARQ process #16 2940 with corresponding HARQ process ID=15, HARQ process #17 2942 with corresponding HARQS process ID=0, HARQ process #18 2944 with corresponding HARQS process ID=1, HARQ process #19 2946 with corresponding HARQS process ID=2, HARQ process #20 2948 with corresponding HARQS process ID=3).

In the exemplary embodiment of FIG. 29, different variables and/or different fields are used to communicated the ID corresponding to the HARQ process depending upon the type of HARQ process, e.g., there is a HARQ process ID variable used for HARQ processes which support ACK/NACK, and there is a HARQS process ID variable used for dedicated HARQ processes which suppress ACK/NACK.

Second wireless communications device 2905 includes a HARQ receiver component 2908. HARQ receiver component 2908 includes 16 HARQ processes (HARQ process #1 2950 with corresponding HARQ process ID=0, HARQ process #2 2952 with corresponding HARQ process ID=1, HARQ process #3 2954 with corresponding HARQ process ID=2, HARQ process #4 2956 with corresponding HARQ process ID=3, HARQ process #5 2958 with corresponding HARQ process ID=4, HARQ process #6 2960 with corresponding HARQ process ID=5, HARQ process #7 2962 with corresponding HARQ process ID=6, HARQ process #8 2964 with corresponding HARQ process ID=7, HARQ process #9 2966 with corresponding HARQ process ID=8, HARQ process #10 2968 with corresponding HARQ process ID=9, HARQ process #11 2970 with corresponding HARQ process ID=10, HARQ process #12 2972 with corresponding HARQ process ID=11, HARQ process #13 2974 with corresponding HARQ process ID=12, HARQ process #14 2976 with corresponding HARQ process ID=13, HARQ process #15 2978 with corresponding HARQ process ID=14, HARQ process #16 2980 with corresponding HARQ process ID=15, HARQ process #17 2982 with corresponding HARQS process ID=0, HARQ process #18 2984 with corresponding HARQS process ID=1, HARQ process #19 2986 with corresponding HARQS process ID=2, HARQ process #20 2988 with corresponding HARQS process ID=3).

Drawing 2900 of FIG. 29 further includes legend 2905. Legend 2905 identifies that the * symbol 2907 is used to indicate a dedicated HARQ process and corresponding HARQ process ID, which is intended to be used for a flow for which suppression of ACK/NACK is required or desired. In some embodiments, such HARQ processes are designated as HARQ suppression processes. In the example of FIG. 29, the first 16 HARQ processes and corresponding IDs, support ACK/NACK in response to transmitted data, while the last 4 16 HARQ processes and corresponding IDs, are dedicated HARQ suppression processes which do not support ACK/NACK in response to transmitted data.

Figure 30:
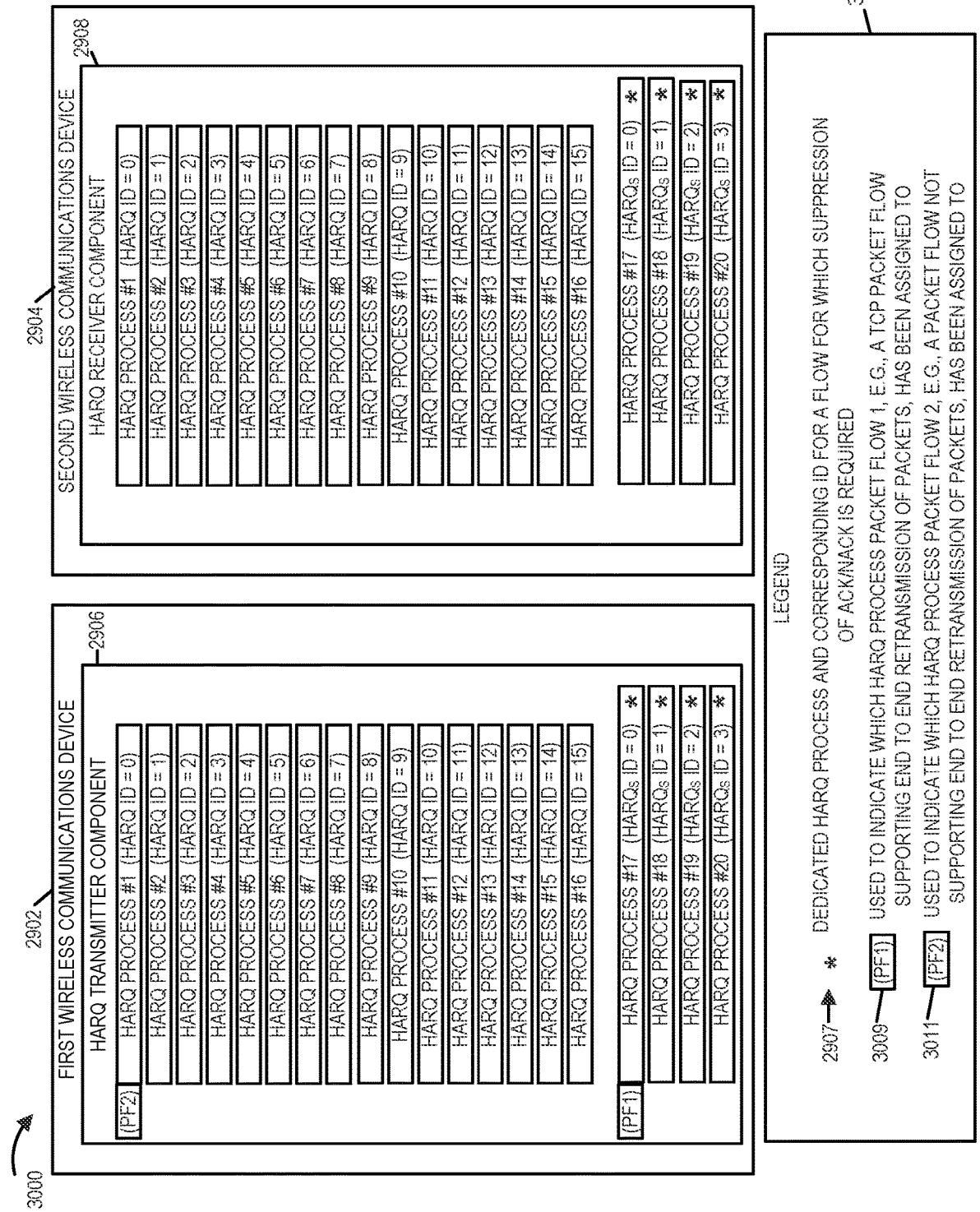
FIG. 30 is a drawing illustrating an example of the first and second communications devices of FIG. 29, in which 4 of the 20 HARQ processes are dedicated HARQ suppression processes, and further illustrating assignment of a first type of packet flow to a dedicated HARQ suppression process, and assignment of a second type of packet flow to a HARQ process which does not suppress feedback of ACK/NACK for data.

FIG. 30 is a drawing 3000 illustrating an example of the first and second communications devices (2902, 2904) of FIG. 29, in which 4 of the 20 HARQ processes are dedicated HARQ suppression processes, and further illustrating assignment of a first type of packet flow to a dedicated HARQ suppression process, and assignment of a second type of packet flow to a HARQ process which does not suppress feedback of ACK/NACK for data. Drawing 3000 of FIG. 30 further includes legend 3001. Legend 3001 identifies that the * symbol 2907 is used to indicate a HARQS process ID and corresponding HARQ process which is dedicate a HARQ suppression process, e.g. in which ACK/NACK feedback for data is not communicated, expected, or used.

Legend 3001 further indicates that symbol 3009, which is a box including (PF1), is used to indicated which HARQ process packet flow 1, e.g., a TCP packet flow supporting end to end retransmission of packets, has been assigned to. Legend 3001 further indicates that symbol 3011, which is a box including (PF2), is used to indicate which HARQ process packet flow 2, e.g., a packet flow not supporting end to end retransmission of packets, has been assigned to.

Drawings 3000 illustrates, by use of the * symbol 2907, that HARQ processes which are dedicated HARQ suppression processes are HARQ process #17 with HARQS process ID=0, HARQ process #18 with HARQS process ID=1, HARQ process #19 with HARQS process ID=2, and HARQ process #20 with HARQS process ID=3.

Drawing 3000 further illustrates that packet flow 1, e.g., a TCP packet flow supporting end to end retransmission of packets, has been assigned to HARQ process #17 with HARQS process ID=0, which is a dedicated HARQ suppression process, which does not provide ACK/NACK feedback in response to transmitted data.

Drawing 3000 further illustrates that packet flow 2, e.g., a packet flow that does not support end to end retransmission of packets, has been assigned to HARQ process #1 with HARQ process ID=0, which is a normal HARQ process which supports ACK/NACK feedback in response to transmitted data.

Figure 31:
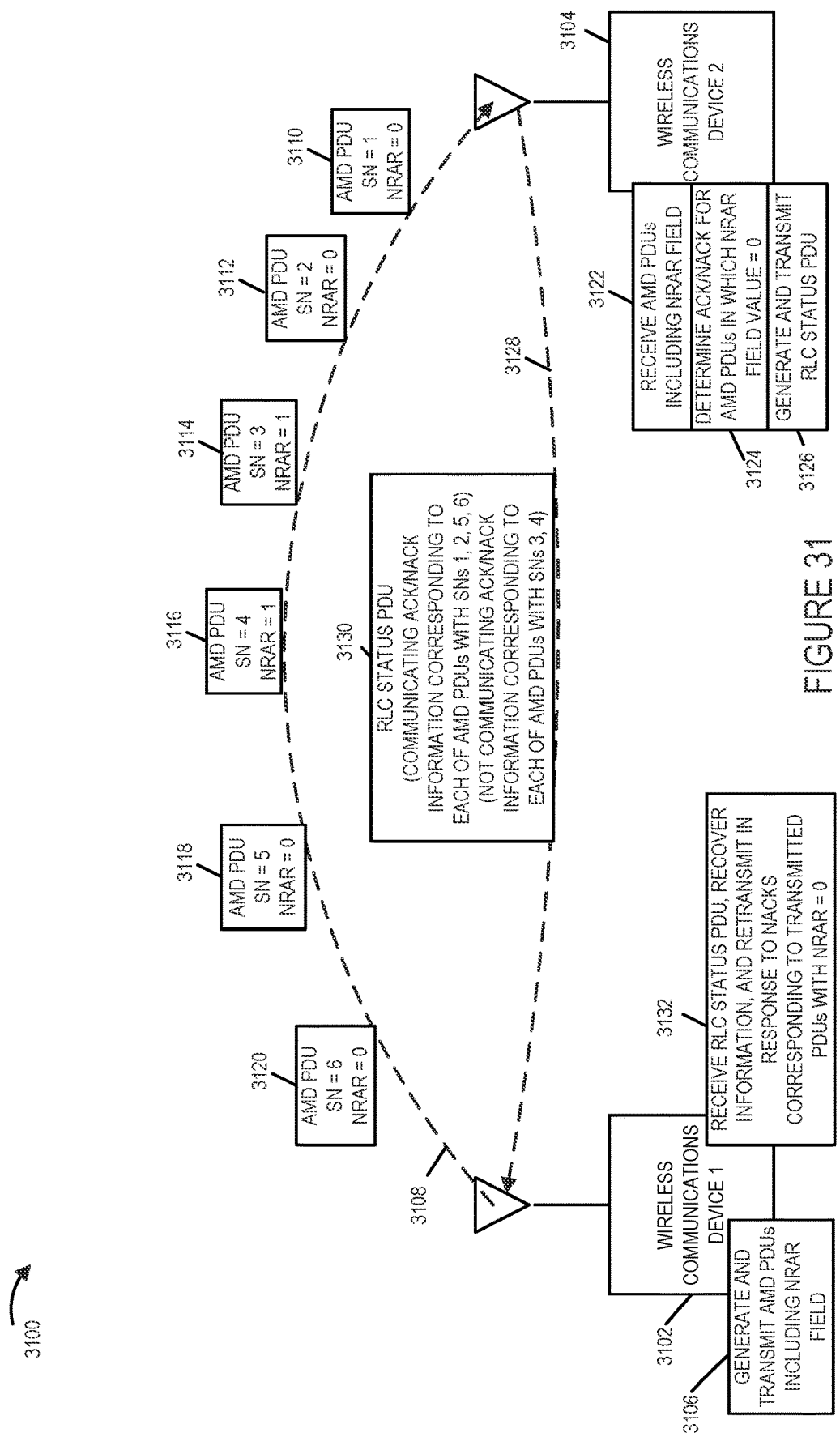
FIG. 31 is a drawing illustrating exemplary wireless communications devices, exemplary signaling and exemplary steps of an exemplary method in which RLC ACK/NACK is conditionally suppressed based on the value of a No RLC Acknowledgment Required (NRAR) indicator bit included an Acknowledged Mode Data (AMD) PDU in accordance with an exemplary embodiment.

FIG. 31 is a drawing 3100 illustrating exemplary wireless communications devices (wireless communications device 1 3102, wireless communications device 3104), exemplary signaling and exemplary steps of an exemplary method in which RLC ACK/NACK is conditionally suppressed based on the value of a No RLC Acknowledgment Required (NRAR) indicator bit included an Acknowledged Mode Data (AMD) PDU in accordance with an exemplary embodiment. In one exemplary embodiment, in which the transmitted AM PDUs are communicated in the downlink, wireless communications device 1 3102 is a base station, e.g., a gNB or an eNB, and wireless communications device 2 3104 is a user equipment (UE) device. In another exemplary embodiment, in which the transmitted AM PDUs are communicated in the uplink, wireless communications device 1 3104 is a base station, e.g., a gNB or an eNB, and wireless communications device 1 3102 is a user equipment (UE) device. The UE device is, e.g., UE 600 of FIG. 6, and the base station is, e.g., base station 700 of FIG. 7.

In step 3106, wireless communications device 1 3102 generates and transmits AMD PDUs (3110, 3112, 3114, 3116, 3118, 3120) each AMD PDU including a NRAR field communicating a NRAR value. FIG. 5 illustrates exemplary format for exemplary AMD PDUs which include an NRAR field. Wireless signals 3108 transmitted from wireless communications device 1 3102 to wireless communications device 2 3104 communicates the AMD PDUs (AMD PDU 3110 including a sequence number (SN)=1 and a NRAR indicator equal to 0, which indicates RLC acknowledgment expected, AMD PDU 3112 including a sequence number (SN)=2 and a NRAR indicator equal to 0, which indicates RLC acknowledgment expected, AMD PDU 3114 including a sequence number (SN)=3 and a NRAR indicator equal to 1, which indicates RLC acknowledgment not required, AMD PDU 3116 including a sequence number (SN)=4 and a NRAR indicator equal to 1, which indicates RLC acknowledgment not required, AMD PDU 3118 including a sequence number (SN)=5 and a NRAR indicator equal to 0, which indicates RLC acknowledgment expected, AMD PDU 3120 including a sequence number (SN)=6 and a NRAR indicator equal to 0, which indicates RLC Acknowledgment Expected.

In step 3122 the second wireless communications device receives the AMD PDUs (3110, 3112, 3114, 3116, 3118, 3120) including the NRAR field, and recovers the communicated NRAR field indicator values. In step 3124, the second wireless communications device determines ACK/NACK to report for AMD PDUs in which the NRAR field value=0. In step 3126, the second wireless communications device generates and transmits a RLC status PDU 3130, which is communicated in transmitted wireless signal 3128. The RLC status PDU 3130 communicates ACK/NACK information corresponding to each of the AMD PDUs with SN's 1, 2, 5 and 6, but does not communicate ACK/NACK information corresponding to each of the AMD PDUs with SNs 3 and 4.

In step 3132 wireless communications device 1 3102 receives the RLC status PDU, recovers the communicated information and retransmits in response to received NACKS corresponding to previously transmitted PDUs with NRAR=0.

First Numbered Set of Exemplary Embodiments

Method Embodiment 1 A communications method, the method comprising: identifying (1204 or 2104), at a first wireless communications device including a transmitter, a first traffic flow; and transmitting (1208 or 2110), from the first wireless communications device, an explicit indication to a second wireless communications device to skip Hybrid Automatic Repeat Request (HARQ) feedback for data, corresponding to the first traffic flow, said data being transmitted to the second wireless communications device.

Method Embodiment 2 The method of Method Embodiment 1, wherein identifying (1204 or 2106) a first traffic flow includes: identifying (1206) a first traffic flow that supports an end to end retransmission method in the event of a communications failure of data being communicated.

Method Embodiment 3 The method of Method Embodiment 2, further comprising: identifying (1220 or 2120), at the first wireless communications device a second traffic flow, said second traffic flow being a traffic flow which does not support an end to end retransmission method; and transmitting (1222 or 2122) data to the second wireless communications device without disabling HARQ feedback for the second traffic flow.

Method Embodiment 4 The method of Method Embodiment 2, wherein the first wireless communications device is a first base station and the second wireless communications device is a device which includes a wireless receiver for receiving data from said first base station; wherein said first traffic flow is a downlink traffic flow; and wherein transmitting (1208) from the first wireless communications device, an explicit indication to a second wireless communications device to skip HARQ feedback for data includes: transmitting (1210) a Semi-Persistent Scheduling (SPS) HARQ Off Indicator, set to indicate that HARQ is disabled, in a radio configuration information element.

Method Embodiment 5 The method of Method Embodiment 4, wherein said SPS HARQ off indicator is a one bit value set to a predetermined value (e.g., 1) when HARQ is disabled.

Method Embodiment 6 The method of Method Embodiment 5, further comprising: transmitting (1214), from the first wireless communications device to the second wireless communications device, a HARQ Off Indicator, set to indicate that HARQ is disabled, said HARQ Off indicator being transmitted in field of a Downlink Control Information (DCI) Format scheduling message.

Method Embodiment 7 The method of Method Embodiment 6, wherein said HARQ off indicator is a one bit value set to a predetermined value (e.g., 1) when HARQ is disabled.

Method Embodiment 8 The method of claim 6, wherein said DCI Format is one of a DCI format 1_0 or DCI format 1_1.

Method Embodiment 9 The method of Method Embodiment 5, further comprising: operating (1216) the second wireless communications device to ignore at least one of i) information in a Physical Downlink Shared Channel (PDSCH)-to-HARQ feedback timing indicator field or ii) information in a HARQ process number field of downlink control information provided by the first wireless communications device with respect to the first traffic flow.

Method Embodiment 10 The method of Method Embodiment 2, wherein the first wireless communications device is a device (e.g., UE) which includes a transmitter for transmitting to a base station and the second communications device is a base station which includes a wireless receiver for receiving data from said first wireless communications device (e.g., UE); and wherein said first traffic flow is an uplink traffic flow.

Method Embodiment 11 The method of Method Embodiment 10, wherein transmitting (1208) from the first wireless communications device, an explicit indication to a second wireless communications device to skip HARQ feedback for data includes: transmitting (1212) a Automatic Uplink (AUL) HARQ Off indicator to the base station.

Method Embodiment 12 The method of Method Embodiment 11, wherein the AUL HARQ Off indicator is a one bit value set to a value indicating that HARQ is disabled with respect to the first traffic flow.

Method Embodiment 13 The method of Method Embodiment 12, wherein transmitting (1218) the AUL HARQ Off indicator includes transmitting the indicator as part of an Autonomous Uplink-Uplink Control Information (AUL-UCI) that accompanies a Autonomous Uplink Physical Uplink Shared Channel (AUL-PUSCH) corresponding to the first traffic flow.

Method Embodiment 14 The method of Method Embodiment 2, wherein said first traffic flow is a downlink traffic flow; wherein said first traffic flow data is uniquely intended for the second wireless communications device; wherein said first traffic flow data is to be sent using normal mode of communication; and wherein said transmitting (2110) an explicit indication to a second wireless communications device to skip Hybrid Automatic Repeat Request (HARQ) feedback for data includes: transmitting (2112), from the first wireless communications device to the second wireless communications device, a HARQ Off indicator set to indicate HARQ is disabled in a downlink control information (DCI) format scheduling message.

Method Embodiment 15 The method of Method Embodiment 14, wherein said DCI format is DCI Format 1_0 or DCI Format 1_1.

Method Embodiment 16 The method of Method Embodiment 14, wherein in said normal mode of communications data is encoded via C-RNTI.

Method Embodiment 17 The method of Method Embodiment 2, wherein said first traffic flow is a downlink traffic flow; wherein said first traffic flow data is uniquely intended for the second wireless communications device; wherein said first traffic flow data is to be sent using a Semi-Persistent Scheduling (SPS) mode of communication; and wherein said transmitting (2110) an explicit indication to a second wireless communications device to skip Hybrid Automatic Repeat Request (HARQ) feedback for data includes: transmitting (2114), from the first wireless communications device to the second wireless communications device, at least one of: i) a SPS HARQ Off Indicator set to indicate HARQ is set to disabled or ii) a HARQ Off indicator set to indicate HARQ is disabled in a downlink control information (DCI) format scheduling message.

Method Embodiment 18 The method of Method Embodiment 17, wherein said DCI format is DCI Format 1_0 or DCI Format 1_1.

Method Embodiment 19 The method of Method Embodiment 17, wherein in said SPS mode of communications data is encoded via SP-RNTI.

Second Numbered Set of Exemplary Embodiments

System Embodiment 1 A communications system comprising: a first wireless communications device comprising: a transmitter; and a processor configured to: identify (1204 or 2104), at a first wireless communications device including a transmitter, a first traffic flow; and operate the transmitter to transmit (1208 or 2110), from the first wireless communications device, an explicit indication to a second wireless communications device to skip Hybrid Automatic Repeat Request (HARQ) feedback for data, corresponding to the first traffic flow, said data being transmitted to the second wireless communications device.

System Embodiment 2 The communications system of System Embodiment 1, wherein said processor is configured to: identify (1206) a first traffic flow that supports an end to end retransmission method in the event of a communications failure of data being communicated, as part of being configured to identify (1204 or 2106) a first traffic flow.

System Embodiment 3 The communications system of System Embodiment 2, wherein said processor is further configured to: identify (1220 or 2120), at the first wireless communications device a second traffic flow, said second traffic flow being a traffic flow which does not support an end to end retransmission method; and operate the transmitter to transmit (1222 or 2122) data to the second wireless communications device without disabling HARQ feedback for the second traffic flow.

System Embodiment 4 The communications system of System Embodiment 2, wherein the first wireless communications device is a first base station and the second wireless communications device is a device which includes a wireless receiver for receiving data from said first base station; wherein said first traffic flow is a downlink traffic flow; and wherein said processor is configured to operate said transmitter to transmit (1210) a Semi-Persistent Scheduling (SPS) HARQ Off Indicator, set to indicate that HARQ is disabled, in a radio configuration information element, as part of configured operate said transmitter to transmitter (1208) from the first wireless communications device, an explicit indication to a second wireless communications device to skip HARQ feedback for data.

System Embodiment 5 The communications system of System Embodiment 4, wherein said SPS HARQ off indicator is a one bit value set to a predetermined value (e.g., 1) when HARQ is disabled.

System Embodiment 6 The communications system of System Embodiment 5, wherein said processor is further configured to: operate said transmitter to transmit (1214), from the first wireless communications device to the second wireless communications device, a HARQ Off Indicator, set to indicate that HARQ is disabled, said HARQ Off indicator being transmitted in field of a Downlink Control Information (DCI) Format scheduling message.

System Embodiment 7 The communications system of System Embodiment 6, wherein said HARQ off indicator is a one bit value set to a predetermined value (e.g., 1) when HARQ is disabled.

System Embodiment 8 The communications system of System Embodiment 6, wherein said DCI Format is one of a DCI format 1_0 or DCI format 1_1.

System Embodiment 9 The communications system of System Embodiment 5, further comprising: said second wireless communications device comprising: a receiver; and a second processor, said second processor being configured to: operate (1216) the second wireless communications device to ignore at least one of i) information in a Physical Downlink Shared Channel (PDSCH)-to-HARQ feedback timing indicator field or ii) information in a HARQ process number field of downlink control information provided by the first wireless communications device with respect to the first traffic flow.

System Embodiment 10 The communications system of System Embodiment 2, wherein the first wireless communications device is a device (e.g., UE) which includes said transmitter for transmitting to a base station; wherein the second communications device is a base station which includes a wireless receiver for receiving data from said first wireless communications device (e.g., UE); and wherein said first traffic flow is an uplink traffic flow.

System Embodiment 11 The communications system of System Embodiment 10, wherein said processor is configured to: operate the transmitter to transmit (1212) a Automatic Uplink (AUL) HARQ Off indicator to the base station, as part of being configured to operate the transmitter to transmit (1208) from the first wireless communications device, an explicit indication to a second wireless communications device to skip HARQ feedback for data.

System Embodiment 12 The communications system of System Embodiment 11, wherein the AUL HARQ Off indicator is a one bit value set to a value indicating that HARQ is disabled with respect to the first traffic flow.

System Embodiment 13 The communications system of System Embodiment 12, wherein said processor is configured to operate said transmitter to transmit Autonomous Uplink-Uplink Control Information (AUL-UCI) that accompanies a Autonomous Uplink Physical Uplink Shared Channel (AUL-PUSCH) corresponding to the first traffic flow, said AUL HARQ Off indicator being part of the AUL-UCI.

System Embodiment 14 The communications system of System Embodiment 2, wherein said first traffic flow is a downlink traffic flow; wherein said first traffic flow data is uniquely intended for the second wireless communications device; wherein said first traffic flow data is to be sent using normal mode of communication; and wherein said processor is configured to operate said transmitter to transmit (2112), from the first wireless communications device to the second wireless communications device, a HARQ Off indicator set to indicate HARQ is disabled in a downlink control information (DCI) format scheduling message, as part of being configured to operate said transmitter to transmit (2110) an explicit indication to a second wireless communications device to skip Hybrid Automatic Repeat Request (HARQ) feedback for data.

System Embodiment 15 The communications system of System Embodiment 14, wherein said DCI format is DCI Format 1_0 or DCI Format 1_1.

System Embodiment 16 The communications system of System Embodiment 14, wherein in said normal mode of communications data is encoded via C-RNTI.

System Embodiment 17 The communications system of System Embodiment 2, wherein said first traffic flow is a downlink traffic flow; wherein said first traffic flow data is uniquely intended for the second wireless communications device; wherein said first traffic flow data is to be sent using a Semi-Persistent Scheduling (SPS) mode of communication; and wherein said processor is configured to operate said transmitter to transmit (2114), from the first wireless communications device to the second wireless communications device, at least one of: i) a SPS HARQ Off Indicator set to indicate HARQ is set to disabled or ii) a HARQ Off indicator set to indicate HARQ is disabled in a downlink control information (DCI) format scheduling message, as part of being configured to operate said transmitter to transmit (2110) an explicit indication to a second wireless communications device to skip Hybrid Automatic Repeat Request (HARQ) feedback for data.

System Embodiment 18 The communications system of System Embodiment 17, wherein said DCI format is DCI Format 1_0 or DCI Format 1_1.

System Embodiment 19 The communications system of System Embodiment 17, wherein in said SPS mode of communications data is encoded via SP-RNTI.

Third Numbered Set of Exemplary Embodiments

Computer Readable Medium Embodiment 1 A non-transitory computer readable medium including computer executable instructions which when executed by a processor of a first wireless communications device cause the first wireless communications device to perform the steps of: identifying (1204 or 2104), at a first wireless communications device including a transmitter, a first traffic flow; and transmitting (1208 or 2110), from the first wireless communications device, an explicit indication to a second wireless communications device to skip Hybrid Automatic Repeat Request (HARQ) feedback for data, corresponding to the first traffic flow, said data being transmitted to the second wireless communications device.

Fourth Numbered Set of Exemplary Embodiments

Method Embodiment 1 A method of operating a first communications device (e.g., base station (gNB or eNB) or user equipment (UE) device) including a transmitter, the method comprising: identifying (1504) a first packet flow for which end to end retransmission of packets is supported; and assigning (1518) said first packet flow to a Hybrid Automatic Repeat Request (HARQ) process which does not require generation of acknowledgements (ACKs) or negative acknowledgements (NAKs) from a device receiving data corresponding to said packet flow; and transmitting (1526) data corresponding to said first packet flow to a second communications device (e.g. the second communications device is a UE device which includes a receiver and is one end of the packet flow which has a third communications device, e.g. a second UE or server, e.g., application server (AS), as the other packet flow end point or the second communications device is a base station, e.g., a gNB or eNB which includes a receiver).

Method Embodiment 2 The method of Method Embodiment 1, wherein said HARQ process is a HARQ process for a TCP packet flow which supports end to end retransmission of packets, said HARQ process not supporting retransmission of data in response to a NACK and not requiring transmission of ACKs/NACKs from the receiving device to which data was transmitted.

Method Embodiment 3 The method of Method Embodiment 2, wherein said HARQ process is a dedicated HARQ process for a flow for which suppression of ACK/NACK is required, said dedicated HARQ process for the flow not triggering generation of ACK/NACK at the physical layer.

Method Embodiment 4 The method of Method Embodiment 1, wherein assigning (1518) said first packet flow to a HARQ process includes assigning (1520) said first packet flow to a HARQ process identified by a HARQ process ID which is designated as indicating a HARQ suppression.

Method Embodiment 5 The method of Method Embodiment 4, wherein said HARQ process ID for the first packet flow is communicated in a RRC IE (Radio Resource Control Information Element).

Method Embodiment 6 The method of Method Embodiment 5, wherein said RRC IE is an Information Element (IE) of a Physical Downlink Control Channel (PDCCH).

Method Embodiment 7 The method of Method Embodiment 5, further comprising: transmitting (1522) said HARQ process ID for the first packet flow to the second communications device.

Method Embodiment 8 The method of Method Embodiment 7, wherein transmitting (1522) said HARQ process ID for the first packet flow to the second communications device includes: transmitting (1524) said HARQ process ID for the first packet flow to the second communications device in an information element (IE) of a physical downlink control channel (PDCCH) (e.g., of a RRC message).

Method Embodiment 9 The method of Method Embodiment 5, wherein said HARQ process ID is a 4 bit ID.

Method Embodiment 10 The method of Method Embodiment 5, wherein the first communications device is a base station and the second communications device is a UE; and wherein the RRC IE indicates a HARQ process to be used for a corresponding transmission block (TB) transmitted in a downlink channel.

Method Embodiment 11 The method of Method Embodiment 4, wherein first communications device is a UE and the second communications device is a base station; and wherein said HARQ process to which the first packet flow is assigned is to be used for a corresponding uplink (UL) transmission block (TB) transmitted in a uplink channel.

Method Embodiment 12 The method of Method Embodiment 1, further comprising: designating (1509) K HARQ process IDs, corresponding to K HARQ processes, to be used to mean no ACK/NACK expected, said K HARQ processes to be used for transport blocks (TBs) on which HARQ is to be suppressed.

Method Embodiment 13 The method of Method Embodiment 12, further comprising: generating (1510) a radio resource control (RRC) message including a RRC information element (IE) identifying the K HARQ processes designated a No ACK/NACK expected.

Method Embodiment 14 The method of Method Embodiment 13, wherein said RRC information element (IE) identifying the K HARQ processes designated a No ACK/NACK expected, is a four bit information element.

Method Embodiment 15 The method of Method Embodiment 13, further comprising: transmitting (1516) said generated RRC message, including said RCC IE identifying the K HARQ processes designated as No ACK/NACK, to said second communications device.

Method Embodiment 16 The method of Method Embodiment 15, wherein said first communications device is a base station; wherein said second communications device is a user equipment (UE) device; wherein said first packet flow is a downlink packet flow; and wherein generating (1510) a RRC control message includes: generating (1512) a RRC control message including an RRC IE 'HARQ process ID for suppression in downlink', which communicates a value indicating which HARQ process IDs are to be used for Transport Blocks (TBs) in the downlink direction which do not require HARQ feedback to sender.

Method Embodiment 17 The method of Method Embodiment 16, wherein generating (1512) a RRC control message including an RRC IE 'HARQ process ID for suppression in downlink' includes: including (1513) in said RRC message an RRC IE 'HARQ process ID for suppression' including a value indicating the K number of HARQ processes designated as No HARQ ACK/NACK expected.

Method Embodiment 18 The method of Method Embodiment 17, wherein said RRC IE 'HARQ process ID for suppression' is a 4 bit IE.

Method Embodiment 19 The method of Method Embodiment 15, wherein said first communications device is a user equipment (UE) device; wherein said second communications device is a base station; wherein said first packet flow is an uplink packet flow; and wherein generating (1510) a RRC control message includes: generating (1514) a RRC control message including an RRC IE 'HARQ process ID for suppression in uplink', which communicates a value indicating which HARQ process IDs are to be used in the uplink direction for Transport Blocks (TBs) identified to not require HARQ feedback from receiver.

Method Embodiment 20 The method of Method Embodiment 19, wherein generating (1514) a RRC control message including an RRC IE 'HARQ process ID for suppression in uplink' includes: including (1515) in said RRC message an RRC IE 'HARQ process ID for suppression' including a value indicating the K number of HARQ processes designated as No HARQ ACK/NACK expected.

Method Embodiment 21 The method of Method Embodiment 20, wherein said RRC IE 'HARQ process ID for suppression' is a 4 bit IE.

Fifth Numbered Set of Exemplary Embodiments

Apparatus Embodiment 1 A first communications device (e.g., base station (gNB or eNB) or user equipment (UE) device) comprising: a transmitter; and a processor configured to: identify (1504) a first packet flow for which end to end retransmission of packets is supported; and assign (1518) said first packet flow to a Hybrid Automatic Repeat Request (HARQ) process which does not require generation of acknowledgements (ACKs) or negative acknowledgements (NAKs) from a device receiving data corresponding to said packet flow; and operate said transmitter to transmit (1526) data corresponding to said first packet flow to a second communications device (e.g. the second communications device is a UE device which includes a receiver and is one end of the packet flow which has a third communications device, e.g. a second UE or server, e.g., application server (AS), as the other packet flow end point or the second communications device is a base station, e.g., a gNB or eNB which includes a receiver).

Apparatus Embodiment 2 The first communications device of Apparatus Embodiment 1, wherein said HARQ process is a HARQ process for a TCP packet flow which supports end to end retransmission of packets, said HARQ process not supporting retransmission of data in response to a NACK and not requiring transmission of ACKs/NACKs from the receiving device to which data was transmitted.

Apparatus Embodiment 3 The first communications device of Apparatus Embodiment 2, wherein said HARQ process is a dedicated HARQ process for a flow for which suppression of ACK/NACK is required, said dedicated HARQ process for the flow not triggering generation of ACK/NACK at the physical layer.

Apparatus Embodiment 4 The first communications device of Apparatus Embodiment 1, wherein said processor is configured to assign (1520) said first packet flow to a HARQ process identified by a HARQ process ID which is designated as indicating a HARQ suppression, as part of being configured to assign(1518) said first packet flow to a HARQ process.

Apparatus Embodiment 5 The first communications device of first communications device 4, wherein said HARQ process ID for the first packet flow is communicated in a RRC IE (Radio Resource Control Information Element).

Apparatus Embodiment 6 The first communications device of Apparatus Embodiment 5, wherein said RRC IE is an Information Element (IE) of a Physical Downlink Control Channel (PDCCH).

Apparatus Embodiment 7 The first communications device of Apparatus Embodiment 5, wherein said processor is further configured to: operate said transmitter to transmit (1522) said HARQ process ID for the first packet flow to the second communications device.

Apparatus Embodiment 8 The first communications device of Apparatus Embodiment 7, wherein said processor is configured to: operate said transmitter to transmit (1524)

said HARQ process ID for the first packet flow to the second communications device in an information element (IE) of a physical downlink control channel (PDCCH) (e.g., of a RRC message), as part of being configured to operate said transmitter to transmit (1522) said HARQ process ID for the first packet flow to the second communications device.

Apparatus Embodiment 9 The first communications device of Apparatus Embodiment 5, wherein said HARQ process ID is a 4 bit ID.

Apparatus Embodiment 10 The first communications device of Apparatus Embodiment 5, wherein first communications device is a base station and the second communications device is a UE; and wherein the RRC IE indicates a HARQ process to be used for a corresponding transmission block (TB) transmitted in a downlink channel.

Apparatus Embodiment 11 The first communications device of Apparatus Embodiment 4, wherein first communications device is a UE and the second communications device is a base station; and wherein said HARQ process to which the first packet flow is assigned is to be used for a corresponding uplink (UL) transmission block (TB) transmitted in a uplink channel.

Apparatus Embodiment 12 The first communications device of Apparatus Embodiment 1, wherein said processor is further configured to: designate (1509) K HARQ process IDs, corresponding to K HARQ processes, to be used to mean no ACK/NACK expected, said K HARQ processes to be used for transport blocks (TBs) on which HARQ is to be suppressed.

Apparatus Embodiment 13 The first communications device of Apparatus Embodiment 12, wherein said processor is further configured to: generate (1510) a radio resource control (RRC) message including a RRC information element (IE) identifying the K HARQ processes designated a No ACK/NACK expected.

Apparatus Embodiment 14 The first communications device of Apparatus Embodiment 13, wherein said RRC information element (IE) identifying the K HARQ processes designated a No ACK/NACK expected, is a four bit information element.

Apparatus Embodiment 15 The first communications device of Apparatus Embodiment 13, wherein said processor is further configured to: operate said transmitter to transmit (1516) said generated RRC message, including said RCC IE identifying the K HARQ processes designated as No ACK/NACK, to said second communications device.

Apparatus Embodiment 16 The first communications device of Apparatus Embodiment 15, wherein said first communications device is a base station; wherein said second communications device is a user equipment (UE) device; wherein said first packet flow is a downlink packet flow; and wherein said processor is configured to generate (1512) a RRC control message including an RRC IE 'HARQ process ID for suppression in downlink', which communicates a value indicating which HARQ process IDs are to be used for Transport Blocks (TBs) in the downlink direction which do not require HARQ feedback to sender, as part of being configured to generate (1510) a RRC control message.

Apparatus Embodiment 17 The first communications device of Apparatus Embodiment 16, wherein said processor is configured to: include (1513) in said RRC message an RRC IE 'HARQ process ID for suppression' including a value indicating the K number of HARQ processes designated as No HARQ ACK/NACK expected, as part of being configured to generate (1512) a RRC control message including an RRC IE 'HARQ process ID for suppression in downlink'.

Apparatus Embodiment 18 The first communications device of Apparatus Embodiment 17, wherein said RRC IE 'HARQ process ID for suppression' is a 4 bit IE.

Apparatus Embodiment 19 The first communications device of Apparatus Embodiment 15, wherein said first communications device is a user equipment (UE) device; wherein said second communications device is a base station; wherein said first packet flow is an uplink packet flow; and wherein said processor is configured to: generate (1514) a RRC control message including an RRC IE 'HARQ process ID for suppression in uplink', which communicates a value indicating which HARQ process IDs are to be used in the uplink direction for Transport Blocks (TBs) identified to not require HARQ feedback from receiver, as part of being configured to generate (1510) a RRC control message.

Apparatus Embodiment 20 The first communications device of Apparatus Embodiment 19, wherein said processor is configured to: include (1515) in said RRC message an RRC IE 'HARQ process ID for suppression' including a value indicating the K number of HARQ processes designated as No HARQ ACK/NACK expected, as part of being configured to generate (1514) a RRC control message including an RRC IE 'HARQ process ID for suppression in uplink'.

Apparatus Embodiment 21 The first communications device of Apparatus Embodiment 20, wherein said RRC IE 'HARQ process ID for suppression' is a 4 bit IE.

Sixth Numbered Set of Exemplary Embodiments

Computer Readable Medium Embodiment 1 A non-transitory computer readable medium including computer executable instructions which when executed by a processor of a first communications device cause the first communications device to perform the steps of: identifying (1504) a first packet flow for which end to end retransmission of packets is supported; and assigning (1518) said first packet flow to a Hybrid Automatic Repeat Request (HARQ) process which does not require generation of acknowledgements (ACKs) or negative acknowledgements (NAKs) from a device receiving data corresponding to said packet flow; and transmitting (1526) data corresponding to said first packet flow to a second communications device (e.g. the second communications device is a UE device which includes a receiver and is one end of the packet flow which has a third communications device, e.g. a second UE or server, e.g., application server (AS), as the other packet flow end point or the second communications device is a base station, e.g., a gNB or eNB which includes a receiver).

Seventh Numbered Set of Exemplary Embodiments

Method Embodiment 1 A communications method comprising: identifying (1802), at a first wireless communications device (e.g., a base station such as a gNB or eNB) including a transmitter, a first traffic flow; and transmitting (1808), from the first wireless communications device, an explicit indication in a downlink message to a second wireless communications device (e.g., a UE) to skip Hybrid Automatic Repeat Request (HARQ) feedback for data, corresponding to the first traffic flow, said data being directed to the second wireless communications device.

Method Embodiment 2 The communications method of Method Embodiment 1, wherein said second wireless communications device is an endpoint of said first traffic flow.

Method Embodiment 3 The communications method of Method Embodiment 1, wherein said explicit indication to skip Hybrid Automatic Repeat Request (HARQ) feedback for data is a predetermined value in a predetermined field of a downlink control information (DCI) scheduling message.

Method Embodiment 4 The communications method of Method Embodiment 3, wherein said DCI scheduling message is one of a DCI format 1_0 or DCI format 1_1 scheduling message.

Method Embodiment 5 The method of Method Embodiment 3, wherein said predetermined field is a 'PDSCH-to-HARQ_feedback timing indicator' field.

Method Embodiment 6 The communications method of Method Embodiment 3, wherein, the predetermined value is a value outside an expected range of values for a PDSCH-to-HARQ feedback timing indicator.

Method Embodiment 7 The communications method of Method Embodiment 3, further comprising: receiving (1810), at said second wireless communications device, a downlink control information scheduling message; decoding (1812), at said second wireless communications device, said predetermined field of the DCI scheduling message; and determining (1814), at said second wireless communications device, whether or not the predetermined field of the DCI scheduling message communicates the predetermined value, which is the explicit indication to skip Hybrid Automatic Repeat Request (HARQ) feedback for data.

Method Embodiment 8 The method of Method Embodiment 7, further comprising: when the determination is that the predetermined field of the DCI scheduling message communicates the predetermined value, operating (1820) the second wireless communications device to refrain from including HARQ-ACK in uplink control information (UCI) for code block groups (CBGs) and Transport Blocks (TBs) scheduled in the DCI scheduling message.

Method Embodiment 9 The method of Method Embodiment 8, further comprising: when the determination is that the predetermined field of the DCI scheduling message communicates does not communicate the predetermined value, operating (1822) the second wireless communications device to include HARQ-ACK (HARQ ACK or HARQ NACK) in uplink control information (UCI) for code block groups (CBGs) and Transport Blocks (TBs) scheduled in the DCI scheduling message.

Method Embodiment 10 The method of Method Embodiment 3, wherein said predetermined value is a specific value which is indicated via a higher layer parameter.

Method Embodiment 11 The method of Method Embodiment 3, wherein said higher layer parameter is a Slot-timing-value-K1 parameter.

Method Embodiment 12 The method of Method Embodiment 3, wherein identifying (1802) a first traffic flow includes: identifying (1804) a first traffic flow that supports an end to end retransmission method in the event of a communications failure of data being communicated.

Method Embodiment 13 The method of Method Embodiment 12, further comprising: transmitting (1816), from the first wireless communications device, data to the second wireless communications device with disabled HARQ feedback for the first traffic flow.

Method Embodiment 14 The method of Method Embodiment 12, wherein said first traffic flow is a downlink traffic flow.

Method Embodiment 15 The method of Method Embodiment 12, further comprising: identifying (1824), at the first wireless communications device a second traffic flow, said second traffic flow being a traffic flow which does not support an end to end retransmission method; and transmitting (1826), from the first wireless communications device, data to the second wireless communications device without disabling HARQ feedback for the second traffic flow.

Eighth Number Set of Exemplary Embodiments

System Embodiment 1 A communications system comprising: a first wireless communications device comprising: a transmitter; and a processor configured to: identify (1802), at a first wireless communications device (e.g., a base station such as a gNB or eNB) including a transmitter, a first traffic flow; and operate said transmitter to transmit (1808), from the first wireless communications device, an explicit indication in a downlink message to a second wireless communications device (e.g., a UE) to skip Hybrid Automatic Repeat Request (HARQ) feedback for data, corresponding to the first traffic flow, said data being directed to the second wireless communications device.

System Embodiment 2 The communications system of System Embodiment 1, wherein said second wireless communications device is an endpoint of said first traffic flow.

System Embodiment 3 The communications system of System Embodiment 1, wherein said explicit indication to skip Hybrid Automatic Repeat Request (HARQ) feedback for data is a predetermined value in a predetermined field of a downlink control information (DCI) scheduling message.

System Embodiment 4 The communications system of System Embodiment 3, wherein said DCI scheduling message is one of a DCI format 1_0 or DCI format 1_1 scheduling message.

System Embodiment 5 The communications system of System Embodiment 3, wherein said predetermined field is a 'PDSCH-to-HARQ feedback timing indicator' field.

System Embodiment 6 The communications system of System Embodiment 3, wherein, the predetermined value is a value outside an expected range of values for a PDSCH-to-HARQ feedback timing indicator.

System Embodiment 7 The communications system of System Embodiment 3, wherein said system further comprises: said second wireless communications device, said second wireless communications device comprising: a receiver; and a second processor configured to: operate said receiver to receive (1810), at said second wireless communications device, a downlink control information scheduling message; decode (1812), at said second wireless communications device, said predetermined field of the DCI scheduling message; and determine (1814), at said second wireless communications device, whether or not the predetermined field of the DCI scheduling message communicates the predetermined value, which is the explicit indication to skip Hybrid Automatic Repeat Request (HARQ) feedback for data.

System Embodiment 8 The communications system of System Embodiment 7, wherein said second processor is further configured to: operate (1820) the second wireless communications device to refrain from including HARQ-ACK in uplink control information (UCI) for code block groups (CBGs) and Transport Blocks (TBs) scheduled in the DCI scheduling message, when the determination is that the predetermined field of the DCI scheduling message communicates the predetermined value System Embodiment 9 The communications system of System Embodiment 8, wherein said second processor is further configured to: operate (1822) the second wireless communications device to include HARQ-ACK (HARQ ACK or HARQ NACK) in uplink control information (UCI)

for code block groups (CBGs) and Transport Blocks (TBs) scheduled in the DCI scheduling message, when the determination is that the predetermined field of the DCI scheduling message communicates does not communicate the predetermined value, System Embodiment 10 The communications system of System Embodiment 3, wherein said predetermined value is a specific value which is indicated via a higher layer parameter.

System Embodiment 11 The communications system of System Embodiment 3, wherein said higher layer parameter is a Slot-timing-value-K1 parameter.

System Embodiment 12 The communications of System Embodiment 3, wherein said processor is configured to: identify (1804) a first traffic flow that supports an end to end retransmission method in the event of a communications failure of data being communicated, as part of being configured to identify (1802) a first traffic flow.

System Embodiment 13 The communications system of System Embodiment 12, wherein said processor is further configured to: operate said transmitter to transmit (1816), from the first wireless communications device, data to the second wireless communications device with disabled HARQ feedback for the first traffic flow.

System Embodiment 14 The communications system of System Embodiment 12, wherein said first traffic flow is a downlink traffic flow.

System Embodiment 15 The communications system of System Embodiment 12, wherein said processor is configured to: identify (1824), at the first wireless communications device a second traffic flow, said second traffic flow being a traffic flow which does not support an end to end retransmission method; and operate said transmitter to transmit (1826), from the first wireless communications device, data to the second wireless communications device without disabling HARQ feedback for the second traffic flow.

Ninth Numbered Set of Exemplary Embodiments

Computer Readable Medium Embodiment 1 A non-transitory computer readable medium including computer executable instructions which when executed by a processor of a first wireless communications device cause the first wireless communications device to perform the steps of: identifying (1802), at a first wireless communications device (e.g., a base station such as a gNB or eNB) including a transmitter, a first traffic flow; and transmitting (1808), from the first wireless communications device, an explicit indication in a downlink message to a second wireless communications device (e.g., a UE) to skip Hybrid Automatic Repeat Request (HARQ) feedback for data, corresponding to the first traffic flow, said data being directed to the second wireless communications device.

Tenth Numbered Set of Exemplary Embodiments

Method Embodiment 1 A method of operating a first wireless communications device including a radio transmitter, the method comprising; identifying (2304) a Packet Data Convergence Protocol (PDCP) packet corresponding to an Radio Link Control Acknowledged Mode (RLC AM); and generating (2306) an Acknowledged Mode Protocol Data Unit (AM PDU) including a No RLC ACK Required (NRAR) indicator; and operating (2322) the radio transmitter in the first wireless communications device to transmit the AM PDU to a second wireless communications device.

Method Embodiment 2 The method of Method Embodiment 1, wherein said AM PDU is an acknowledged mode data protocol data unit (AMD PDU).

Method Embodiment 3 The method of Method Embodiment 1, wherein generating (2306) an Acknowledged Mode Protocol Data Unit (AM PDU) including a No RLC ACK required indicator includes: inserting (2310) the No RLC ACK required indicator after a Sequence Number (SN) in a acknowledgement mode PDU with no Segment Offset (SO).

Method Embodiment 4 The method of Method Embodiment 1, wherein generating (2306) an Acknowledged Mode Protocol Data Unit (AM PDU) including a No RLC ACK required indicator includes: including (2311) a Segment Offset in the AM PDU; and inserting (2312) the No RLC ACK required indicator after the Segment Offset (SO).

Method Embodiment 5 The method of Method Embodiment 1, wherein the NRAR indicator is a one bit indicator.

Method Embodiment 6 The method of Method Embodiment 5, wherein the NRAR indicator is the first bit in an octet.

Method Embodiment 7 The method of Method Embodiment 1, wherein the NRAR indicator is set to one to indicate an RLC ACK is not required.

Method Embodiment 8 The method of Method Embodiment 1, wherein the NRAR indicator is set to zero to indicate an RLC ACK is expected.

Method Embodiment 9 The method of Method Embodiment 8, further comprising: operating (2326) the first wireless communications device to receive an RLC STATUS PDU from the second wireless communications device, said RLC status PDU including an ACK report from the second wireless device.

Method Embodiment 10 The method of Method Embodiment 9, wherein said RLC status PDU includes a serial number or sequence number corresponding to the transmitted AM PDU and an indication of ACK or NACK for the transmitted PDU.

Method Embodiment 11 The method of Method Embodiment 8, further comprising: transmitting (2324) a second AM PDU including a No RLC ACK Required (NRAR) indicator set to one indicating an RLC ACK is not required.

Method Embodiment 12. The method of Method Embodiment 11, wherein said second AM PDU is a second acknowledged mode data protocol data unit (AMD PDU).

Method Embodiment 13 The method of Method Embodiment 11, further comprising: receiving (2326) from the second wireless communications device a RLC STATUS PDU, wherein said RLC STATUS PDU includes a sequence number and a ACK/NACK indication corresponding to the transmitted AM PDU which included a NRAR indicator set to zero, and wherein said RLC STATUS PDU does not include a sequence number or an ACK/NACK indication corresponding to the transmitted second AM PDU which included the status bit set to one, said second wireless communications device having intentionally left out the sequence number corresponding to the second AM PDU.

Method Embodiment 14. The method of Method Embodiment 13, wherein said ACK/NACK indication corresponding to the transmitted PDU indicates NACK; and wherein said second transmitted PDU was successfully recovered by said second wireless device.

Eleventh Numbered Set of Exemplary Embodiments

Apparatus Embodiment 1 A first wireless communications device comprising: a radio transmitter; and a processor configured to: identify (2304) a Packet Data Convergence Protocol (PDCP) packet corresponding to an Radio Link Control Acknowledged Mode (RLC AM); and generate (2306) an Acknowledged Mode Protocol Data Unit (AM PDU) including a No RLC ACK Required (NRAR) indicator; and operate (2322) the radio transmitter in the first wireless communications device to transmit the AM PDU to a second wireless communications device.

Apparatus Embodiment 2. The first wireless communication device of claim 1, wherein said AM PDU is an acknowledged mode data protocol data unit (AMD PDU).

Apparatus Embodiment 3 The first wireless communications device of Apparatus Embodiment 1, wherein said processor is configured to: insert (2310) the No RLC ACK required indicator after a Sequence Number (SN) in a acknowledgement mode PDU with no Segment Offset (SO), as part of being configured to generate (2306) an Acknowledged Mode Protocol Data Unit (AM PDU) including a No RLC ACK required indicator.

Apparatus Embodiment 4 The first wireless communications device of Apparatus Embodiment 1, wherein said processor is configured to: include (2311) a Segment Offset in the AM PDU; and insert (2312) the No RLC ACK required indicator after the Segment Offset (SO), as part of being configured to generate (2306) an Acknowledged Mode Protocol Data Unit (AM PDU) including a No RLC ACK required indicator.

Apparatus Embodiment 5. The first wireless communications device of Apparatus Embodiment 1, wherein the NRAR indicator is a one bit indicator.

Apparatus Embodiment 6 The first wireless communications device of Apparatus Embodiment 5, wherein the NRAR indicator is the first bit in an octet.

Apparatus Embodiment 7 The first wireless communications device of Apparatus Embodiment 1, wherein the NRAR indicator is set to one to indicate an RLC ACK is not required.

Apparatus Embodiment 8 The first wireless communications device of Apparatus Embodiment 1, wherein the NRAR indicator is set to zero to indicate an RLC ACK is expected.

Apparatus Embodiment 9 The first wireless communications device of Apparatus Embodiment 8, further comprising: a receiver; and wherein said processor is configured to operate (2326) receiver in the first wireless communications device to receive an RLC STATUS PDU from the second wireless communications device, said RLC status PDU including an ACK report from the second wireless device.

Apparatus Embodiment 10 The first wireless communications device of Apparatus Embodiment 9, wherein said RLC status PDU includes a sequence number corresponding to the transmitted AM PDU and an indication of ACK or NACK for the transmitted PDU.

Apparatus Embodiment 11 The first wireless communications device of Apparatus Embodiment 8, wherein said processor is configured to: operate said transmitter to transmit (2324) a second AM PDU including a No RLC ACK Required (NRAR) indicator set to one indicating an RLC ACK is not required.

Apparatus Embodiment 12 The first wireless communications device of Apparatus Embodiment 11, wherein said second AM PDU is a second acknowledged mode data protocol data unit (AMD PDU).

Apparatus Embodiment 13 The first wireless communications device of Apparatus Embodiment 11, further comprising: a receiver; and wherein said processor is configured to operate said receiver to receive (2326) from the second wireless communications device a RLC STATUS PDU, wherein said RLC STATUS PDU includes a sequence number and a ACK/NACK indication corresponding to the transmitted AM PDU which included a NRAR indicator set to zero, and wherein said RLC STATUS PDU does not include a sequence number or an ACK/NACK indication corresponding to the transmitted second AM PDU which included the status bit set to one, said second wireless communications device having intentionally left out the sequence number corresponding the second AM PDU.

Apparatus Embodiment 14 The first wireless communications device of Apparatus Embodiment 13, wherein said ACK/NACK indication corresponding to the transmitted AM PDU indicates NACK; and wherein said second transmitted AM PDU was successfully recovered by said second wireless device.

Twelfth Number Set of Exemplary Embodiments

Computer Readable Medium Embodiment 1 A non-transitory computer readable medium including computer executable instructions which when executed by a processor of a first wireless communications device including a radio transmitter cause the first wireless communications device to perform the steps of: identifying (2304) a Packet Data Convergence Protocol (PDCP) packet corresponding to an Radio Link Control Acknowledged Mode (RLC AM); and generating (2306) an Acknowledged Mode Protocol Data Unit (AM PDU) including a No RLC ACK Required (NRAR) indicator; and operating (2322) the radio transmitter in the first wireless communications device to transmit the AM PDU to a second wireless communications device.

The techniques of various embodiments may be implemented using software, hardware and/or a combination of software and hardware. Various embodiments are directed to apparatus, e.g., user devices, base stations, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
using a latency threshold to identify, at a first wireless communications device including a transmitter, traffic flows that support an end to end retransmission method in the event of a communications failure of data being communicated to which Hybrid Automatic Repeat Request (HARQ) suppression should be applied, using the latency threshold including identifying a first traffic flow which has a first latency requirement which is below said latency threshold as a traffic flow to which HARQ suppression should be applied, said first traffic flow being a traffic flow extending between the first wireless communications device and a third wireless communications device and which passes through a second wireless communications device; and
applying HARQ suppression to the first traffic flow, without applying HARQ suppression to a second traffic flow, said second traffic flow having a different latency requirement than said first traffic flow, said different latency requirement allowing for more latency than is permitted by said first latency requirement.

2. The communications method of claim 1, wherein applying HARQ suppression to the first traffic flow includes transmitting, from the first wireless communications device, an explicit indication to the second wireless communications device to skip HARQ feedback for data, corresponding to the first traffic flow, which is transmitted to the second wireless communications device.

3. The method of claim 2, further comprising:
identifying, at the first wireless communications device, the second traffic flow, said second traffic flow being a traffic flow which does not support an end to end retransmission method.

4. The method of claim 3, further comprising:
transmitting data corresponding to the second traffic flow to the second wireless communications device without disabling HARQ feedback for the second traffic flow.

5. The method of claim 2, wherein applying HARQ suppression to the first traffic flow includes transmitting a Semi-Persistent Scheduling (SPS) HARQ Off Indicator, set to indicate that HARQ is disabled for the first traffic flow.

6. The method of claim 5, wherein the SPS HARQ Off Indicator is a one bit value set to a predetermined value when HARQ is disabled.

7. The method of claim 5, further comprising:
operating the second wireless communications device to ignore at least one of:
i) information in a Physical Downlink Shared Channel (PDSCH) to HARQ feedback timing indicator field or
ii) information in a HARQ process number field of downlink control information provided by the first wireless communications device with respect to the first traffic flow.

8. The method of claim 2, further comprising:
relying on a packet retransmission method supported by the end devices of the first traffic flow to assure overall end to end communications reliability without depending on the HARQ capabilities that could have been used on the wireless link between the first wireless communications device and the second wireless communications device but were suppressed by the applied HARQ suppression.

9. The method of claim 2, further comprising:
operating the first wireless communications device to communicate other traffic flows which have more flexibility with regard to latency than said first traffic flow without applying HARQ suppression to said other traffic flows.

10. The method of claim 2, wherein the second wireless communications device and the third wireless communications device are user equipment (UE) devices.

11. The method of claim 1, wherein said second traffic flow is a traffic flow which does not support an end to end retransmission method.

12. A communications system comprising:
a first wireless communications device comprising:
a transmitter; and
a processor configured to:
use a latency threshold to identify, at the first wireless communications device, traffic flows that support an end to end retransmission method in the event of a communications failure of data being communicated to which Hybrid Automatic Repeat Request (HARQ) suppression should be applied, wherein using the latency threshold includes identifying a first traffic flow which has a first latency requirement which is below said latency threshold as a traffic flow to which HARQ suppression should be applied, said first traffic flow being a traffic flow extending between the first wireless communications device and a third wireless communications device and which passes through a second wireless communications device; and
apply HARQ suppression to the first traffic flow, without applying HARQ suppression to a second traffic flow, said second traffic flow having a different latency requirement than said first traffic flow, said different latency requirement allowing for more latency than is permitted by said first latency requirement.

13. The communications system of claim 12, wherein the first wireless communications device is a device which includes said transmitter for transmitting to a base station.

14. The communications system of claim 13, wherein said processor is configured, as part of being configured to apply HARQ suppression to the first traffic flow, to control the first communications device to transmit, from the first wireless communications device, an explicit indication to the second wireless communications device to skip HARQ feedback for data, corresponding to the first traffic flow, which is transmitted to the second wireless communications device.

15. The communications system of claim 14, further comprising:
the second communications device, said second communications device being a base station which includes a wireless receiver for receiving data from said first wireless communications device; and
wherein said first traffic flow includes an uplink traffic flow from the first wireless communications device to the base station.

16. The communications system of claim 15, wherein said processor is further configured to:
operate the transmitter to transmit an Automatic Uplink (AUL) HARQ Off indicator to the base station.

17. The communications system of claim 16, wherein said processor is further configured to:
identify, at the first wireless communications device, a second traffic flow, said second traffic flow being a traffic flow which does not support an end to end retransmission method.

18. The communications system of claim 17, wherein said processor is further configured to:
operate the transmitter to transmit data from the first wireless communications device to the second wireless communications device without disabling HARQ feedback for the second traffic flow.

19. A non-transitory computer readable medium including computer executable instructions, which when executed by a processor of a first wireless communications device, control the first wireless communications device to perform the steps of:
using a latency threshold to identify, at the first wireless communications device including a transmitter, traffic flows that support an end to end retransmission method in the event of a communications failure of data being communicated to which Hybrid Automatic Repeat Request (HARQ) suppression should be applied, using the latency threshold including identifying a first traffic flow which has a first latency requirement which is below said latency threshold as a traffic flow to which HARQ suppression should be applied, said first traffic flow being a traffic flow extending between the first wireless communications device and a third wireless communications device and which passes through a second wireless communications device; and
applying HARQ suppression to the first traffic flow, without applying HARQ suppression to a second traffic flow, said second traffic flow having a different latency requirement than said first traffic flow, said different latency requirement allowing for more latency than is permitted by said first latency requirement.

20. The non-transitory computer readable medium of claim 19, further including computer executable instructions, which when executed by the processor of the first wireless communications device control the first wireless device to transmit an explicit indication to the second wireless communications device to skip HARQ feedback for data, corresponding to the first traffic flow as part of applying HARQ suppression to the first traffic flow.

* * * * *